(12) United States Patent
Kennedy

(10) Patent No.: US 10,508,789 B2
(45) Date of Patent: Dec. 17, 2019

(54) HOLLOW LIGHT GUIDE LUMINAIRE

(71) Applicant: Loom Inc., Penticton (CA)

(72) Inventor: Matthew Kennedy, Chilliwack (CA)

(73) Assignee: LOOM INC., Penticton, British (CA)

( * ) Notice: Subject to any disclaimer, the term of this patent is extended or adjusted under 35 U.S.C. 154(b) by 0 days.

(21) Appl. No.: 15/763,465

(22) PCT Filed: Oct. 6, 2016

(86) PCT No.: PCT/CA2016/051166
§ 371 (c)(1),
(2) Date: Mar. 27, 2018

(87) PCT Pub. No.: WO2017/059538
PCT Pub. Date: Apr. 13, 2017

(65) Prior Publication Data
US 2018/0274751 A1    Sep. 27, 2018

(30) Foreign Application Priority Data

Oct. 7, 2015   (CA) ...................... 2907269

(51) Int. Cl.
| | | |
|---|---|---|
| F21V 1/00 | (2006.01) | |
| F21V 7/00 | (2006.01) | |
| F21V 29/83 | (2015.01) | |
| F21K 9/61 | (2016.01) | |
| F21V 7/09 | (2006.01) | |

(Continued)

(52) U.S. Cl.
CPC ............. *F21V 7/0091* (2013.01); *F21K 9/61* (2016.08); *F21V 7/09* (2013.01); *F21V 13/04* (2013.01); *F21V 23/06* (2013.01); *F21V 29/83* (2015.01); *G02B 6/0096* (2013.01); *F21Y 2115/10* (2016.08)

(58) Field of Classification Search
None
See application file for complete search history.

(56) References Cited

U.S. PATENT DOCUMENTS 6,350,041 B1   2/2002   Tarsa et al.
8,445,010 B2 *  5/2013   Anderson ............ A61K 9/7084
                                                          424/449

(Continued)

FOREIGN PATENT DOCUMENTS

CA        2843575 A1     8/2015
DE  10 2011 015 407 A1  10/2012

OTHER PUBLICATIONS

See International Search Report Corresponding to PCT/CA2016/051166 dated Jan. 9, 2017.

(Continued)

*Primary Examiner* — Vip Patel
(74) *Attorney, Agent, or Firm* — Davis & Bujold PLLC; Michael J. Bujold

(57) ABSTRACT

A hollow light guide luminaire where a light source conveys light through a light ingress surface of a nominally hollow light guide with a narrow portion and a wide portion. The light guide provides means of transporting light via total internal reflection within the light guide from the light source positioned at one of the narrow portion or the wide portion to the other of the wide portion or the narrow portion wherefrom light is emitted from the light guide into the environment surrounding the luminaire.

20 Claims, 46 Drawing Sheets

(51) Int. Cl.
*F21V 13/04* (2006.01)
*F21V 23/06* (2006.01)
*F21V 8/00* (2006.01)
*F21Y 115/10* (2016.01)

(56) References Cited

U.S. PATENT DOCUMENTS

| | | | |
|---|---|---|---|
| 2011/0215701 A1 | 9/2011 | Tong et al. | |
| 2014/0347885 A1* | 11/2014 | Wilcox | F21S 8/061 |
| | | | 362/612 |
| 2015/0098239 A1* | 4/2015 | Benoit | F21K 9/232 |
| | | | 362/555 |
| 2017/0268733 A1* | 9/2017 | Johnston | G02B 6/0046 |

OTHER PUBLICATIONS

Written Opinion Corresponding to PCT/CA2016/051166 dated Jan. 9, 2017.

* cited by examiner

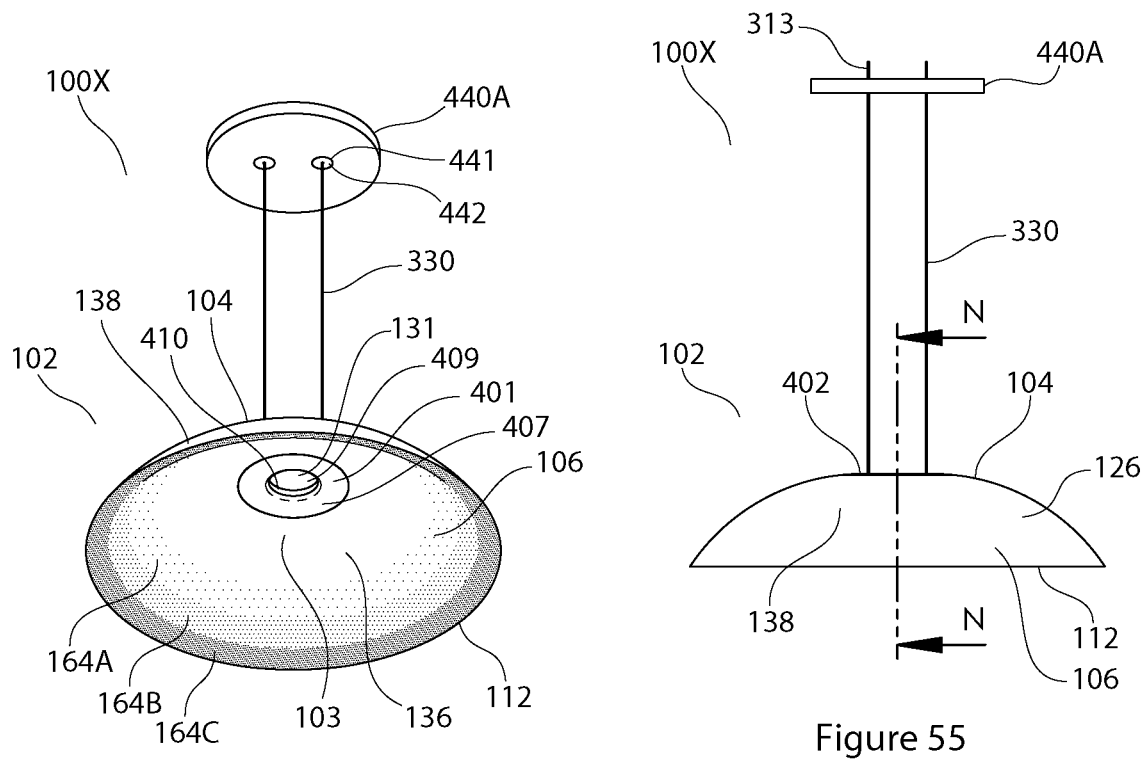
Figure 54
Figure 55
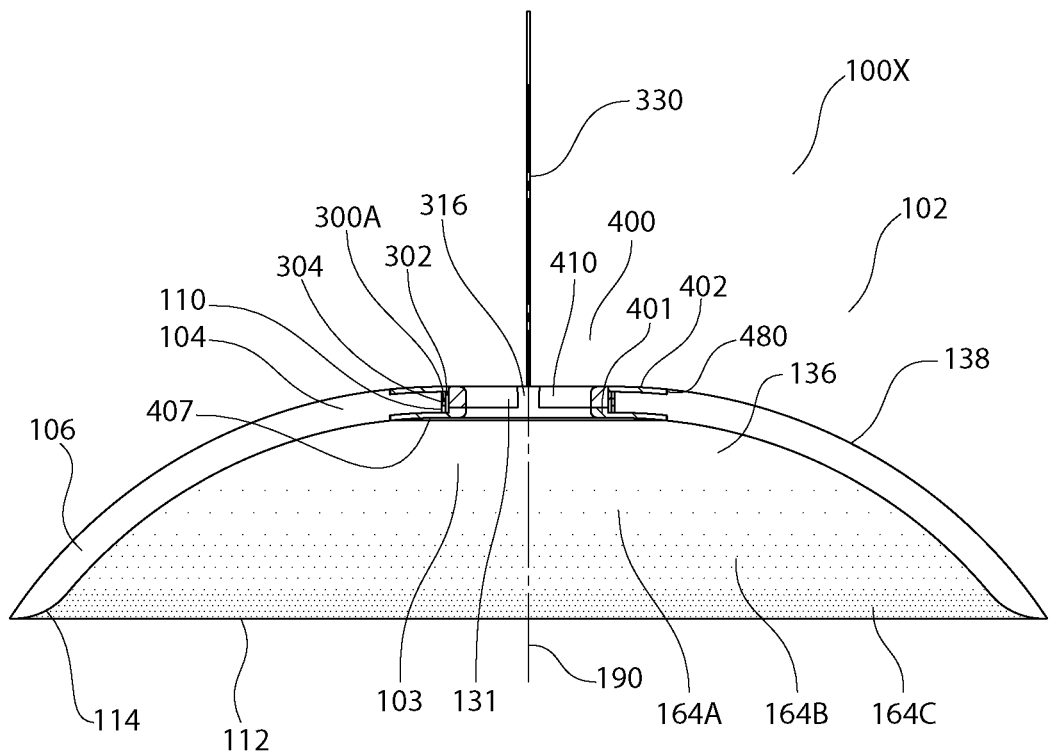
Figure 56

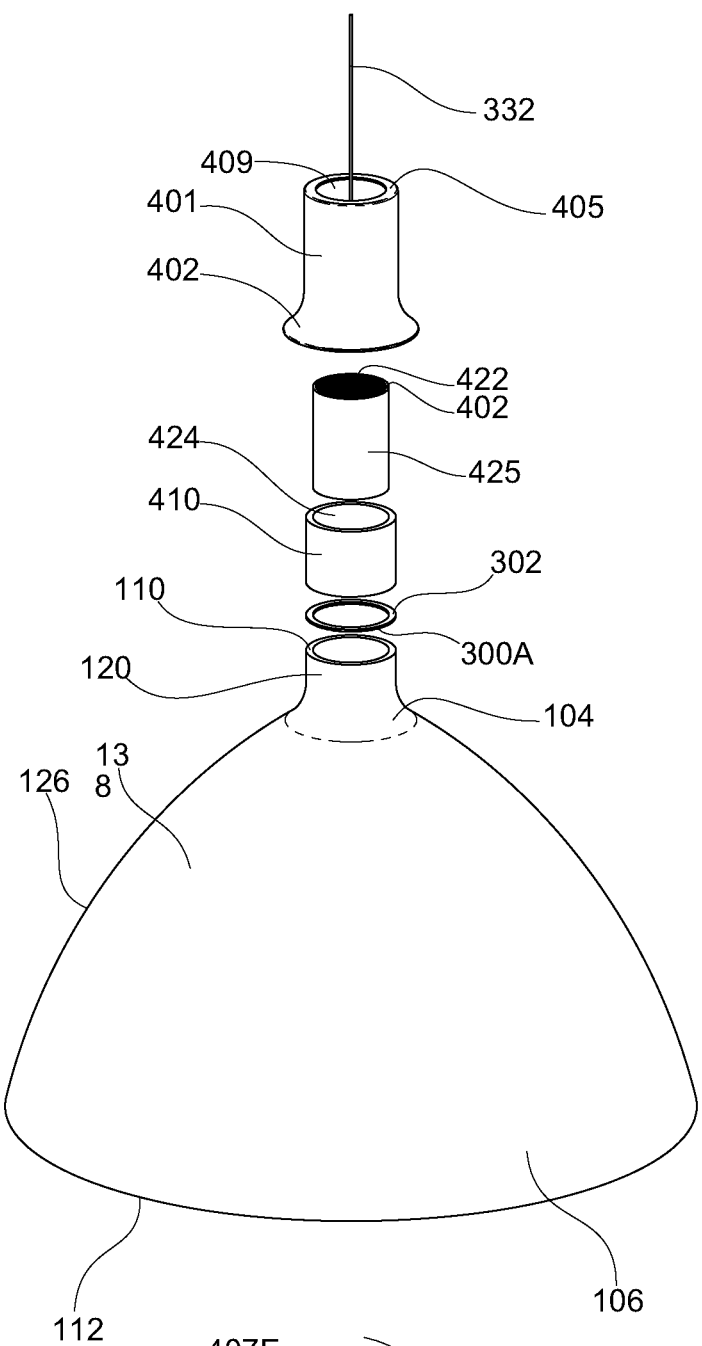
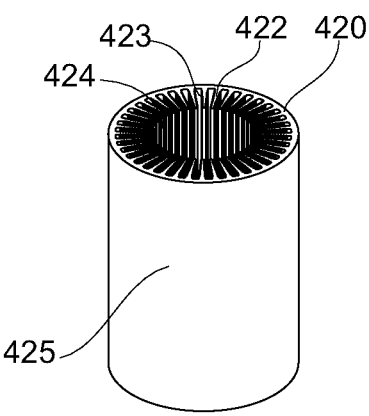
Figure 84
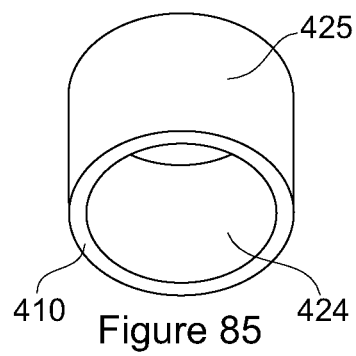
Figure 85
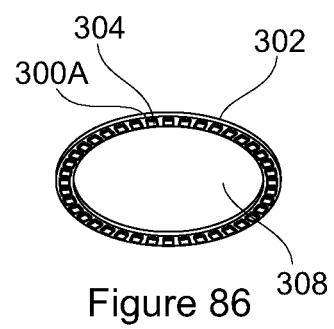
Figure 86
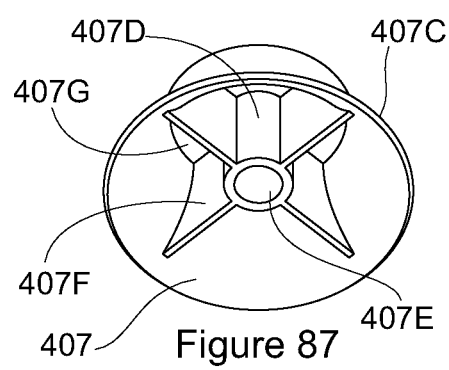
Figure 83
Figure 87

HOLLOW LIGHT GUIDE LUMINAIRE

FIELD

The present invention is a form of light guide technology, using a light source such as one or more light emitting diodes (LEDs), placed in the form of a luminaire.

BACKGROUND

Conveyance of light by means of a light guide, also known as a waveguide or a light pipe, employs the phenomenon of total internal reflection (TIR) to transport light through a medium that functions as a conduit for light by preventing the light to escape the medium. Extractors, in the form of perturbations of a surface or matrix of a light guide, function to allow light to exit the light guide. Typical light sources used in commercial applications of light guides are light emitting diodes, or LEDs, which are useful as they emit light from a compact planar emitting surface that can be directed into the edge of a light guide. Conventional light guides are flat and planar, and are generally unsuited for residential applications due to aesthetic preference.

SUMMARY

There is provided a luminaire where a light source conveys light through a light ingress surface of a nominally hollow light guide with a narrow portion and a wide portion. The light guide provides means of transporting light via total internal reflection within the light guide from the light source positioned at one of the narrow portion or the wide portion to the other of the wide portion or the narrow portion wherefrom light is emitted from the light guide into the environment surrounding the luminaire. Preferred embodiments resemble lamp shades or lighting diffusers commonly used and appreciated for their aesthetic.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 54 is a bottom perspective view of a twenty-fourth embodiment of a luminaire, showing twin cables supporting the luminaire from a ceiling canopy, the twin cables providing low-voltage power to the light source, shown as multiple curved PCBs mounted with a plurality of LEDs, whose emitting surfaces are oriented outward and into an annular light ingress surface of the hollow light guide.

FIG. 55 is a profile view of the luminaire of FIG. 54.

FIG. 56 is a section view along section N-N of FIG. 55.

FIG. 83 is a perspective exploded view of the thirty-second embodiment of a luminaire of FIG. 78, showing major components, with all other components removed for clarity.

FIG. 84 is a top perspective view of an interior, secondary heatsink shown in FIG. 83, fashioned as a cylinder on an exterior perimeter with heatsink fins directed inwards to an open channel.

FIG. 85 is a bottom perspective view of a direct heatsink shown in FIG. 83, fashioned as a cylinder.

FIG. 86 is a bottom perspective view of a PCB, mounted with an array of LEDs, shown in FIG. 83, fashioned in a circular shape with a large hole in the middle of the PCB.

FIG. 87 is a bottom perspective view of a support bracket, shown in FIG. 83, fashioned in a shape mating to a light guide of the embodiment, with a hole in a central boss disposed to receive a cable gripper, and apertures disposed to allow atmospheric passage divided by supporting ribs.

FIG. 93 is similar in respects to the description of the fourth embodiment of FIG. 17, and so numbered call-outs referring to those similar features have been removed for clarity from this figure, excepting those new features comprising the secondary electronic device and its integration with the luminaire.

DETAILED DESCRIPTION

Figure 1:
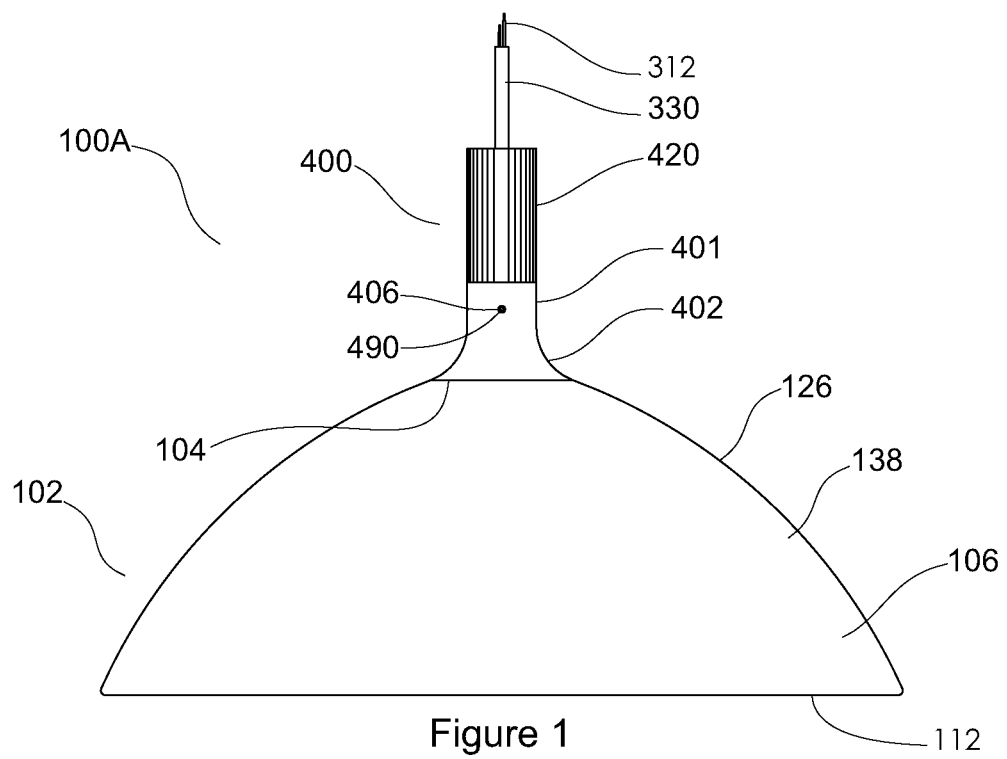
FIG. 1 is a side view of a first embodiment of the luminaire, showing a nominally dome shaped light guide, showing a reflective cowl flush to the exterior perimeter of the luminaire, extending from a light source housing connected to a supporting component.
Figure 2:
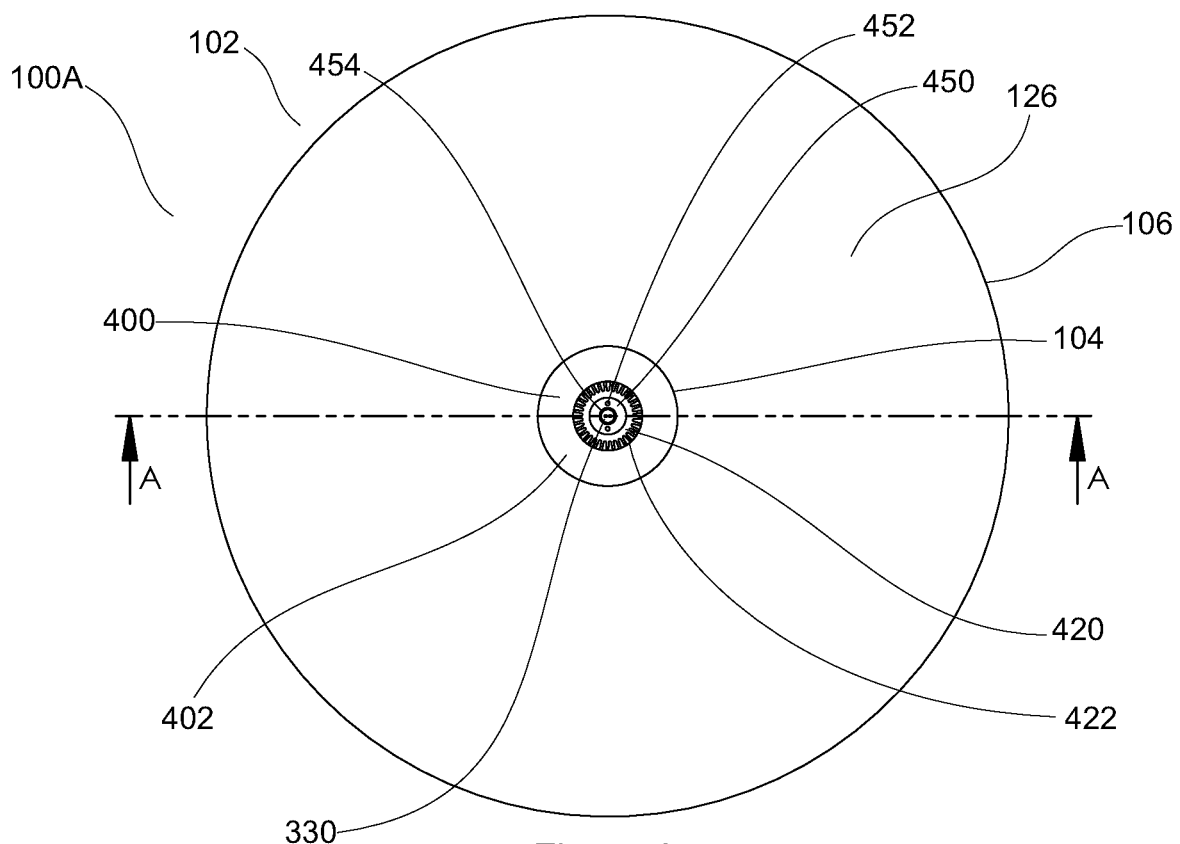
FIG. 2 is a top view of the first embodiment of the luminaire illustrated in FIG. 1.

A first embodiment generally identified by reference numeral 100, will now be described with reference to FIG. 1 through 5.

Structure and Relationship of Parts:

A first embodiment is a luminaire 100A comprised principally of a hollow light guide 102 in a nominally dome-like shape, with interior surfaces 124 and exterior surfaces 126, a LED 300A light source 300 within a housing assembly 400. The light guide 102 features a narrow portion 104, proximal to the LED 300A, and a proximal conduit 120 portion of the narrow portion 104 that extends toward the LED 300A such that the light emitting surface 304 of the LED 300A is adjacent to and directed toward a light ingress surface 110 of the light guide 102.

The light guide 102 has an interior hollow or cavity 103, such that the light guide comprises interior surfaces 124 and exterior surfaces 126. At the narrow portion 104, a convex interior portion 132 of an interior perimeter 124 transitions proximally to a nominally concave shaped interior surface, or concave interior portion 130, the concave interior portion 130 terminating at a proximal cavity terminus 128 proximal to the light source 300.

From the narrow portion 104, the light guide 102 expands distally and radially in form and size towards a distal wide portion 106 of the light guide 102, the cavity 103 also expanding in size, to an annular shaped distal terminus 112 of the light guide 102 at a distal extremity from the light source 300. The overall shape of the first embodiment is dome-like, where the convex interior portion 132 near the narrow portion transitions distally to a broad concave shape of the interior perimeter 124, and likewise the exterior perimeter 126. The distal terminus 112 is shown fashioned as a full-round, or bullnose, shape, however the distal terminus 112 could be flat without radius, or with a radius fashioned along the interior or exterior edge exclusively, or in any other manner of detailing for appearance or lighting effect. The dome shaped light guide 102 is, in the present embodiment, radially symmetric is all directions around an axis 190.

The present embodiment features glossy exterior surfaces 138, glossy interior surfaces 136 proximal to the light source 300, and perturbed interior surfaces 140 positioned on a portion of the interior perimeter 124 of the light guide 102 distal from the light source 300 and glossy interior surfaces 136.

The narrow portion 104 and proximal conduit 120 also feature a proximal recess 118 at an exterior portion where the portion of the housing 401 is positioned, where a cowl 402 extends from, whether it be an integral part of the housing 401 or an ancillary component, and rests within the proximal recess 118, the exterior of the cowl 402 mating flush with the exterior perimeter 126 of the light guide 102. A reflector 470 is positioned within the proximal recess 118, adjacent to the exterior perimeter 126 of the proximal recess 118. The reflector 470 may be a unique component or comprise part of the cowl 402 or housing 401. Likewise portions of the cowl 402 or housing 401 may be treated to have a reflective interior surface 404. Assembly means is shown as a fastening component 490, shown as a set-screw, joins a fastening portion 406, shown as a threaded hole, in the housing 401 to a fastening portion 122 in the light guide 102, fashioned as a hole or groove. Whereas this describes a typical assembly means, there are alternative methods of joining the housing 401 to the light guide 102, such as with adhesive or threading the housing 401 onto the light guide 102.

The housing assembly 400 is principally comprised of the housing 401 and the light source 300 and may include supporting elements, as shown in the present embodiment, that include a PCB 302 onto which the LED 300A is fixed, joined at its posterior surface 306 to a direct heatsink 410 with heat transfer means 460, such as thermal grease, a heat transfer tape or pad, between them; fastening means is not shown and typically consists of hardware or clips, however double sided heat transfer tape functions as assembly means; the direct heatsink 410 is shown comprising part of the housing 401, from which a stem 412 extends, fastened to an interior perimeter 424 of a secondary heatsink 420, featuring heatsink fins 422 to effectively dissipate heat produced by the LED, the fastening means between the stem 412 and the secondary heatsink 420 typically being thread (not shown) or thermally conductive adhesive (not shown), the stem having an interior shaft 414 to receive a power conduit 330, which is fixed by means of a vice 450 that compresses a strain relief collar 454 and strain relief gland 456 at the stem, by threading the vice 450 by way of a vice key 452 into thread (not shown) in the interior perimeter 424 of the secondary heatsink 420. Conductive wires 312 extend from the power conduit 330 through the interior shaft, and through a wire access portion 416 in the housing 401, in the form of a hole, slot and the like, where the exposed terminal 314 of a conductive wire 312 is connected to a terminal 314 on the PCB 302, providing power to the light source 300. This description of the housing assembly 400 is intended to illustrate an operative design and effective assembly, but is not limited to the present description.

The present embodiment shows the light guide 102 suspended downward from the housing assembly 400 from a power conduit 330, fashioned as a cable 330A, to fashion a suspended luminaire, however the light guide 102 may be oriented upwards from the housing assembly 400, supported on a power conduit 330 fashioned as a rigid pipe 330B, fixed to a supporting base (not shown) to fashion a standing lamp. Likewise, the housing assembly 400 may be fixed to a wall, and the light guide 102 may extend from there into a room or hallway in a sideways orientation. The illustration and description is intended to describe the utility of the present embodiment and is not meant to be limiting in its orientation.

Operation:

A light guide 102 is fashioned to conduct light from a light source 300 positioned at a light ingress surface 110 at a narrow portion 104 of the light guide 102 towards a distal wide portion 106 of the light guide 102, where light passes into the light guide 102 at the light ingress surface 110, illustrated as a ray of light 200, and reflects off of glossy interior surfaces 136 and glossy exterior surfaces 138 by way of total internal reflection (TIR), until the ray reaches a distal wide portion 106 area of extractors 134, shown in the present embodiment as a perturbed interior surface 140 area. The light guide 102 effectively conducts light from an intense, compact light source 300 to a distal area with a relatively large surface area where the light can be extracted from the light guide by way of extractors 134, such that the light exits the light guide in many directions with much less intensity given the larger surface area the light emanates from, despite minimal losses of light from passing through the light guide. The perturbed interior surface 140 is preferred to a perturbed exterior surface 142, as seen in other embodiments, as the interior surface is less affected by dust or smudges or scratches from handling; a perturbed matrix 160 of the material of the light guide 102 also features as an alternative form of extraction in other embodiments. Whatever the variation, the extractors 134 are positioned in a distal wide portion 106 of the light guide 102 to provide a large surface area where light can be extracted with less intensity per area and with less glare than would be observed from a direct source or narrow light guide.

Figure 3:
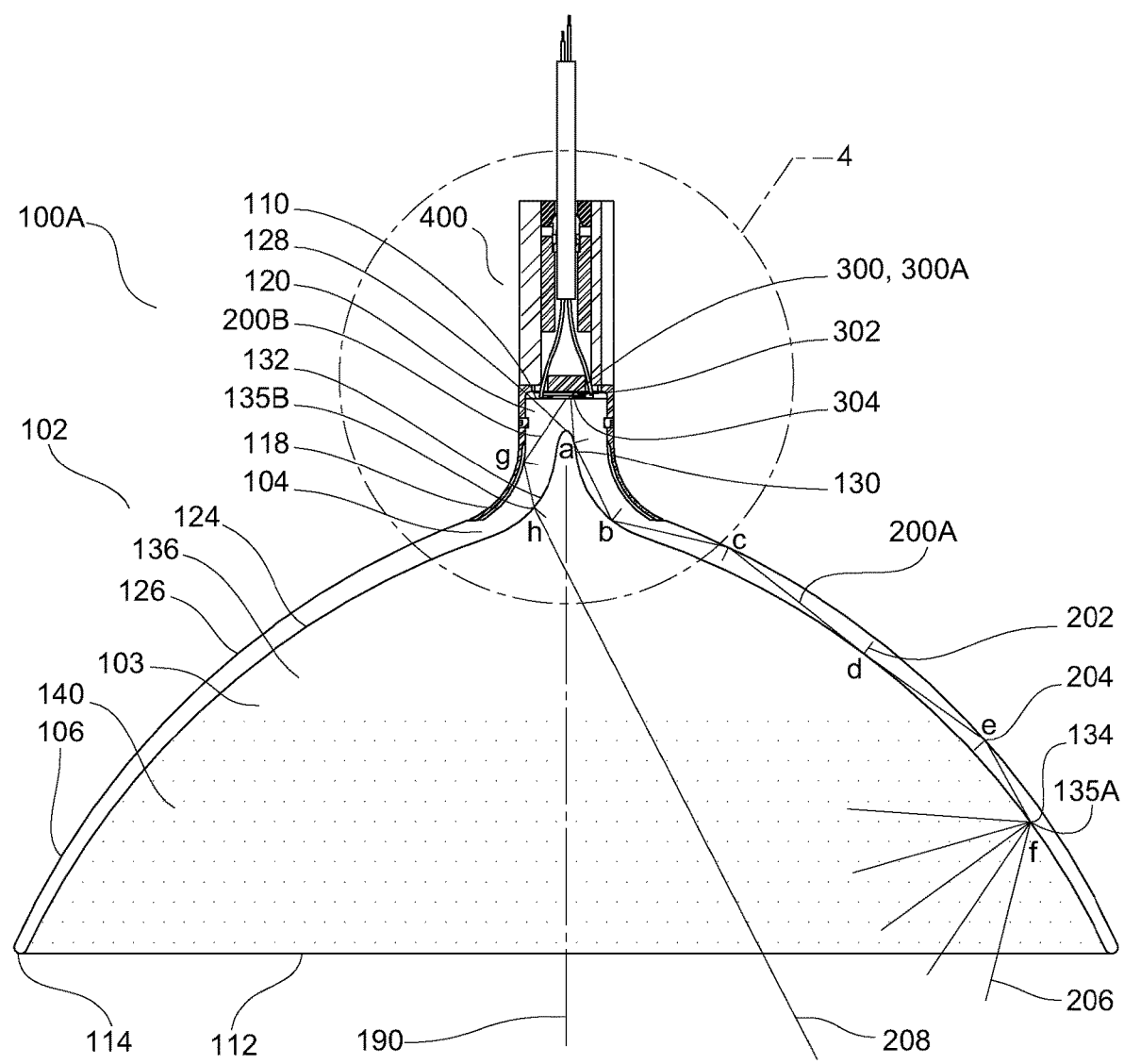
FIG. 3 is a section view along section A-A shown in FIG. 2, showing an interior perimeter of the light guide, and extractors in the light guide at a distal interior surface of the light guide; an interior portion of the light guide proximal to the light source features an ovoid concave shaped surface at the proximal end of the interior perimeter to facilitate directing light distally via total internal reflection; a recess at a narrow exterior portion of the luminaire is disposed to facilitate making a reflective cowl flush to the exterior perimeter of the luminaire.
Figure 4:
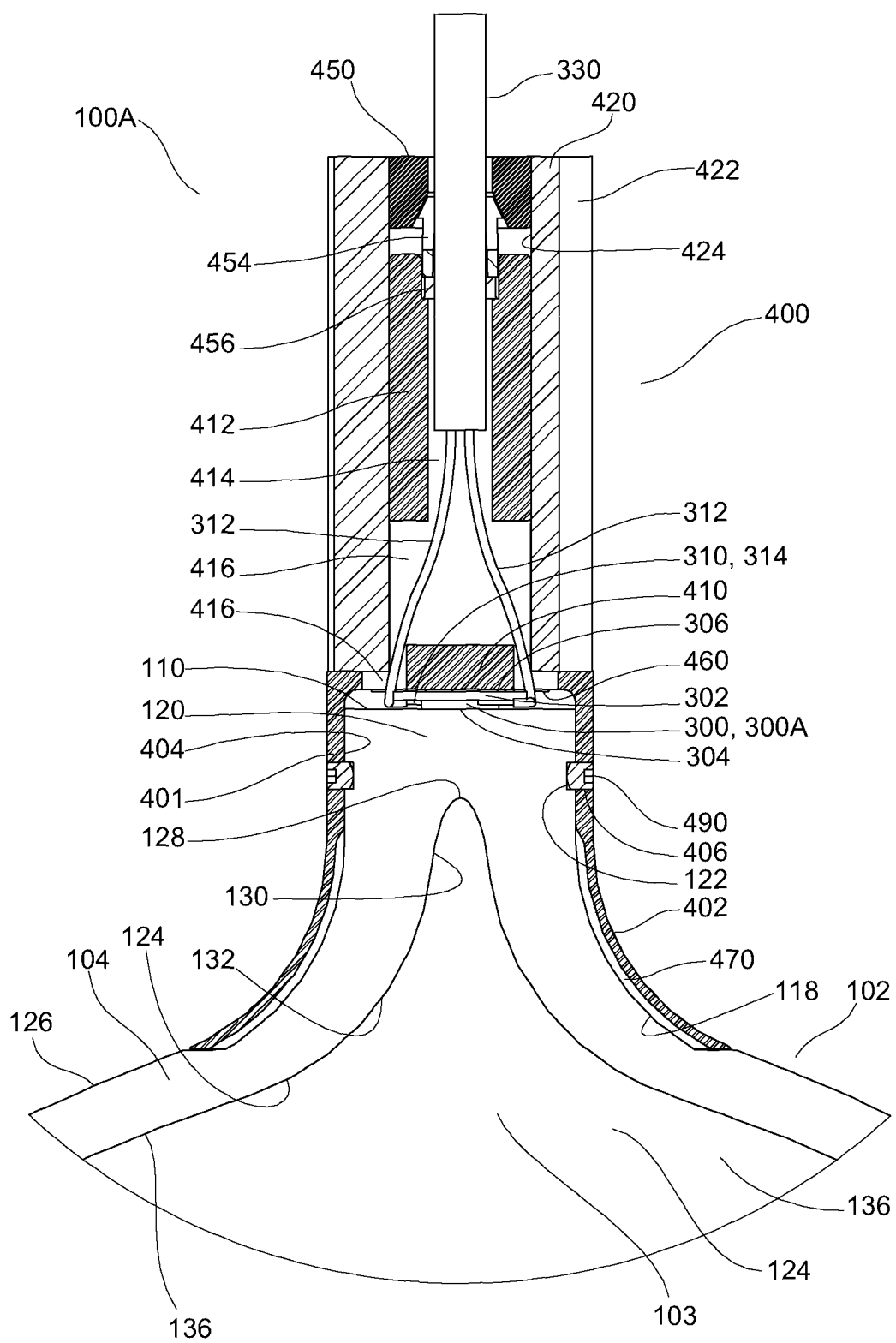
FIG. 4 is a detail view in section of the electrical and light source housing, cowl, assembly and support portions of the first embodiment, referenced in FIG. 3.
Figure 5:
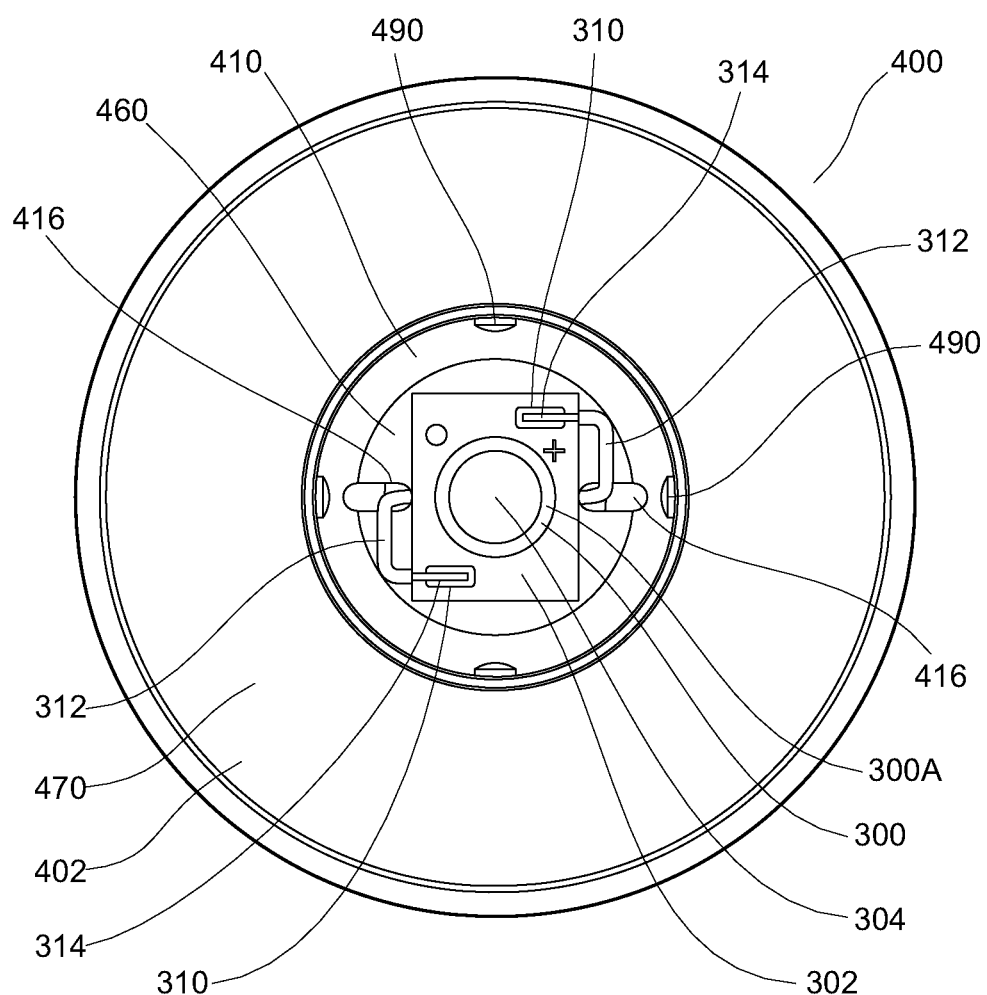
FIG. 5 is a bottom view of the first embodiment illustrated in FIG. 1, with the light guide removed, providing a view of a light source assembly.

As illustrated in FIG. 3, the light emitting surface 304 of the LED 300A is placed adjacent to a light ingress surface 110 of the light guide 102, generally larger than the LED 300A, permitting the light to travel from the light source 300 into the light guide 102 with a minimum of losses. The light guide 102 has interior surfaces 124, having portions that are glossy interior surfaces 136, and exterior surfaces 126 that are glossy exterior surfaces 138 to facilitate the conduction of light through the light guide by way of TIR; a distal portion of an interior perimeter 124 is a perturbed interior surface 140 to facilitate the extraction of light from the light guide 102 and into the environment surrounding it. A portion of the interior perimeter 124 within the proximal conduit 120 is a narrow, glossy and reflective, nominally concave interior portion 130 that terminates the interior surface at a proximal cavity terminus 128 proximal to the light source 300. The shape of the nominally narrow ovoid form of the concave interior portion 130 and proximal cavity terminus 128 provides a changing degree of surface normals 202, a 'normal' being a perpendicularity to the surface, from the proximal cavity terminus 128 toward a convex interior portion 132 that joins the concave interior portion 130 to the major part of the interior perimeter 124, the surface normal 202 (not shown) changing from an orientation in line with axis 190 of the light guide 102 at the proximal cavity terminus 128, to normals 202 (not shown) that transition in a short distance along the concave interior portion 130 towards perpendicular to the axis 190. The transition of the normals 202 provide ideal surface angles for the majority of the light striking the interior perimeter 124 to reflect off of the surface of the concave interior portion 130 by way of TIR, such as indicated by position 'a' in FIG. 3. Likewise, convex interior portion 132 is disposed to reflect rays that strike it further distally, as shown at position 'b'.

Due to geometric conditions of the rays of light 200 emanating from the light source 300, and the constraints of the geometry of the narrow portion 104 (namely the exterior surfaces 126 of the narrow portion 104 and proximal conduit 120, and interior surfaces 124 such as a concave interior portion 130 and a convex interior portion 132), a ray of light 200 may strike the interior perimeter 124 of the light guide 102 at an angle less than the critical angle and penetrate through the interior perimeter 124 into and through the interior cavity 103 as an emanating ray 208. This effect may not be entirely undesirable for aesthetic reasons, as the luminaire 100A would appear to have a glow from its center, despite that the majority of the light travels through the light guide 102 and is emitted by extractors 134 therefrom.

It is undesirable, however, to have light escape exteriorly from proximal portions of the narrow portion 104 or the proximal conduit 120 as excessive light escaping from those areas proximal to the light source and with little surface area for extraction could cause glare. To prevent glare, a housing 401 and cowl 402 can be utilized to prevent light from exiting the luminaire 100A exteriorly at a narrow portion 104 or proximal conduit 120.

Control over the angles of rays of light 200 from the light source 300, like an LED 300A, can be achieved by collimating the light through a collimating proximal conduit 130, or by using a directional beam light source such as a laser diode 300D. With control over the direction of light from the light source 300, it is easier to design the light guide 102 to achieve a higher degree of total internal reflection, and less light escape, by positioning the surfaces of the light guide 102 such that the directed rays of light 200 strike the surfaces above the critical angle to their normals 202, the circumstance that causes the phenomenon of total internal reflection, thereby improving the efficacy by which light is transported through the light guide 102 to the wide portion 106. Lasers provide superior control over the vectors a ray of light emanating from it will travel, and it is possible to have a minimum housing 401 or cowl 402, or eliminate them completely, as this vector control can prevent light form escaping the proximal narrow portion 104 or proximal conduit 120.

It is beneficial that the concave interior portion 130 be ovoid in shape, where the ovoid is narrow along the longitudinal axis of the ovoid, coincident with the axis 190, with the apex of the ovoid at the proximal cavity terminus 128, proximal to the light source 300. The concave interior portion 130, fashioned as an ovoid thus described, features surface normals 202 that shift over a short lateral distance from being parallel to the axis 190 and perpendicular to a planar light emitting surface 304 of a light source 300 at the proximal cavity terminus 128, to perpendicular to the axis 190 and parallel to the light emitting surface 304, thereby making more surface available for TIR as the surface normals tend to be a angles greater than the critical angle the closer they are to perpendicular to the principal axis 190 (or, more precisely, parallel to the plane of light ingress surface 110).

The concave interior portion 130 may be 'nominally ovoid' as the feature may take the form of an oval, a hyperbola, a faceted ovoid shape, be micro-faceted, a nominally conical shaped surface, or having Fresnel type facets, and the like, whichever solution provides the best continuation of light via TIR toward the wide portion 106 of the light guide, given the particular geometry of the light output of the light source 300, the desired design of the luminaire 100A, the desired lighting effects, and manufacturing constraints. Likewise, a proximal cavity terminus 128 is ideally a narrow round or point to facilitate TIR around it, however limitations in tooling and light guide material may dictate a minimum size to the proximal cavity terminus 128 and, for purposes of clarity, are shown of legible size in embodiments disclosed herein.

A LED 300A typically has a light distribution approximately within 60 degrees from perpendicular in all radial directions (i.e. a 120 degree fan-shape in a profile view) from a light emitting surface 304 of the LED 300A, making it a suitable light source 300 to direct light from a planar light emitting surface 304 into a planar light ingress surface 110 of a light guide 102, the light emitting surface 304 and the light ingress surface 110 being placed adjacent to each other to optimize the transfer of light from the LED 300A into the light guide 102.

Figure 46:
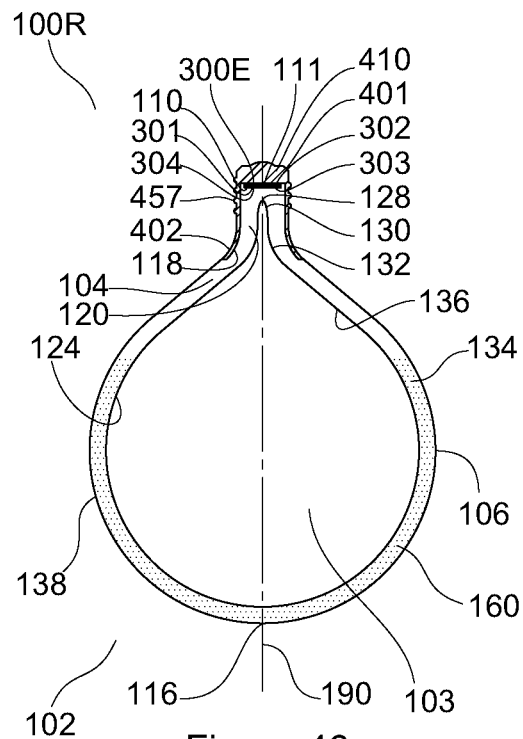
FIG. 46 is a section view along section L-L in FIG. 45, revealing large hollow cavity within the light guide, having a large distal complex of extractors within the matrix of the light guide, with a light source of super-luminescent diodes mounted in an may to a PCB within the housing.
Figure 48:
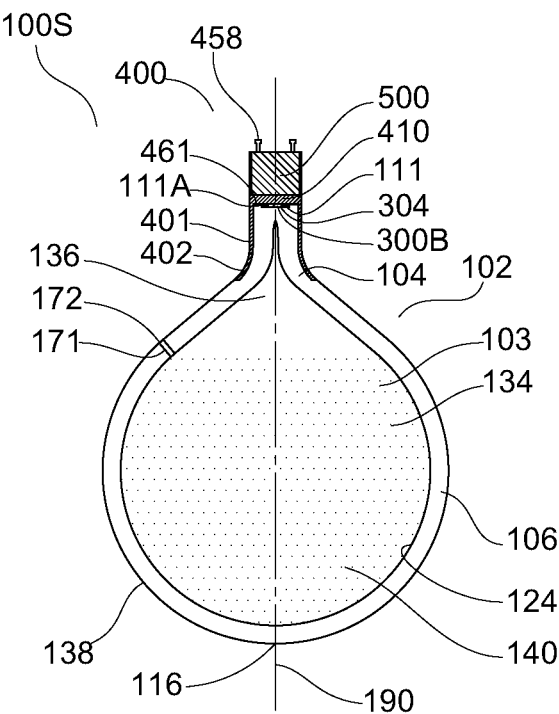
FIG. 48 is a section view along section M-M in FIG. 47, revealing large hollow cavity within the light guide, showing the hole and treated region of the interior surfaces comprising the interior cavity.

The light source 300 and its light emitting surface 304 may be placed in a recessed light ingress surface 111 at the distal end of a light-well 111A in the proximal end of the light guide 102 to further improve the direct transfer of light (as seen in FIG. 46 and FIG. 48), as light is trapped in the light well 111A and directed more effectively toward the recessed light ingress surface 111, particularly if the proximal opening of the light well 111A is blocked by a PCB 302 or another reflective object.

The description of the light source 300 being a LED 300A is illustrative of the means of producing effective light and is not a limiting source of light; the light source 300 may alternatively be an array of LEDs 300A, a Chip-on-Board 300B (COB) LED assembly, an OLED 300C, a laser diode 300D or array of laser diodes 300D, a super-luminescent diode 300E or array of super-luminescent diodes 300E, or some other means that effectively directs light into the light guide 102.

FIG. 3 depicts a ray of light 200A that travels from the light emitting surface 304 of the light source 300, adjacent to the transparent light ingress surface 110 of the light guide 102, through the light ingress surface 110 and into the matrix, or transparent material, comprising the light guide 102. The ray of light 200A is conducted within the light guide 102 from a narrow portion 104 of the light guide toward a distal, wide portion 106 of the light guide 102, by means of internal reflection 204 against glossy interior surfaces 136 and glossy exterior surfaces 138, as illustrated by positions 'a', 'b', 'c', 'd' and 'e' in FIG. 3. Total internal reflection occurs when the ray of light 200A strikes a glossy surface, such as glossy interior surface 136 and glossy exterior surface 138, at an angle greater than the 'critical angle' of incidence from perpendicularity indicated by the normal 202 to the surface, as described in the specification.

Figure 65:
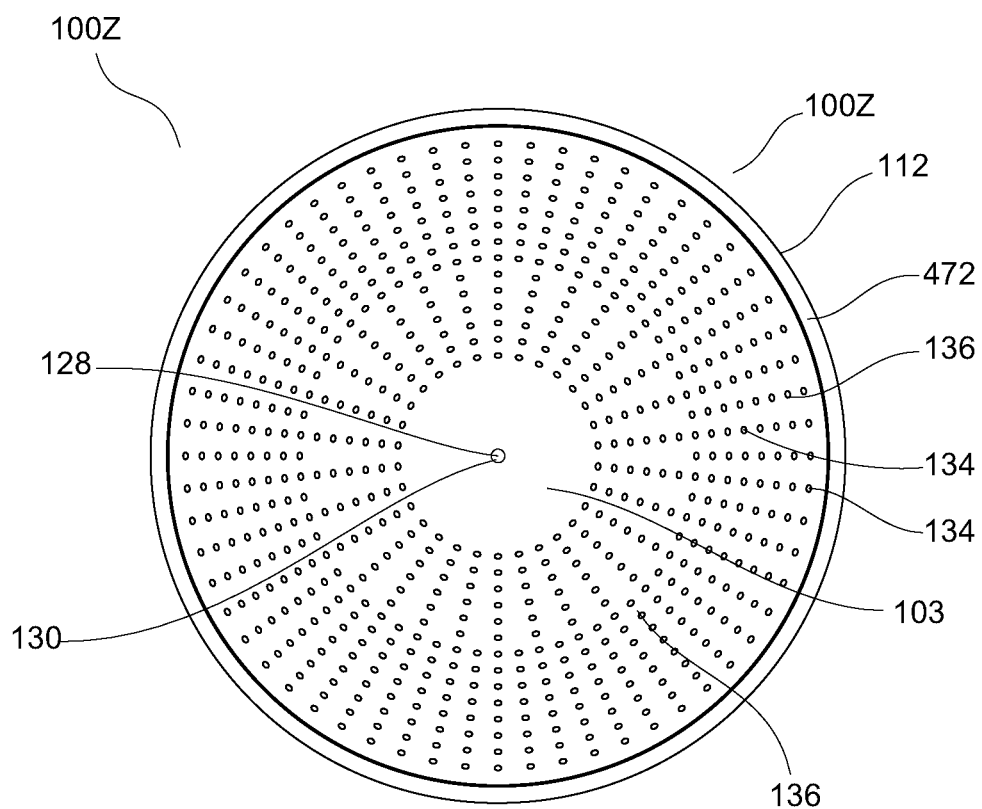
FIG. 65 is a bottom view of FIG. 64.
Figure 66:
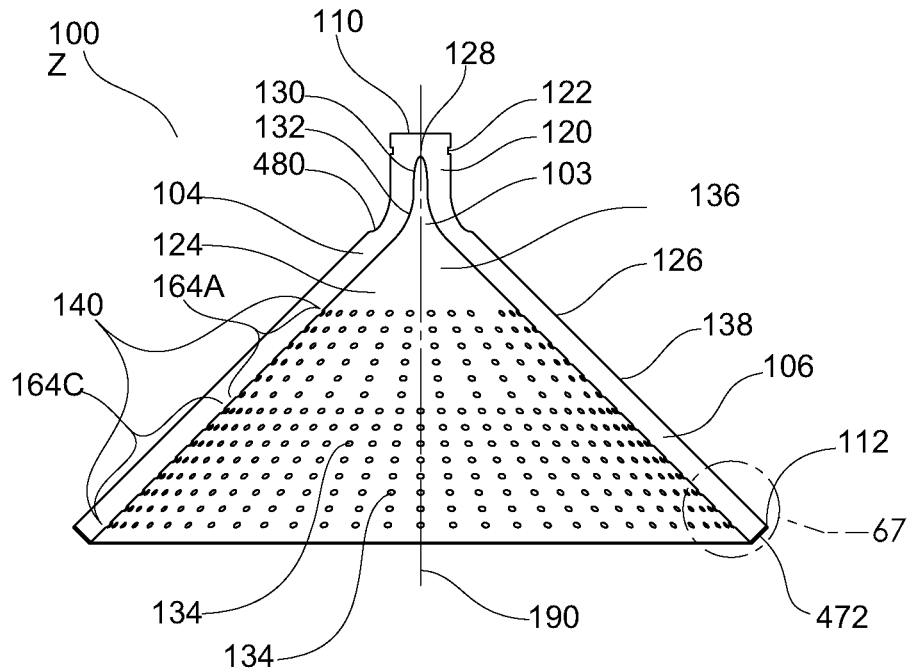
FIG. 66 is a section view along section P-P of FIG. 64, showing a proximal, less dense area of extractors, and a distal, extractor area of greater density.
Figure 67:
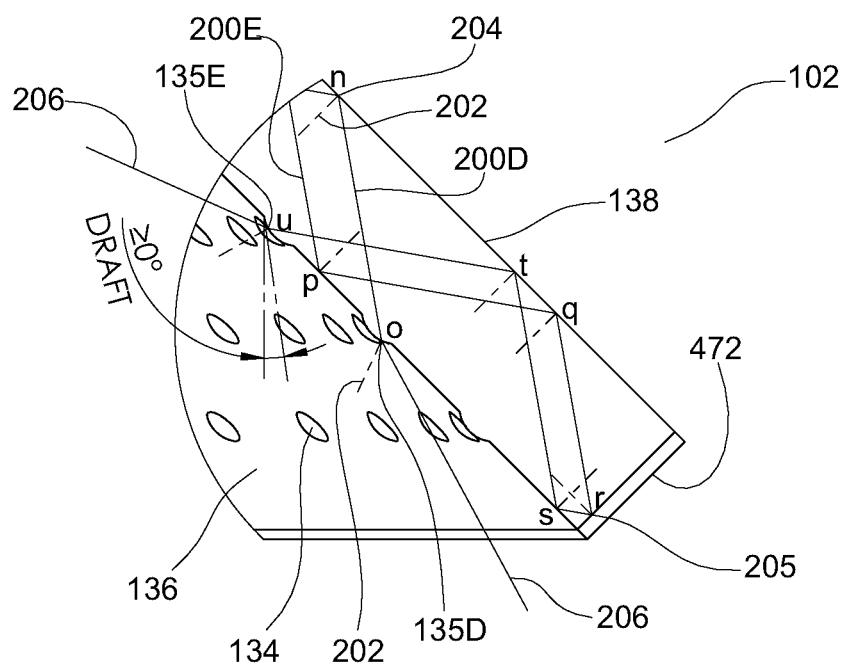
FIG. 67 is a detail view of a portion of FIG. 66, showing the conduction of rays of light to two different extractors and their effect.

When the ray of light 200A strikes an extractor 134 at position 'f' in a perturbed interior surface 140 portion of the light guide 102, the extractor causes the ray of light to exit the light guide 102 in an extraction 135A as an extracted ray 206 and exit the light guide 102 into the surrounding environment. The design of an extractor 134 effects the behavior of extraction, and with a diffuse extractor 134 the ray may burst into multiples extracted rays 206, as illustrated in FIG. 3, or exit as a single extracted ray 206, possible with a lensed variant of an extractor 134 (as shown in FIG. 65-FIG. 67).

A proximal conduit 120 portion of the narrow portion 104 facilitates the conduction of light from the light source 300 through the light guide 102 within an opaque housing assembly 400 that conceals the light source 300, the source of the light at the light emitting surface 304, portions of the narrow portion 104, and the other electrical components or otherwise non-aesthetic components desired to be concealed from view. The proximal conduit 120 permits a ray of light 200 to travel through an extended portion of the narrow portion 104 to conduct light distally through the light guide 102.

The opaque housing 401 surrounds the light source 300 and the proximal end of the light guide 102 around the light ingress surface 110 and conceals the source of the light from the view of an observer in the environment exterior of the luminaire 100A. As illustrated in the detail section view FIG. 4, the proximal conduit 120 is covered by a cowl 402, an opaque portion of the housing 401, that conceals a reflector 470 disposed to reflect any light that may escape the light guide 102 at the narrow portion 104 and direct it toward the wide portion 106. The cowl 402 and the reflector 470 sit within a proximal recess 118 of the narrow portion 104 such that the exterior of the cowl is flush to and blends with the exterior perimeter 126 of the light guide 102 for aesthetic reasons. It is desirable to have a reflective interior surface 404 on a cowl 402 or housing 401 not serviced by a dedicated reflector 470, and the reflection may be facilitated by material, treatment or coating or the like.

Though the light guide 102 is disposed to effectively transport light to a distal wide portion 106, it may not always be complete in this transport, as geometry of both the light guide 102 and the light source 300 may predicate angles where light would escape from exterior surfaces 126 of the narrow portion 104, therefore the reflector 470, housing 401 and cowl 402 are disposed to reflect light back into the light guide 102 where it escapes therefrom. Therefore, as illustrated in FIG. 3, a ray of light 200B striking the exterior perimeter 126 of the narrow portion 104 at position 'g' at an angle less than the critical angle is reflected back within the light guide 102 by the reflector 470, which otherwise would have exited the light guide 102 at the narrow portion 104, in full or in part. FIG. 3 also shows a continuation of the ray of light 208 reflecting from position g to position h, where it exits via extraction 135B the light guide 102 as a refracted ray of light 208 not by means of a extractor but by means of normal transmission as the ray of light 200B struck the interior perimeter 124 at an angle of incidence less than the critical angle. Though the ray of light 208 exited in this manner, it is not undesirable as the light exits the light guide 102 from an interior center portion of the luminaire 100A within the interior cavity 103 of the light guide 102, where the intensity would be concealed from view from most vantages by the light guide 102 itself, when observed by a viewer within the environment exterior of the luminaire 100A.

The reflective materials of the reflective interior surfaces 404 and reflector 470 are provided to accommodate the prevention of the display of light at the narrow portion 104 to an exterior viewer, should light not internally reflect thereat, as may occur. The description of total internal reflection at positions a through e, reflection at position g, and exit of light by means of an extractor 134 at position for by natural transmission at position g is intended to be illustrative and not limited to these combinations exclusively.

An embodiment as described conducts a significant amount of light by way of internal reflection 204 toward a distal wide portion 106 of the light guide 102, where the light escapes from a perturbed interior surface 140 at a distal portion of the light guide 102.

Variations:

A second embodiment generally identified by reference numeral 100B, will now be described with reference to FIG. 6 through FIG. 10.

Figure 6:
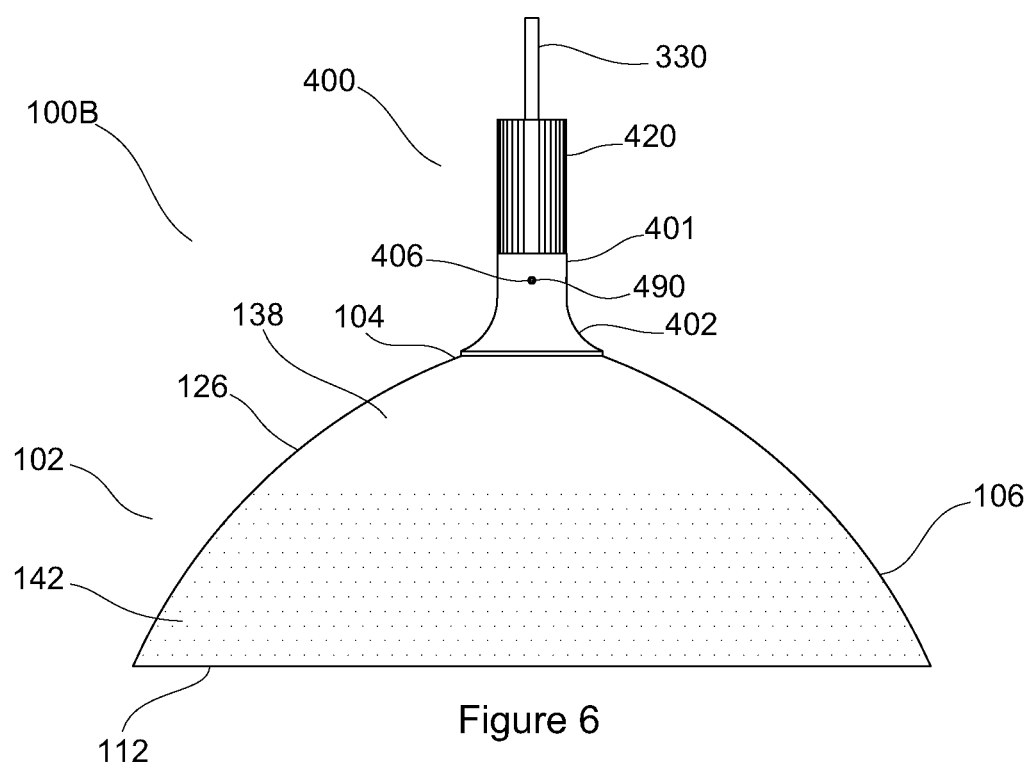
FIG. 6 is a side view of a second embodiment of the luminaire, showing a nominally dome shaped light guide, with extractors in the light guide at a distal exterior surface of the light guide, with a reflective cowl and supporting component fixed over an exterior perimeter of the luminaire.
Figure 7:
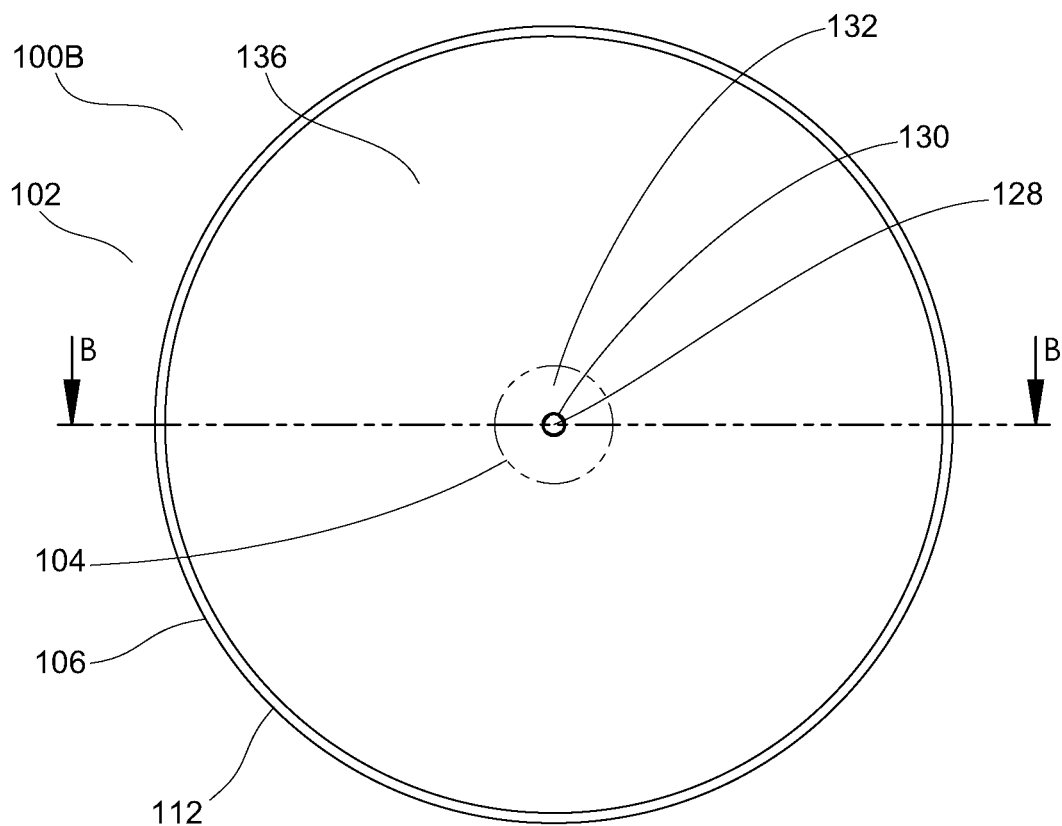
FIG. 7 is a bottom view of the second embodiment of the luminaire illustrated in FIG. 6.
Figure 8:
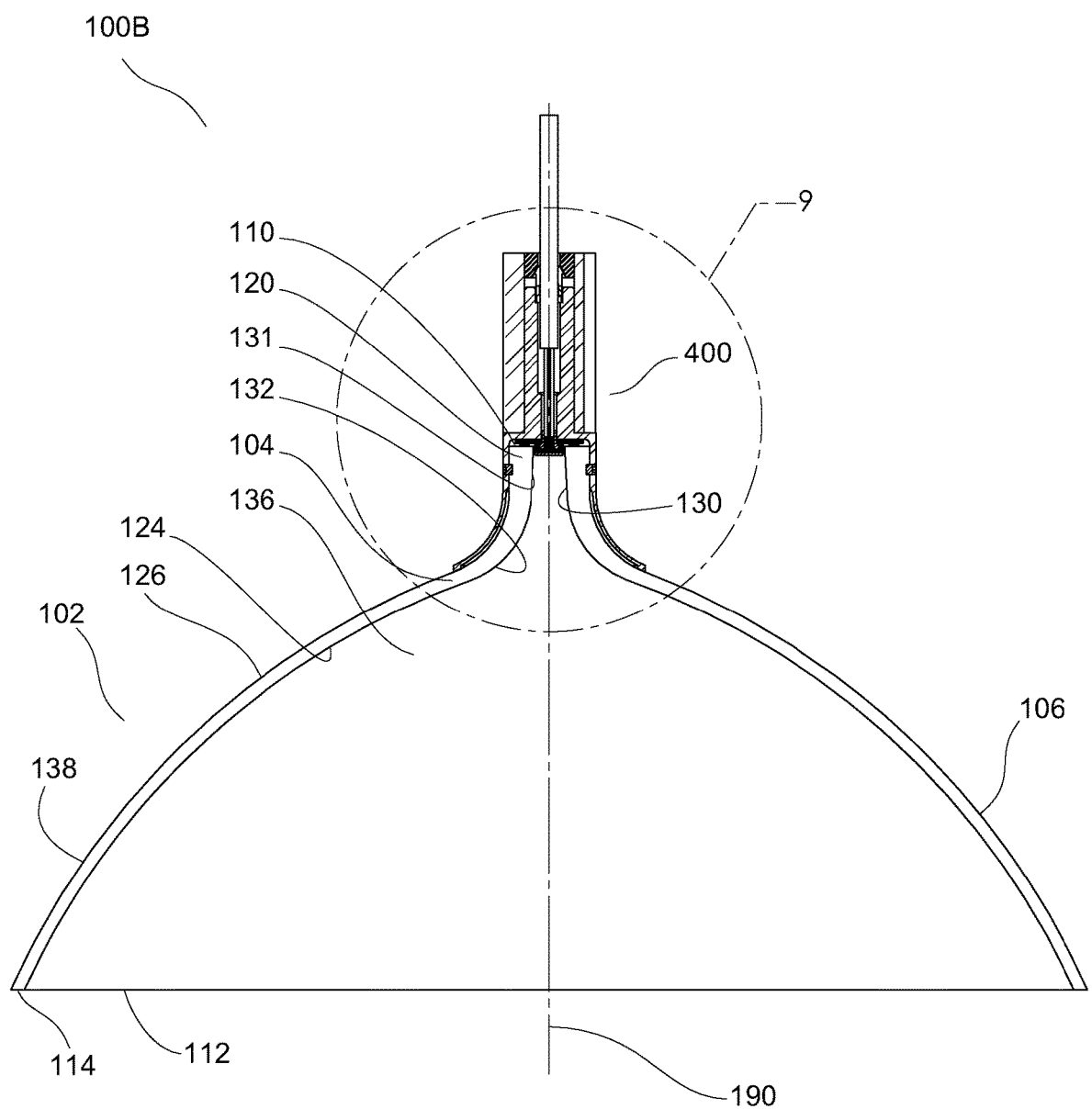
FIG. 8 is a section view along section B-B of the second embodiment of the luminaire illustrated in FIG. 7, revealing the interior perimeter of the light guide.
Figure 9:
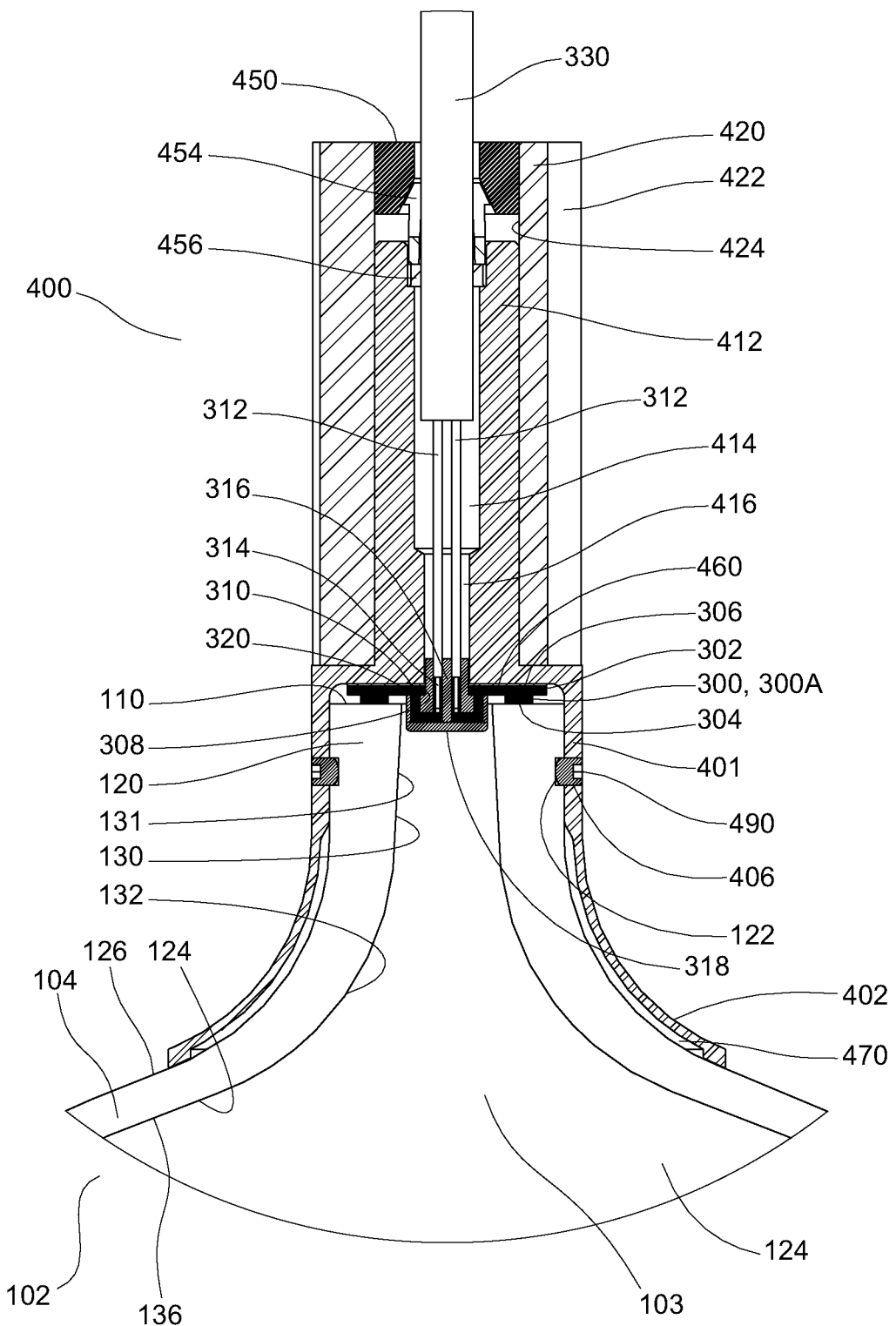
FIG. 9 is a detail view in section of the electrical and LED housing, cowl, and assembly and support portions of the second embodiment, the detail location illustrated in FIG. 8.
Figure 10:
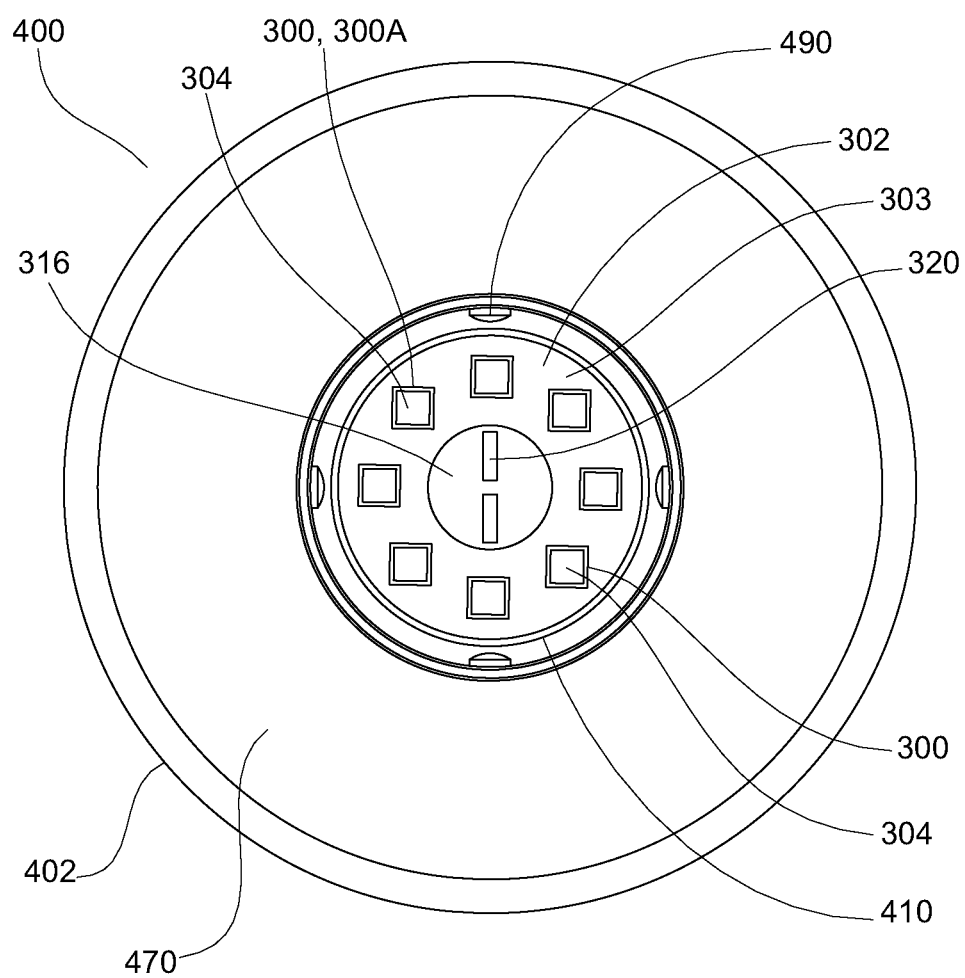
FIG. 10 is a bottom view of the second embodiment illustrated in FIG. 6, with the light guide removed, providing a view of the LED assembly.
Figure 11:
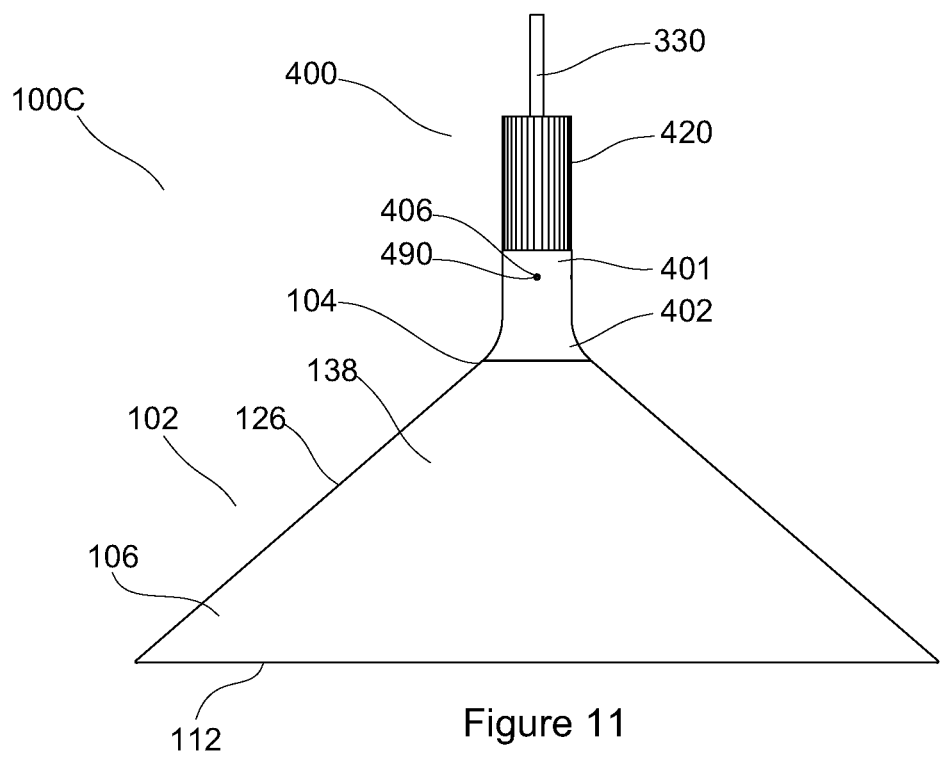
FIG. 11 is a side view of a third embodiment of the luminaire, showing a nominally cone shape light guide.

The second embodiment features an alternative variation of the light guide 102 with a convex interior portion 132 that continues as a channel 131 through the proximal conduit 120 of the narrow portion 104, without a proximal cavity terminus 128, and creating a hole as an extension of the cavity 103 in the light ingress surface 110 as depicted in FIGS. 8 and 9. The geometry of the light guide 102 works effectively with circular LED arrays 300A that comprise a light source 300. The channel 131 may be nominally angled in form to facilitate TIR and provide draft for release of parts from a mold in injection molding, though the channel 131 may otherwise be a straight tube. As depicted in FIG. 10, a PCB 302 is circular in fashion with multiple LEDs 300A positioned in a circular array on the PCB 302. The concave interior portion 130 can be coated with reflective materials to facilitate reflection of rays of light 200 (not shown) toward the wide portion 106, or lined with an internal reflector 470 (not shown) within the cavity 103. Light directed through the light guide 102 toward the wide portion 106 can be extracted at a distal perturbed exterior surface 142 as depicted in FIG. 6. An anterior face 303 of the PCB 302 may be highly reflective to reflect scattered incident light distally toward the light guide, illustrated in FIG. 10.

An isolator 316 with conductors 320 passes through a hole 308 in the PCB, as shown in FIG. 9, to provide power to the LEDs 300A where conductive wires 312 connect at terminals 314 at the conductors 320 that connect to electrical contacts 310 on the conductive side of the PCB 302. The cavity 103 in the light guide 102 provides space for the placement of the isolator 316 and access to an isolator access cap 318 to access the conductors 320, electrical contacts 310, terminals 314, or the conductive wires 312, or remove the isolator 316, as required, through the cavity 103, and through the wide portion 106, without requiring the complete disassembly of the housing assembly 400.

The second embodiment shows a variation without a proximal recess 118, so that the cowl 402 and reflector 470 is fitted over and not flush with the exterior perimeter 126 of the light guide 102, a variation that provides more available space within the narrow portion 104 for a ray light 200 to travel unimpeded, and provides a difference in appearance in the assembly of the housing assembly 400 and the light guide 102 from other embodiments of the luminaire 100B with a flush assembly.

Features of embodiment variations can be mutually exclusive, such that any embodiment may have extractors 134 on either the interior surfaces 124 or exterior surfaces 126, or both, have extractors 134 within the perturbed matrix 160, or not, be fashioned with or without a proximal recess 118, and be fashioned with a single LED 300A or a LED 300A array used with a light guide 102 with a proximal cavity terminus 128, or with an LED 300A array and an interior channel 131 that extends through the light ingress surface 110, and the like. The embodiments are illustrative of variations of features that are not necessarily bound together exclusively.

Figure 12:
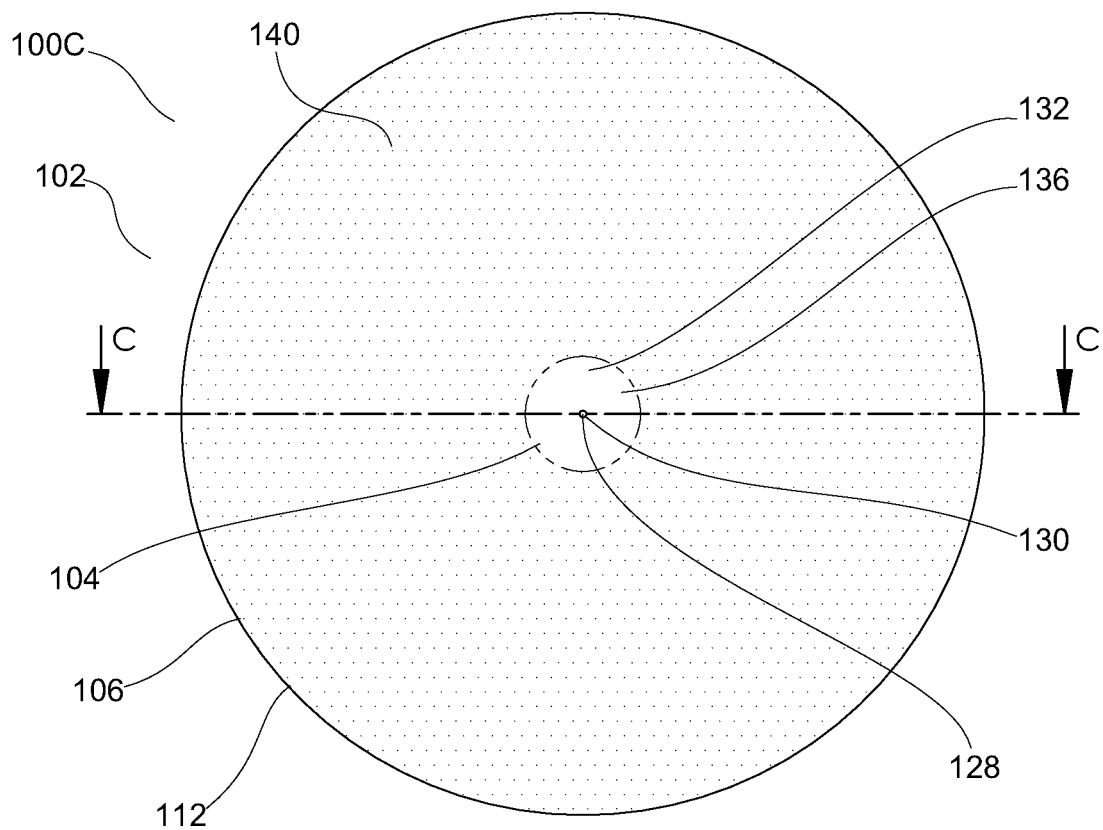
FIG. 12 is a bottom view of the third embodiment of the luminaire illustrated in FIG. 11, showing surface extractors over the majority of the interior surfaces of the light guide.
Figure 13:
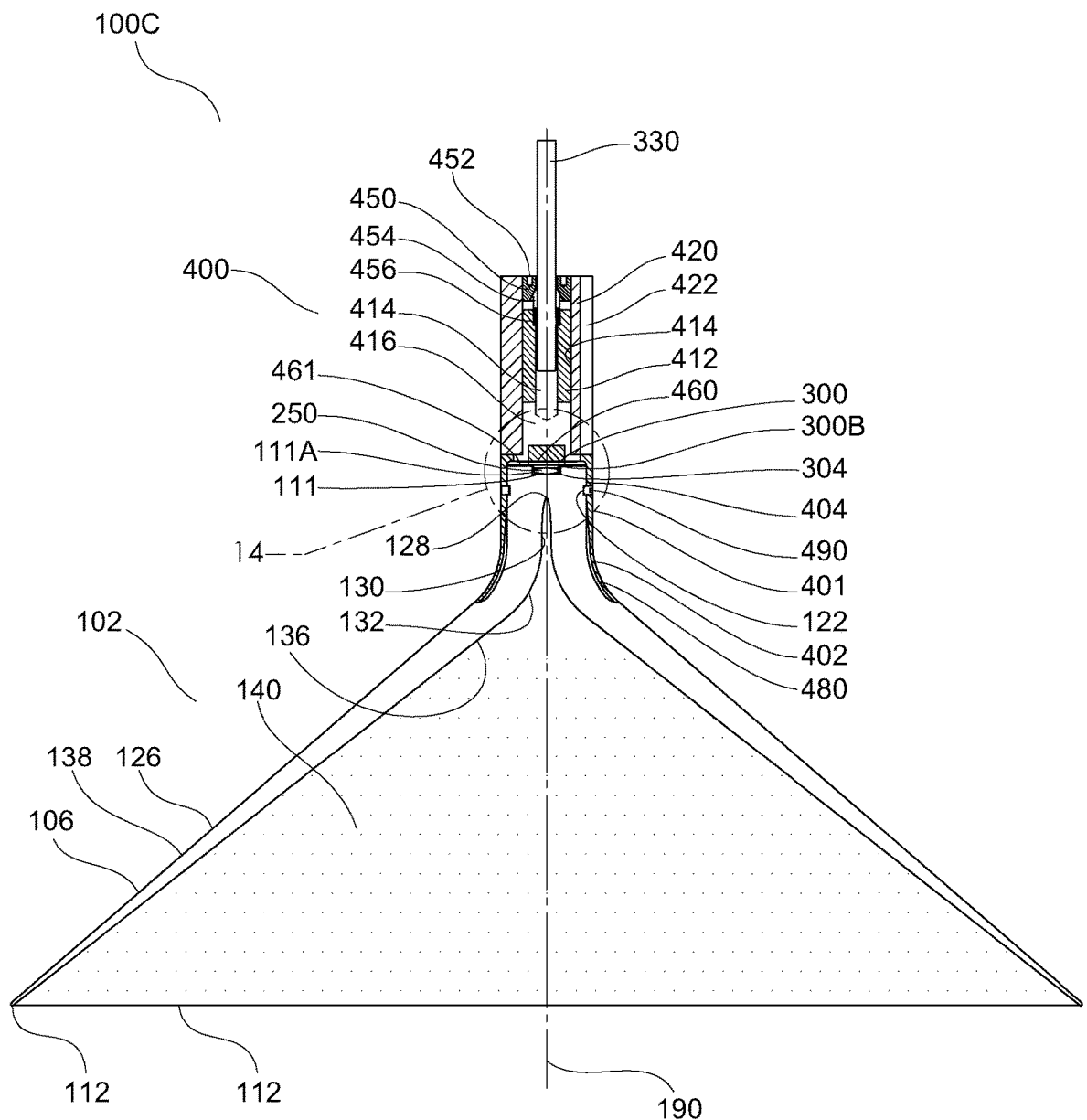
FIG. 13 is a section view along section C-C of the third embodiment of the luminaire illustrated in FIG. 12, showing the exterior and interior perimeters of the light guide joining at an edge at a distal terminus of the light guide, and a lens in the form of a bi-convex lens to collimate light from a light source into a light ingress surface.
Figure 14:
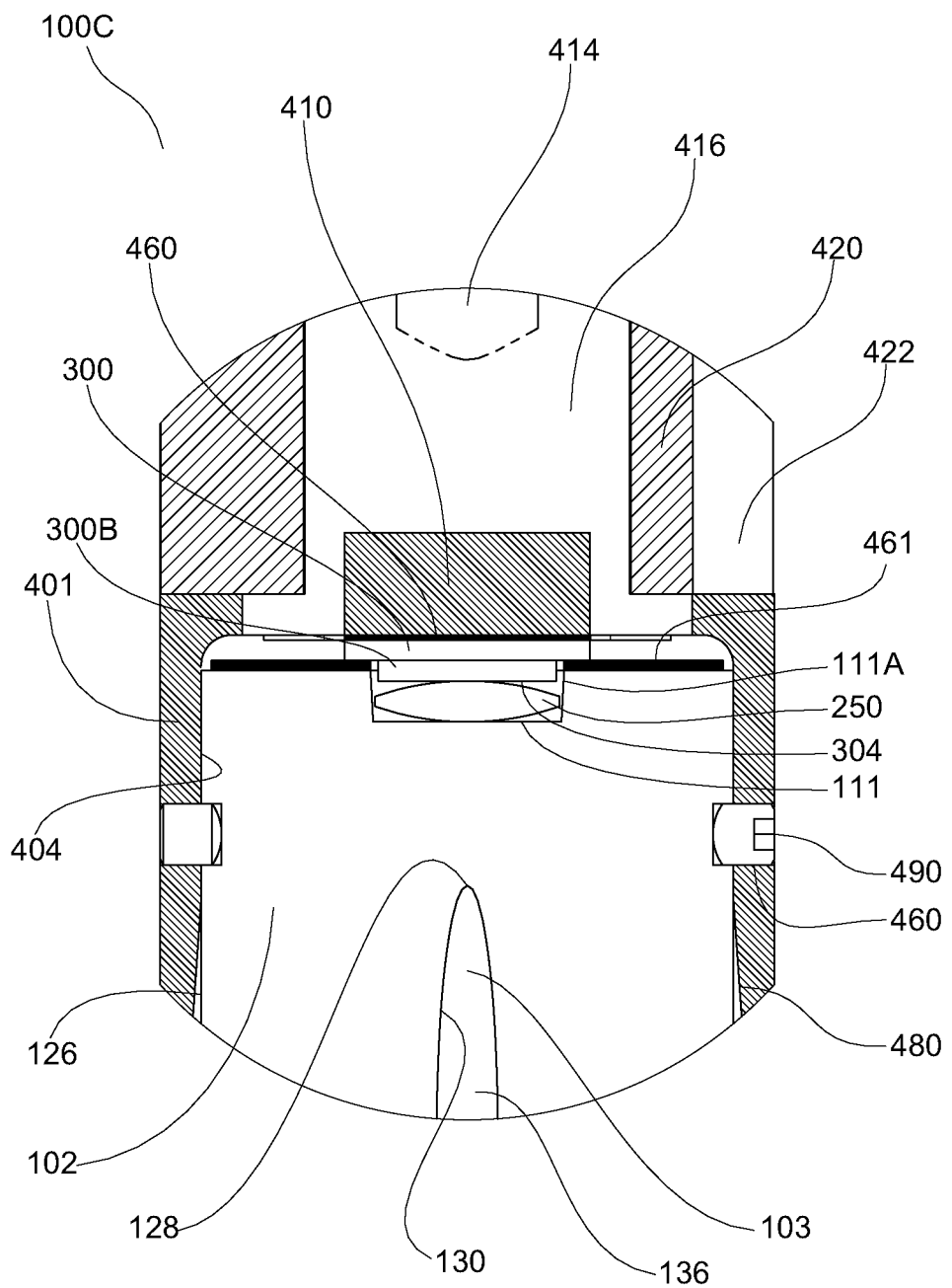
FIG. 14 is a detail view of a section view shown in FIG. 13, showing details of a light source, collimating bi-convex lens and recessed light ingress surface.

A third embodiment generally identified by reference numeral 100C, will now be described with reference to FIG. 11 through FIG. 14, FIG. 13 showing a section view along section line C-C of FIG. 12 with the conductive wires 312 and associated electrical components removed for clarity, and featuring a lens 250 in the form of a bi-convex lens, disposed to collimate light emitted from a light source 300 in the form a COB 300B and direct it into a recessed light ingress surface 111 at the distal end of a light well 111A. A narrow concave interior portion 130 is disposed to provide surface normals of the glossy interior surfaces 136 that define it that facilitate TIR for the collimated light directed from the light source 300, through the lens 250 and into the recessed light ingress surface 111. FIG. 14 shows these aspects in detail, as well as a heat transfer means 460, such as a pad or thermally conductive adhesive, to draw heat away from the light source 300A to the direct heatsink 410, and heat isolation means 461, such as a silicone pad, to prevent heat from contact with or radiation from hot components of a housing assembly 400 to damage the light guide 102, particularly proximal portions such as the recessed light ingress surface 111.

The third embodiment depicts a light guide 102 shaped in a nominally conic fashion, where the interior surfaces 124 and exterior surfaces 126 narrow to a nominally sharp edge at a distal terminus 112 at the wide portion 106 of the light guide 102, the sharp edge preferably with a rounded distal terminus 112 for safety and aesthetic purposes.

FIGS. 12 and 13 depict a distal perturbed interior surface 140 where light can be extracted from within the wide portion 106 of the light guide 102. The boundary between unperturbed glossy interior surfaces 136 and perturbed interior surfaces 140, and likewise the narrow portion 104 and the wide portion 106, is depicted in this embodiment to be more proximal than distal to the light source, a variation intended to provide an aesthetic variation where more light is extracted closer to the light source 300 and gradually appearing less intense toward the distal terminus 112. This variation is still an improvement in distribution and glare reduction than viewing the light source directly, or from extractors exclusively at a proximal portion of a light guide 102, however it is less effective in glare control than embodiments that feature extractors 134 further distally and more localized at the wide portion 106 of the light guide 102. A further reading of this embodiment, as an alternate variation, features extractors 134 within the area of the perturbed interior surface 140 that increase in number and density the more distally they are located, such that the amount of extraction is therefore balanced in appearance along the progression from the proximal to the distal end of the light guide 102. The increase in density of the extractors 134 distally may also provide a variation where the light appears more intense further toward the distal terminus 112.

Figure 15:
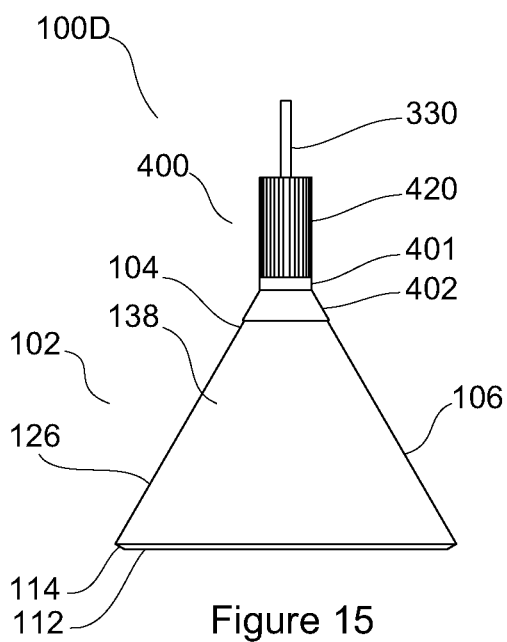
FIG. 15 is a side view of a fourth embodiment of the luminaire, showing a nominally cone shape light guide.
Figure 16:
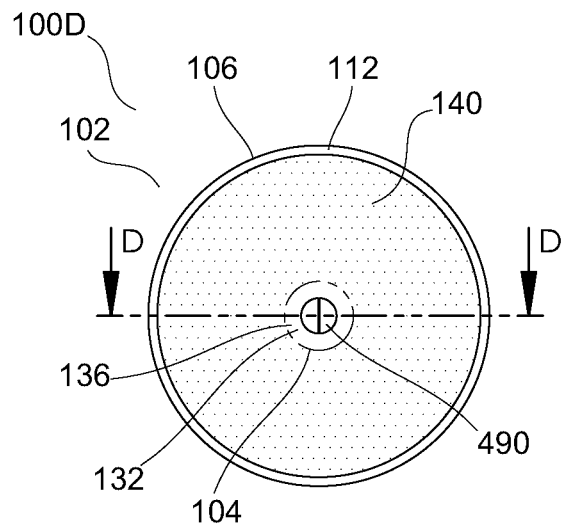
FIG. 16 is a bottom view of the fourth embodiment of the luminaire illustrated in FIG. 15, showing the light guide fixed to the support at an interior portion of the light guide, with surface extractors over the majority of the interior surfaces of the light guide.
Figure 17:
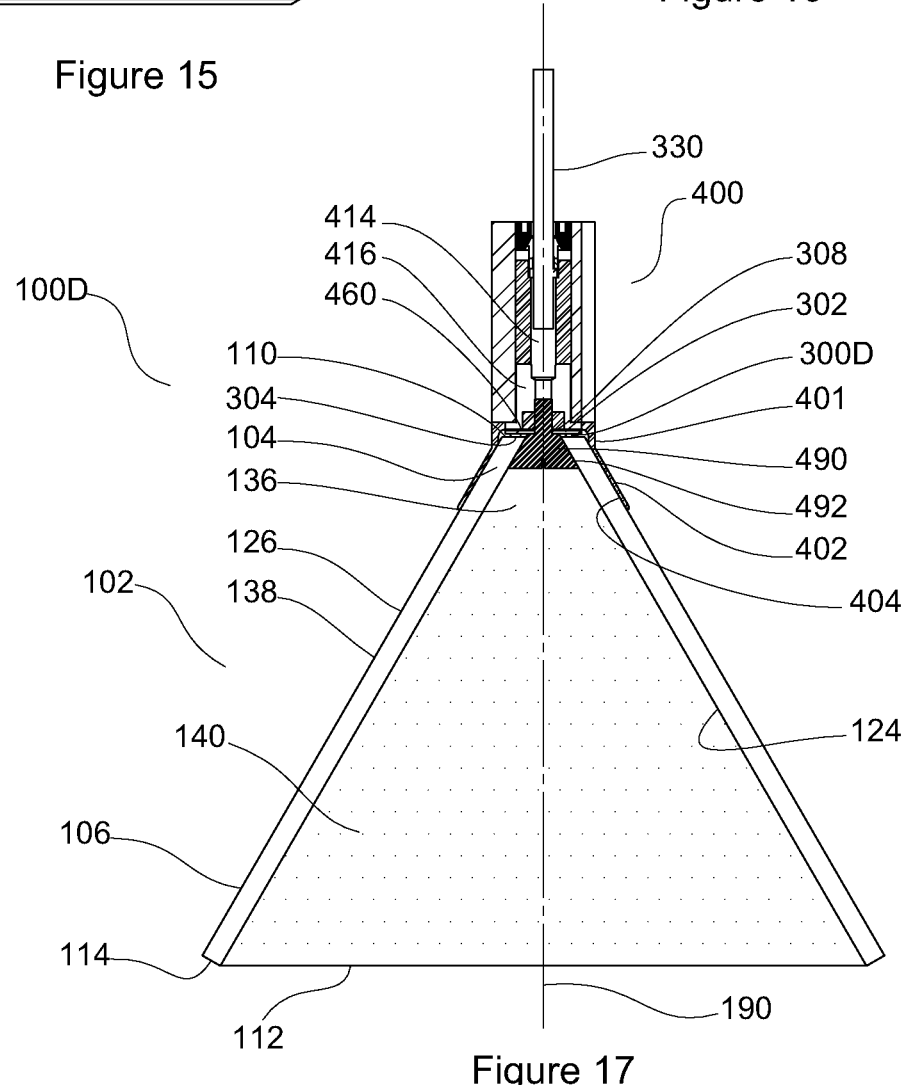
FIG. 17 is a section view along section D-D of the luminaire illustrated in FIG. 16, showing an interior perimeter of a light guide without a proximal conduit.

A fourth embodiment generally identified by reference numeral 100D, will now be described with reference to FIG. 15 through FIG. 17, FIG. 17 showing a section view from FIG. 16 with conductive wires 312 and associated components removed for clarity.

The fourth embodiment features a conic shaped light guide 102 without a proximal conduit 120, with a cavity 103 that continues as a hole through the light ingress surface 110. A distal terminus 112 is fashioned as a face between the interior perimeter 124 and exterior perimeter 126.

A fastening component 490 connects the light guide 102 to the housing assembly 400 through a channel 131, as an extension of the cavity 103, in the light ingress surface 110, through a hole 308 in a PCB 302, upon which an array of laser diodes 300D are fixed, and into a fastening portion 406 in the housing 401 that may comprise a portion of the interior shaft 414. Fastening means can comprise a friction or compression fit of the fastening component 490 to the fastening portion 406, be affixed with adhesive therein, or comprise a threaded mate of said components (not shown), however assembly means is not limited to these options. Reflective surfaces 492 on the fastening component 490 facing an interior perimeter 124 of the light guide 102 may be reflective to facilitate directing light further toward the distal wide portion 106.

Figure 18:
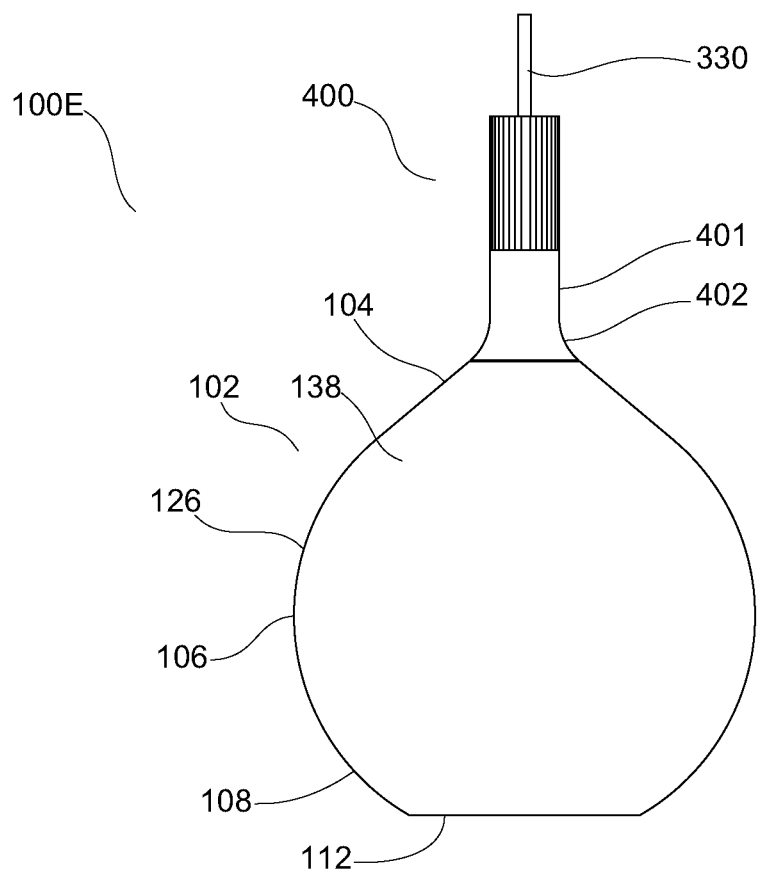
FIG. 18 is a side view of a fifth embodiment of the luminaire, showing a nominally globular shape light guide, where the light guide widens from a narrow proximal end to a wide portion, from which the light guide narrows distally to a distal narrow portion and terminates at a relatively narrow distal perimeter.
Figure 19:
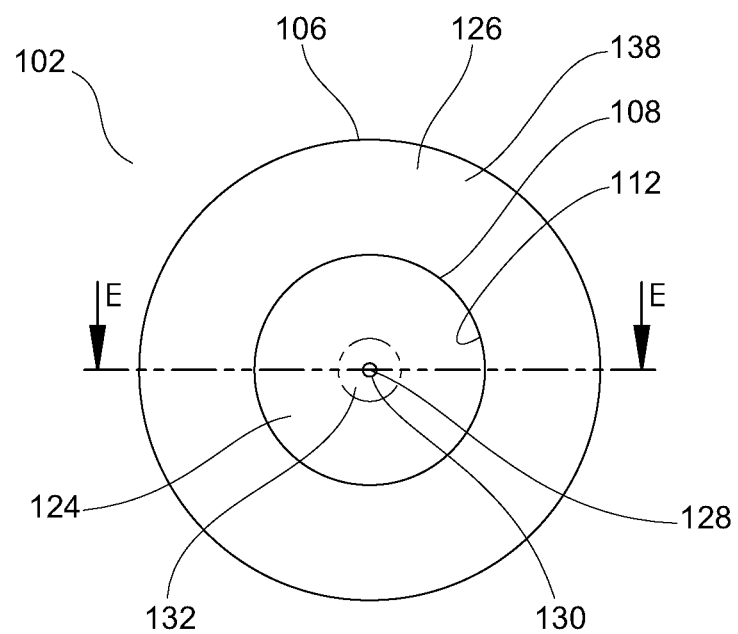
FIG. 19 is a bottom view of the fifth embodiment of the luminaire illustrated in FIG. 18.
Figure 20:
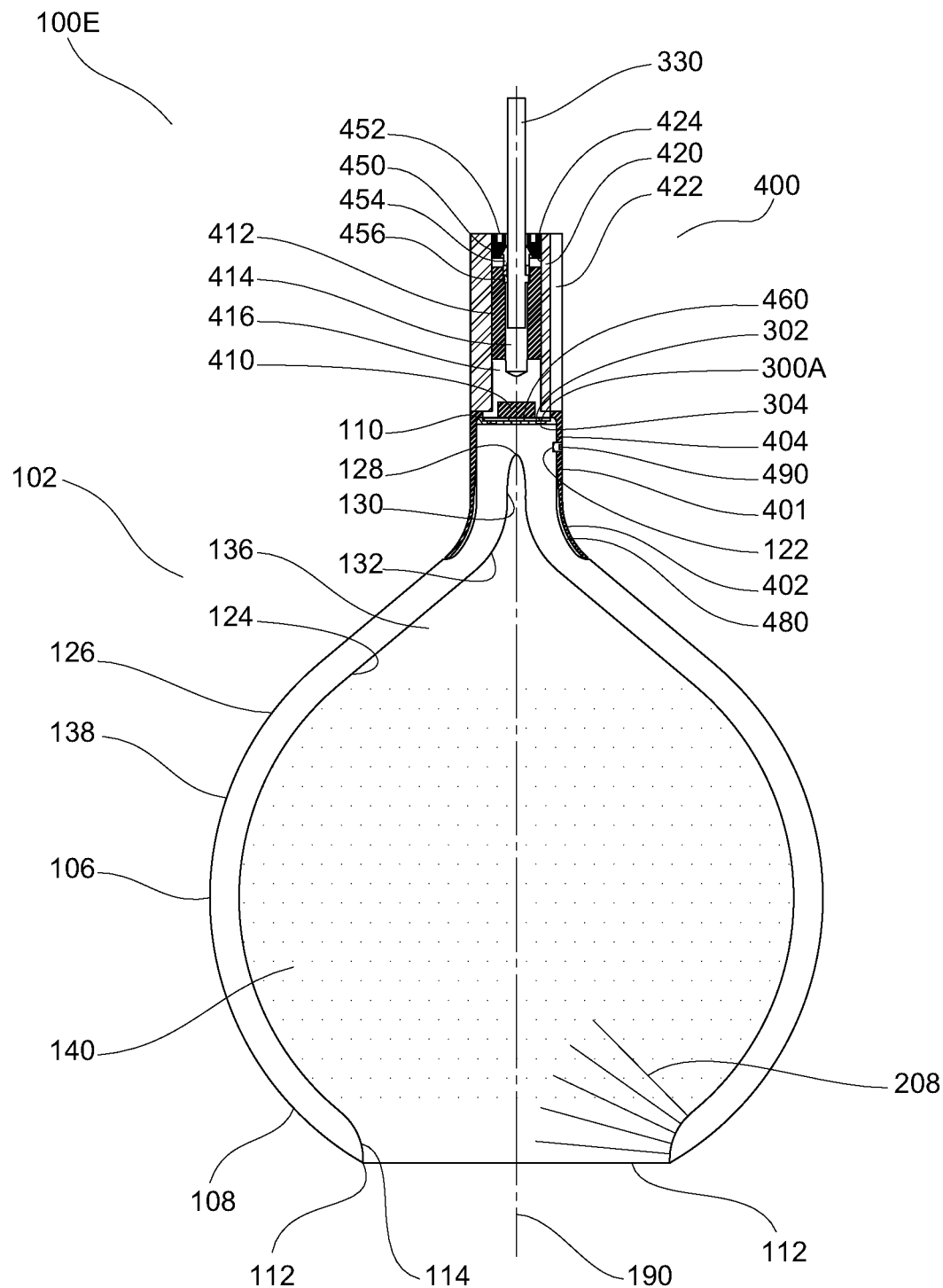
FIG. 20 is a section view along section E-E of the fifth embodiment of the luminaire illustrated in FIG. 19, showing an interior perimeter of the light guide.

A fifth embodiment generally identified by reference numeral 100E, will now be described with reference to FIG. 18 through FIG. 20.

The fifth embodiment features an extension of the light guide 102 from a wide portion 106 that narrows distally inwards to a distal narrow portion 108, giving the light guide 102 a nominally globular shape with an open end through the distal narrow portion 108 connectable to the internal cavity 103. While the end treatment of the distal terminus 112 may take a variety of forms, a terminating face 114 in the form of a radius makes a smooth blend from an interior perimeter 124 to an edge at the distal terminus 112. The terminating face 114 may be oriented inward of the light guide 102 such that rays of light 200 travelling distally may exit via the terminating face 114 as rays 208 directed inward to prevent visible glare at the terminating face 114 to an observer viewing the luminaire 100E from vantages that look on the distal narrow portion 108. Though the interior perimeter 124 of this embodiment features convex and undercut features that would prohibit normal injection molding due to inability to remove the part from the mold, this embodiment can be fashioned from blown glass or crystal, or from optical silicone molding, without issue. The deformability of optical silicone permits it to be stretched over undercut portions in a mold, and the very low compression set and shape memory of the material will return it to its desired dimension at manufacture without any permanent deformation.

Figure 21:
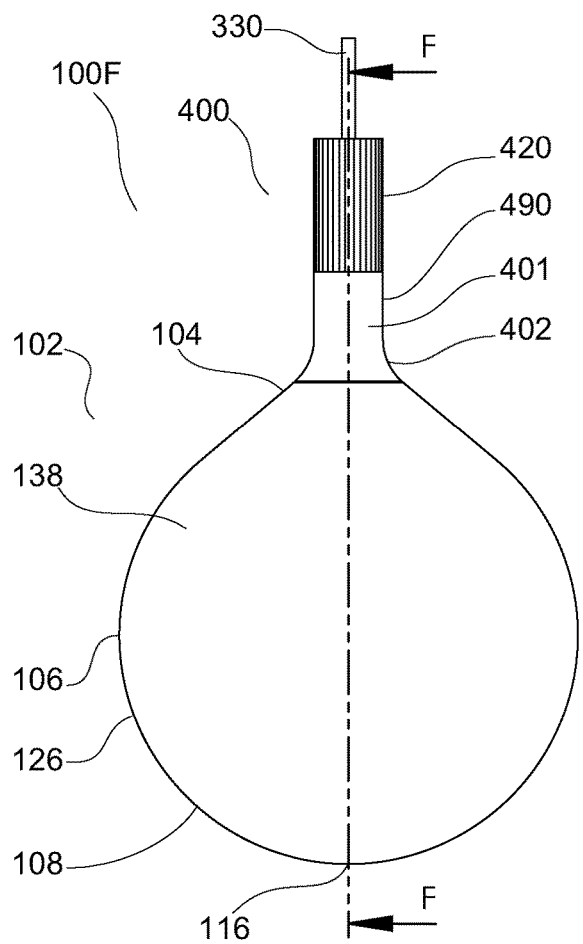
FIG. 21 is a side view of a sixth embodiment of the luminaire, showing a nominally globular shape light guide, where the light guide narrows distally to a continuum, the light guide having extractors within the matrix of the light guide at a distal portion.
Figure 22:
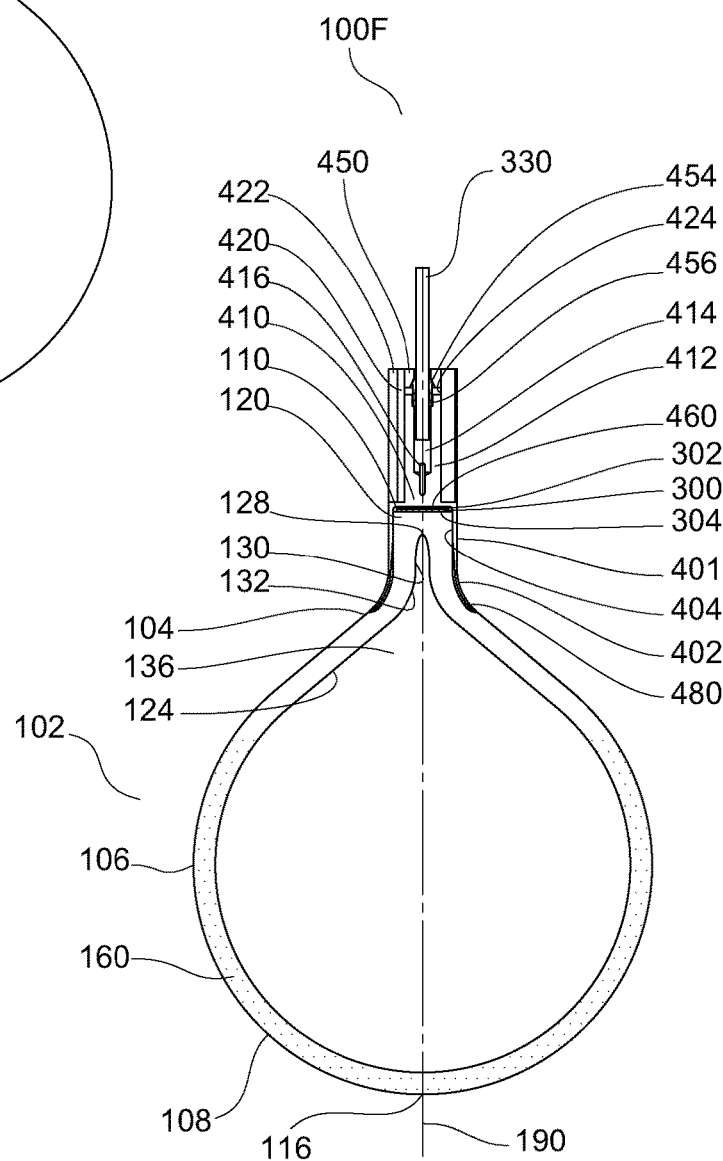
FIG. 22 is a section view along section F-F of the sixth embodiment of the luminaire illustrated in FIG. 21.

A sixth embodiment generally identified by reference numeral 100F, will now be described with reference to FIG. 21 through FIG. 22.

The sixth embodiment features a distal narrow portion 108 as described in the fifth embodiment, however the narrowing continues to make a distal continuum 116 in a light guide 102 at a distal end. Creating extractors on an interior perimeter 124 would prove difficult in manufacture in a light guide 102 with a cavity 103 not connectible to the exterior environment, so the preferred extractors 134 comprise a distal perturbed matrix 160 portion of the material of the light guide 102. Blown glass or crystal glass, with extractors added during the glass forming process, such as added pigmented material or blown bubbles, is an ideal method of manufacture though blow molding acrylic, with portions of the plastic parison featuring extractors, or extractors in the mold, would also be effective. Alternatively, extractors 134 can be formed on the exterior surfaces 126 from the mold itself or from a secondary operation.

Figure 23:
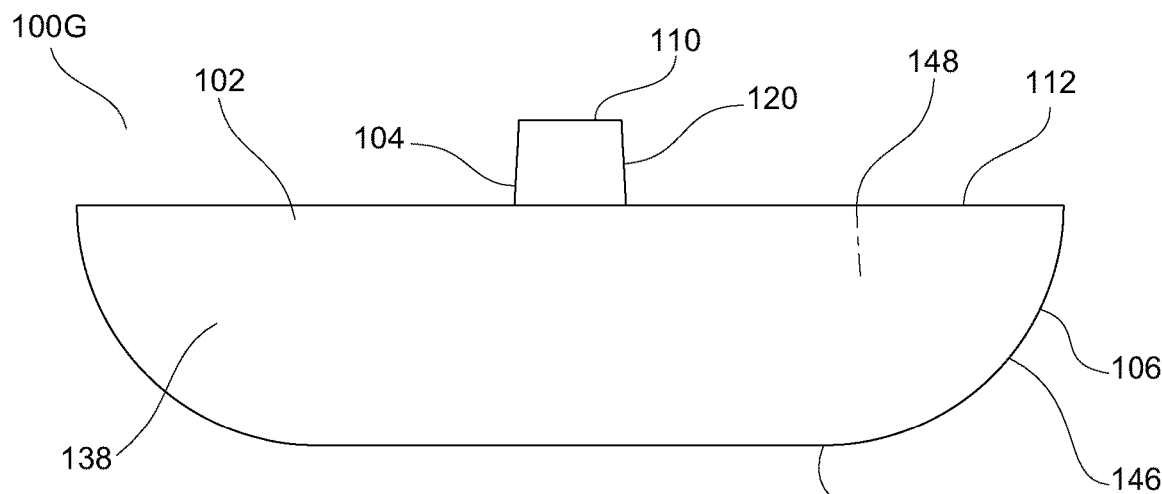
FIG. 23 is a side view of a light guide of a seventh embodiment of the luminaire, showing a light guide that extends and widens distally, where a portion at a distal extremity curves back partially toward the proximal end to comprise a flexure, also widening as it does so, with all other components removed for clarity.
Figure 24:
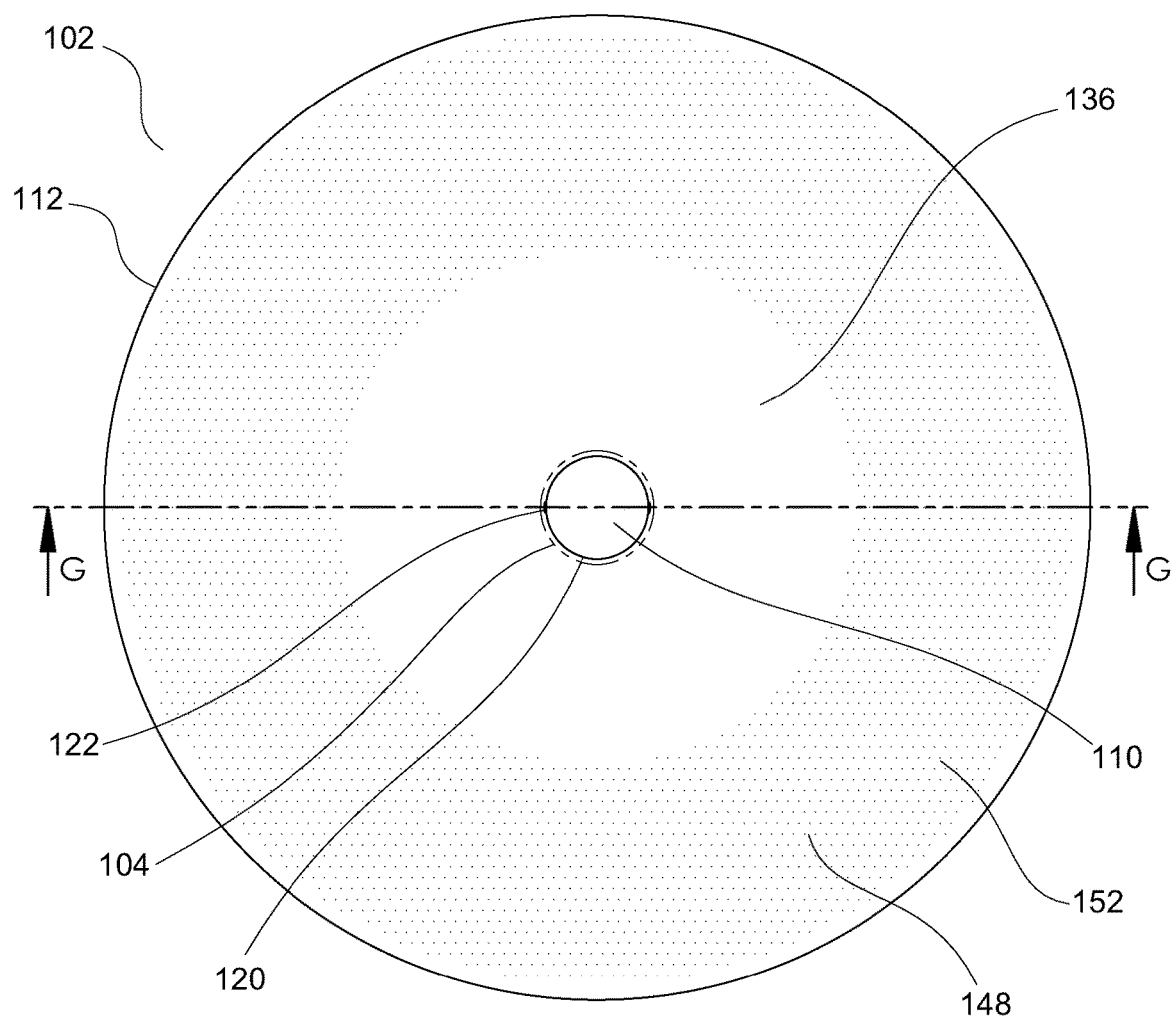
FIG. 24 is a top view of the seventh embodiment of the luminaire illustrated in FIG. 23.
Figure 25:
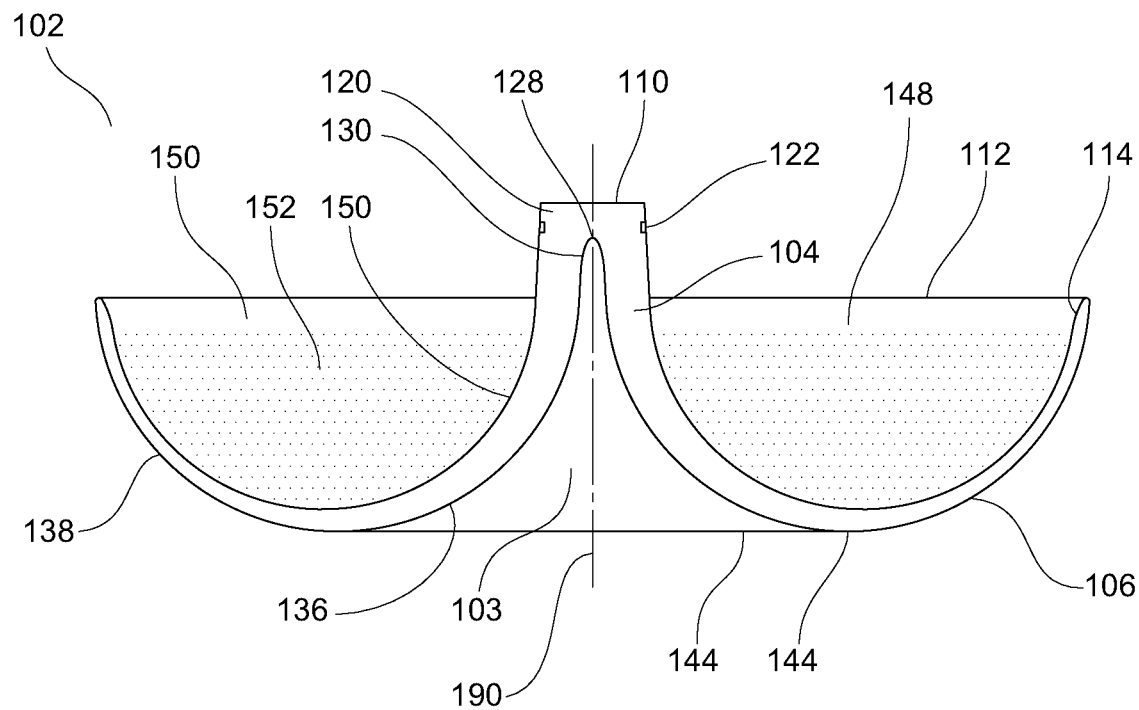
FIG. 25 is a section view along section G-G of the seventh embodiment of the luminaire illustrated in FIG. 24.
Figure 26:
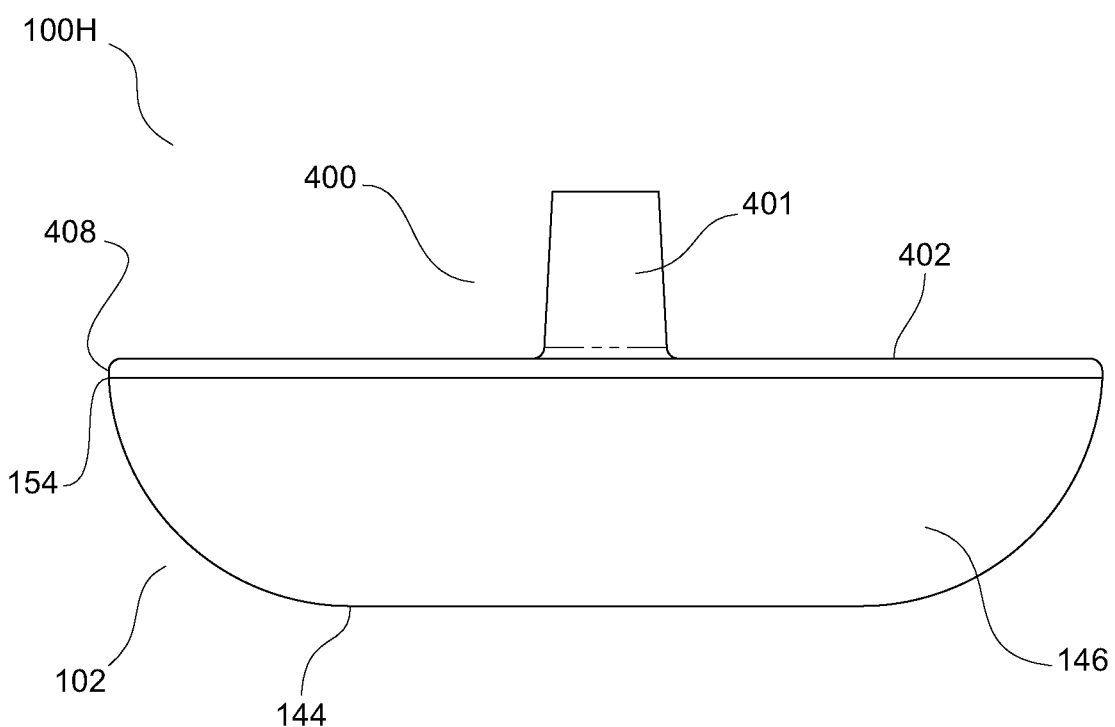
FIG. 26 is a side view of an eighth embodiment of the luminaire, showing a light guide that extends and widens distally, where a portion at a distal extremity curves back partially toward the proximal end to comprise a flexure, also widening as it does so, over which a housing is fixed, and cowl portion of the housing extending to mate with an edge comprising a distal terminus of the light guide, with all other components removed for clarity.
Figure 27:
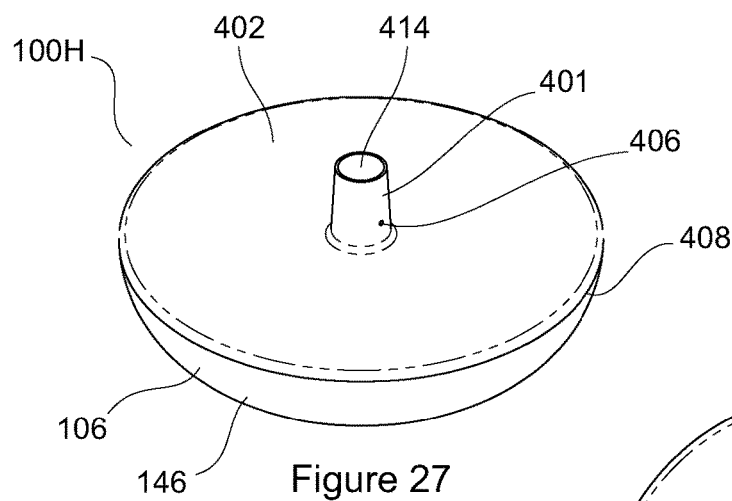
FIG. 27 is a perspective view of the luminaire illustrated in FIG. 26.
Figure 28:
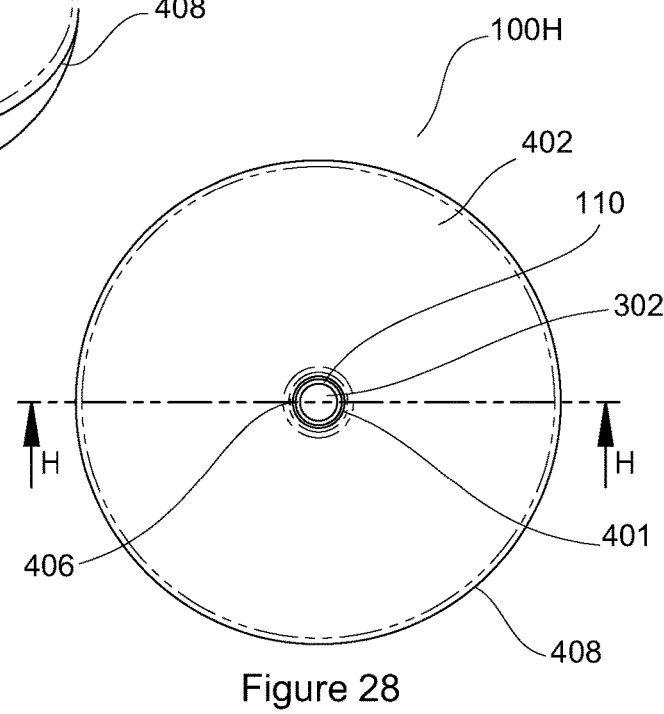
FIG. 28 is a top view of the eighth embodiment of the luminaire illustrated in FIG. 26.
Figure 29:
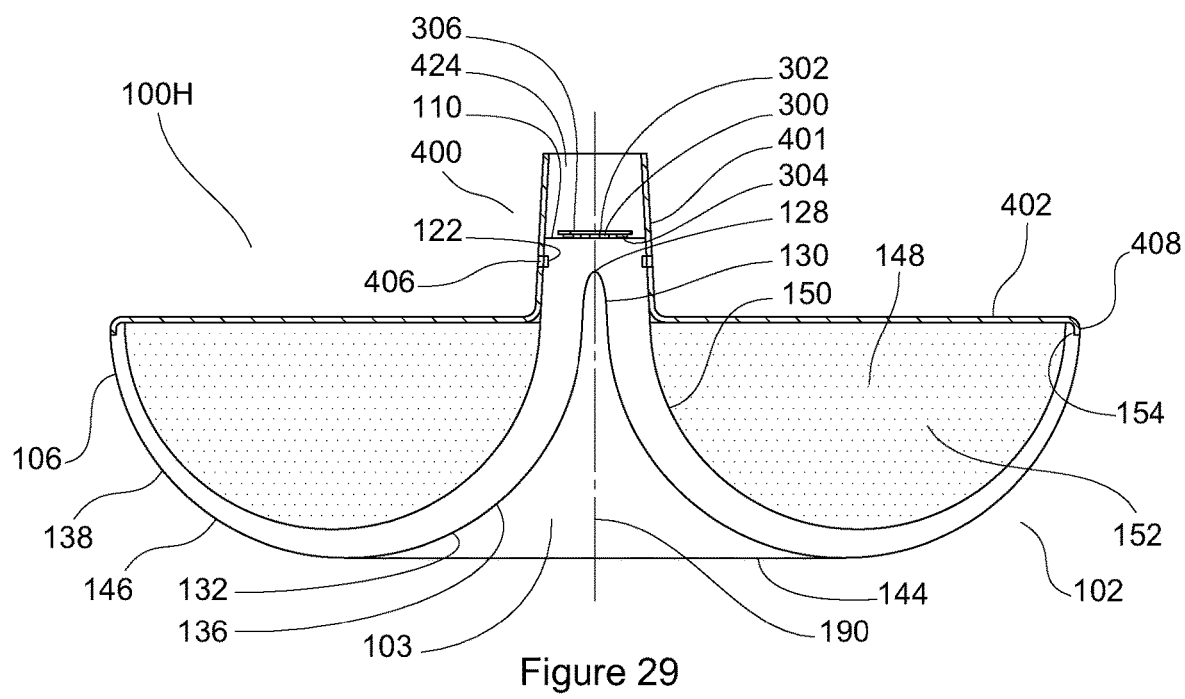
FIG. 29 is a section view along section H-H of the luminaire illustrated in FIG. 28, with the heatsink and most of the housing assembly removed for clarity.

A seventh embodiment generally identified by reference numeral 100G, will now be described with reference to FIG. 23 through FIG. 25, will all parts removed for clarity except a light guide 102.

A light guide 102, is shown without the housing assembly 400. The light guide 102 features a flexure transition 144 from a distal portion around axis 190 to fashion a distal flexure portion 146 that returns in direction along axis 190 toward the narrow portion 104, however continuing to widen to a wide portion 106 as it does so until it reaches a distal terminus 112. Interior surfaces 124 transition at the flexure transition 144 to become exterior surfaces 126 where, in the preferred embodiment of this variation, glossy interior surfaces 136 and glossy exterior surfaces 138 are glossy and therefore internally reflective to provide TIR. Between the narrow portion 104 and the distal flexure portion 146 a flexure cavity 148 is formed, where portions of the flexure cavity 148 are glossy interior surfaces 150 and portions are perturbed interior surfaces 152.

An eighth embodiment generally identified by reference numeral 100H, will now be described with reference to FIG. 26 through FIG. 29, where the housing assembly 400 is shown with a housing 401 and a light source 300, for simplicity, with other components removed for clarity.

The eighth embodiment features a light guide 102 with a distal flexure portion 146, where a housing 401 has a cowl 402 that extends over a flexure cavity 148 to join with the light guide at its distal terminus 112, the cowl featuring a mating edge 408 to seal off the flexure cavity 148 from the ingress of dust or insects, and is benefitted from a mating perimeter recess 154 at the distal terminus 112 that aids in making the seal and also makes a flush assembly of the housing 401 at the mating edge 408 to the light guide 102 at the mating perimeter recess 154, which provides aesthetic benefit.

Figure 30:
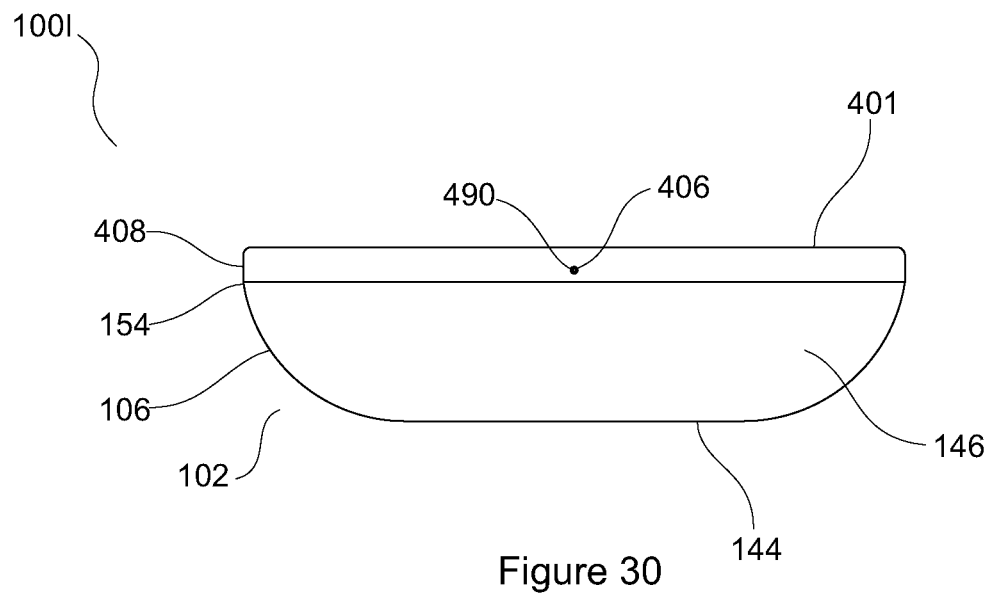
FIG. 30 is a side view of a ninth embodiment of the luminaire, showing a light guide that extends and widens distally, where a portion at a distal extremity curves back partially toward the proximal end to comprise a flexure, also widening as it does so, over which a housing is fixed, fashioned as a nominally flat plate, with a cowl portion of the housing extending to mate with an edge comprising a distal terminus of the light guide.

A ninth embodiment generally identified by reference numeral 100I, will now be described with reference to FIG. 30 through FIG. 32.

A light guide 102 features a distal flexure portion 146 within which is a flexure cavity 148. A housing 401 is in the form of a nominally flat plate, disposed for mounting to a surface such as a wall or ceiling, and features a mating edge 408 that mates with a mating perimeter recess 154 in the light guide 102, where fastening component 490 is disposed to mount the light guide 102 at a fastening portion 122, generally a groove or hole, at fastening portions 406 in the housing 401. Housings 401, as described, can be fabricated via spinning, stamping or injection molding. A light source 300 PCB 302 can be mounted to the housing 401 directly by fastening means, or may be mounted to a heatsink interface (not shown). An electronic driver providing regulated power to a light source, and in some embodiments a wireless communication and/or control module, depicted as a driver 500 can be mounted to the housing 401 with fastening means, enclosed within the flexure cavity 148. Wire access portions 416 in the housing 401 are disposed to provide electrical connection from the driver 500 to the PCB 302; bushings (not shown) can be placed in the wire access portions 416 to protect the conductive wires 312 (not shown), and the conductive wires 312 can be placed and connected within a junction box 700 (not shown). FIG. 31 depicts wire access portions 416 from the interior of the housing 401, one adjacent to the light source 300 and the other adjacent to a driver 500 within a reflexive cavity 148, to be able to pass wiring through to make a connection within a junction box 700 (not shown). Mounting holes 426 are disposed for installation to a junction box or joiner plate 710 (not shown).

Figure 31:
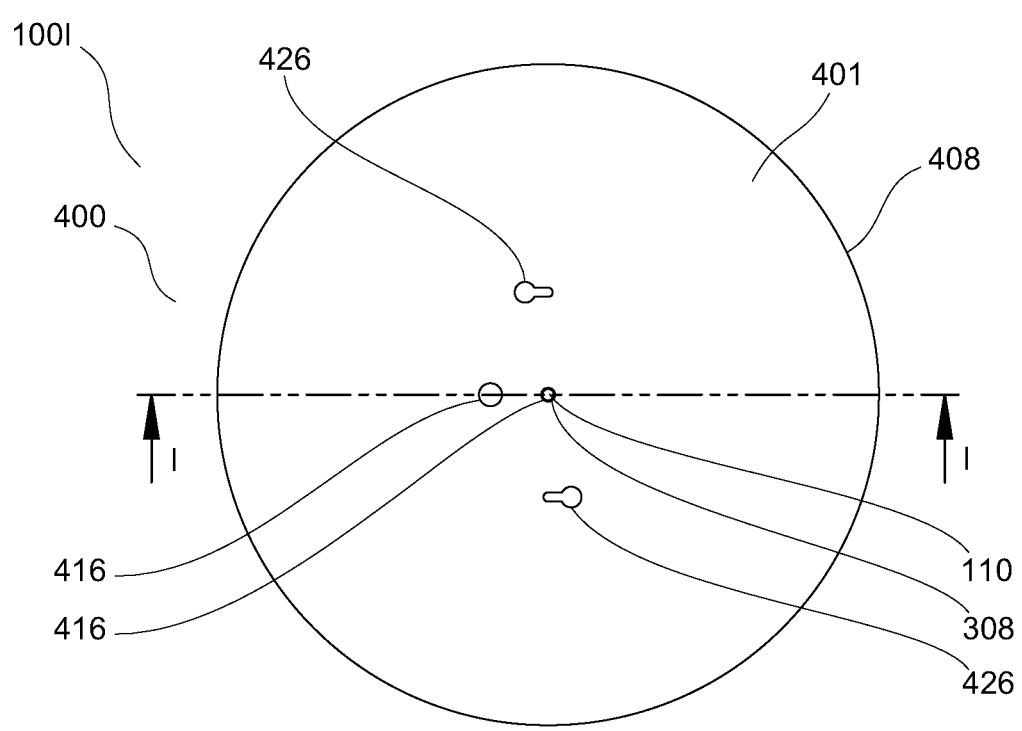
FIG. 31 is atop plan view of the ninth embodiment of the luminaire illustrated in FIG. 30, showing mounting and wiring holes.
Figure 32:
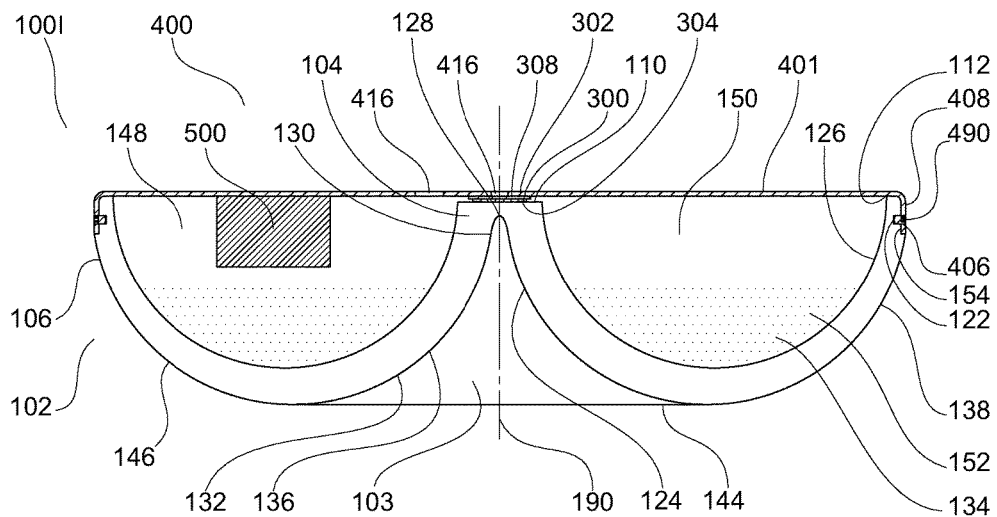
FIG. 32 is a section view along section I-I of the ninth embodiment of the luminaire illustrated in FIG. 31, revealing a portion of the housing covering a cavity formed within a distal flexure portion of the light guide, and a LED driver suspended from the housing.
Figure 33:
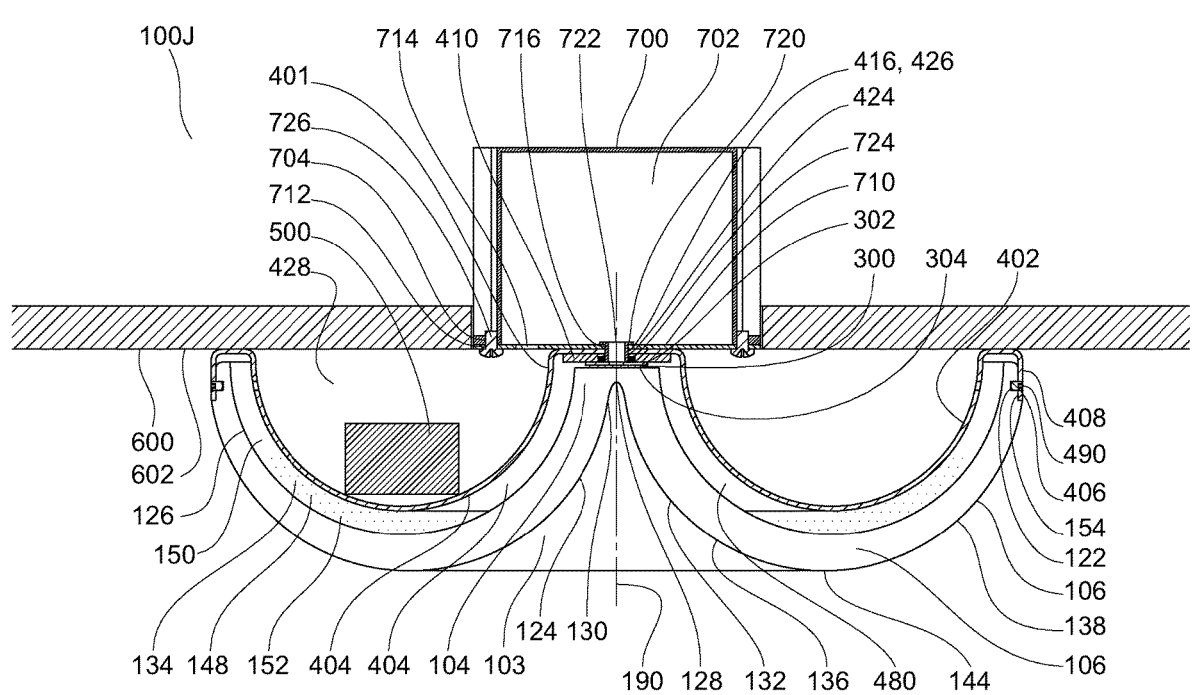
FIG. 33 is a section view of an alternative tenth embodiment, showing a portion of the housing formed to fit into a cavity formed within a distal flexure portion of the light guide, and a LED driver positioned on a posterior surface of the housing, mounted to a junction box within a drywall ceiling or wall.

A tenth embodiment generally identified by reference numeral 100J, will now be described with reference to FIG. 33, being an alternative section view along I-I of FIG. 31, showing an alternative housing 401 mounted to a junction box 700 against a building surface 600, a gypsum board 602 building construction, typically either a wall or ceiling.

The housing 401 is fashioned with a cowl 402 that fits into a flexure cavity 148 within the light guide 102, so that there is a proximal housing cavity 428. A reflective interior surface 404 of the housing 401, typically fashioned as a coating on the housing 401 but may also be integral to the material of the housing 401, is oriented towards the light guide 102 so that light directed proximally may reflect off the reflective interior surface 404 through the light guide 102 and distally out into the environment. A gap 480 between the light guide 102 and the housing facilitates non-frustration of the light guide 102 so that light is extracted in an intended fashion by way of extractors 134.

An electronic driver 500 may be assembled within the housing cavity 428 with fastening means, the housing cavity 428 and driver 500 and associated electronic contacts becoming closed to access when the luminaire 100J is assembled to a junction box 700 where the housing 401 rests against a building surface 600, such as a gypsum board 602, also known as drywall, plasterboard or wallboard.

A light source 300 PCB 302 is shown mounted to a direct heatsink 410 that is connected at an interior perimeter 424 to an assembly hole 716 in a crossbar or joiner plate 710 with an IPS threaded grommet 720 and IPS nut 724, commonly used in mounting luminaires, fixing and sandwiching the housing 401 to the joiner plate 710. Electrical connections can be made by passing wire from a driver 500 through a wire hole 714 in the joiner plate 710 into a junction box cavity 702 within a junction box 700, where connection is made with a power source (not shown) and where wire may also pass from the junction box 700 to the PCB 302 through a conduit 722 in the IPS grommet. The joiner plate 710 may be conventionally fixed to the junction box 700 at fastening holes 712 in the joiner plate 710 to fastening holes 704 in the junction box 700 with mounting hardware 726.

An eleventh embodiment generally identified by reference numeral 100K, will now be described with reference to FIG. 34 through FIG. 37.

Figure 34:
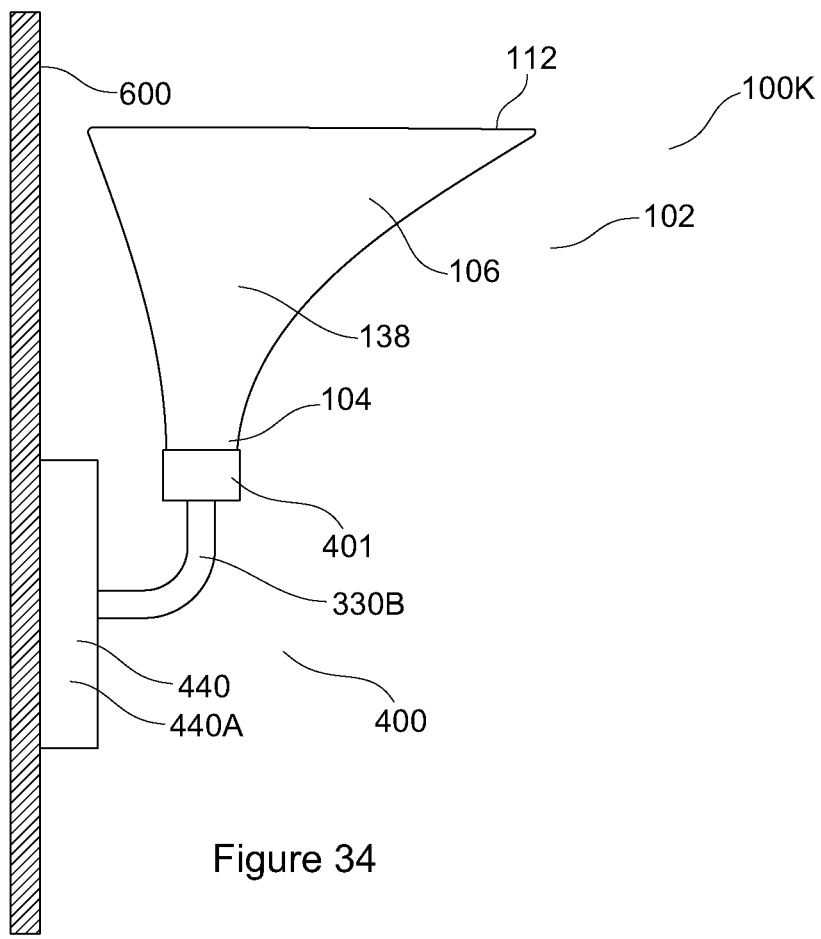
FIG. 34 is a side view of an eleventh embodiment of a luminaire with an asymmetric light guide, in the form of a wall sconce fixed to the wall with a mounting canopy.
Figure 35:
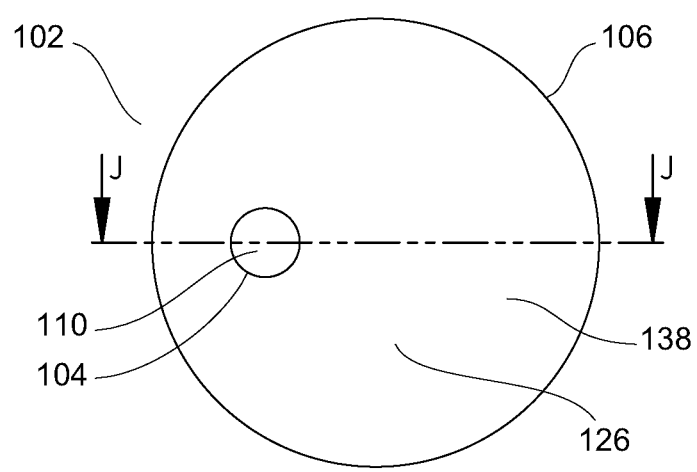
FIG. 35 is a bottom plan view of the light guide of the eleventh embodiment of FIG. 34.
Figure 36:
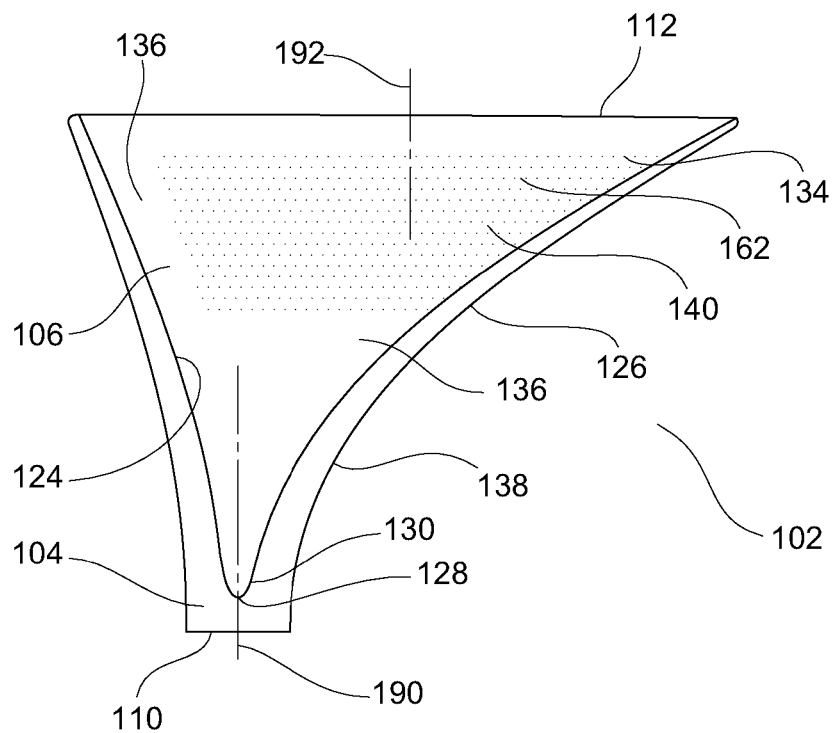
FIG. 36 is a section view along section J-J of the eleventh embodiment of the light guide illustrated in FIG. 35, positioned adjacent to a wall, revealing an asymmetric interior surface and an asymmetric extractor area in the light guide.
Figure 37:
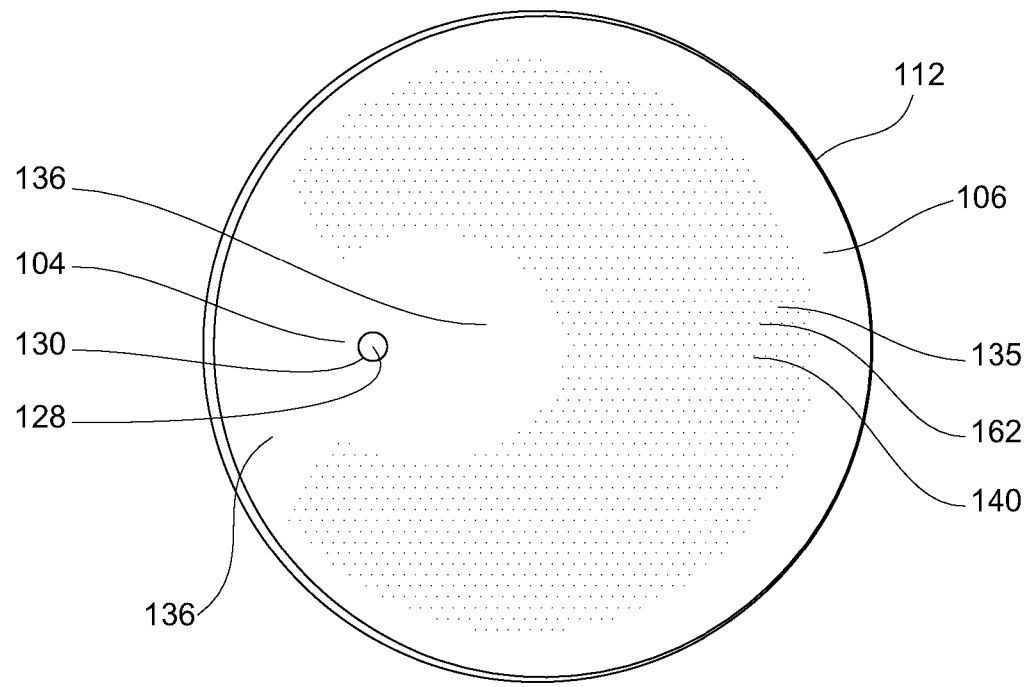
FIG. 37 is a top plan view of the light guide of the eleventh embodiment of FIG. 34, showing an asymmetric extractor area in the light guide.

The eleventh embodiment depicts an asymmetric light guide 102 where a distal axis 192, nominally centered at the opening of the cavity 103 at the distal terminus 112 is not in line with the nominal axis 190 of the narrow portion 104 or light source 300 (not shown), thereby defining an offset or asymmetric distal terminus 112 relative to the light source 300. As depicted in FIG. 34, an asymmetric light guide 102 is disposed for placement adjacent to a building surface 600 such as a wall or pillar to function as a sconce luminaire 100K (complete assembly not shown in FIGS. 35, 36 and 37, with components removed for clarity). The asymmetry of the design is intended to facilitate directing low glare light towards the environment and away from the wall, featuring an asymmetric perturbed interior surface 140 portion of an interior perimeter 124 is positioned distally of the narrow portion 104 and distally from the building surface 600, the proximal portions remaining glossy interior surfaces 136, with the intention of casting light away from the building surface 600 and preventing hotspots on the building surface 600 itself. As depicted in FIG. 34, a housing assembly 400 is connected to the narrow portion 104 with a housing 401, the housing 401 being supported by a rigid pipe 330B, also acting as a conduit for conductive wires 312, fixed to a base 400 in the form of a canopy 440A. The canopy 440A is fixed to the building surface 600 to support the luminaire 100K in an installed state, most commonly to a junction box 700 (not shown) within the building surface 600.

Figure 38:
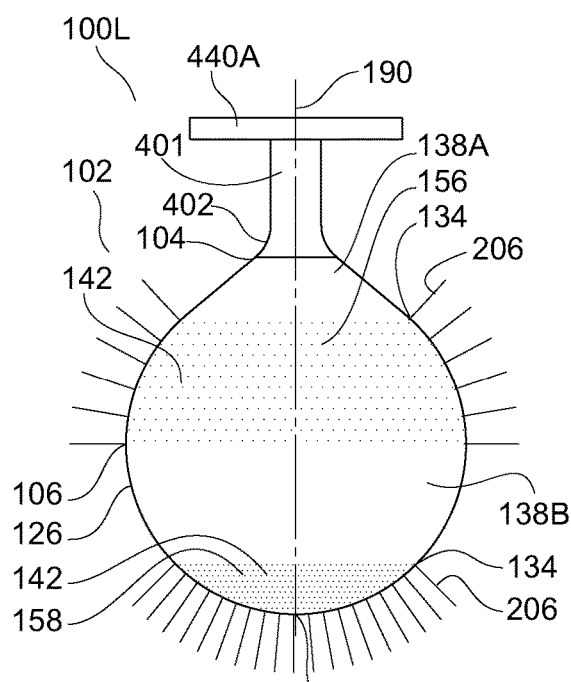
FIG. 38 is a twelfth embodiment of the luminaire, showing a light guide featuring extractors on a first distal portion and a second distal portion of the light guide with a higher density of extractors than the first distal portion, with the light guide mounted to a base to comprise a luminaire that could be mounted to a building surface.

A twelfth embodiment generally identified by reference numeral 100L, will now be described with reference to FIG. 38, showing plural perturbed portions of extractors 134 on exterior perimeter 126, a proximal extraction portion 156 and a distal extraction portion 158.

A globular shaped light guide 102 features extractors 134 at two perturbed exterior surface portions, one more proximal than the other: a proximal extraction portion 156 and a distal extraction portion 158. As shown in this embodiment, the proximal extraction portion 156 and the distal extraction portion 158 may have different densities of extractors 134 within the areas they encompass.

A proximal extraction portion 156 shows extracted rays 206 of light exiting the light guide 102 from extractors 134 at angles ranging from approximately 0 to 50 degrees upwards from horizontal (90 to 140 degrees from nadir; nadir being coincident with the distal continuum 116, the point farthest from the light source), to provide upward oriented light that is disposed to reflect off of building surfaces 600 (not shown) like ceilings and back downward to the environment below the ceiling, the amount of light directed directly up being limited, as desired, by the limit of radiating angles (in this embodiment, 140 degrees from nadir) to prevent a hot spot of light on the building surface 600 adjacent to the luminaire 100L.

A distal extraction portion 158, disposed around a distal continuum 116 of the globular light guide 102, directs light downward between approximately 0 degrees to 45 degrees from nadir along a principal axis 190, to provide useful light for office based tasks. A region of glossy exterior surface 138 between the two regions of perturbed exterior surfaces 142 is left unperturbed to prevent glare that may cause disability to an observer in the environment, more prevalent in light cast at angles approximately between 45 degrees and 90 degrees from nadir.

In order to balance the amount of light directed nominally upwards and downwards, the upper, larger proximal extraction portion 156 is an area with less density of extractors 134 than the lower, more distal extraction portion 158, smaller in overall area; the number of extractors 134 in each area may be equal to provide an equal amount of light extraction from each area. The variation in location, range of angles, and densities of extractors 134 is illustrative of the possibility of control that may be engineered into the light guide 102, and is not limited to this specific variation, nor is it indicative of the type, function, or specific physics of extractors 134 that may be employed.

A luminaire 100L of this design is suited to being fixed to a building surface 600 (not shown) such as a ceiling, a wall or pillar.

Figure 39:
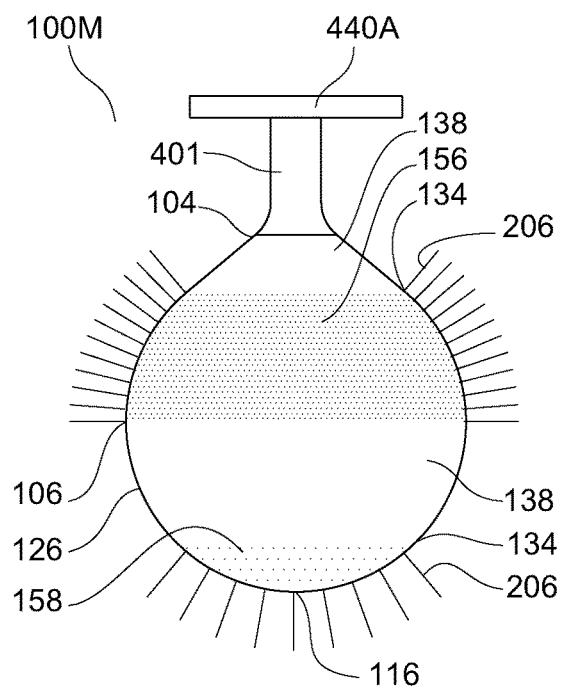
FIG. 39 is a thirteenth embodiment of the luminaire, showing a light guide featuring extractors on a first distal portion and a second distal portion of the light guide with a lower density of extractors than the first distal portion, with the light guide mounted to a base to comprise a luminaire that could be mounted to a building surface.

A thirteenth embodiment generally identified by reference numeral 100M, will now be described in reference to FIG. 39, showing plural perturbed portions of extractors 134 on exterior perimeter 126, proximal extraction portion 156 and distal extraction portion 158.

The embodiment depicted in FIG. 39 features an alternative light guide 102 variation for the luminaire 100L described in the twelfth embodiment, where a proximal extraction portion 156 may have more extractors 134 than a distal extraction portion 158, to extract more light overall from the proximal area to convey more reflected light off of a building surface 600 (not shown) the luminaire 100M is mounted to.

Figure 40:
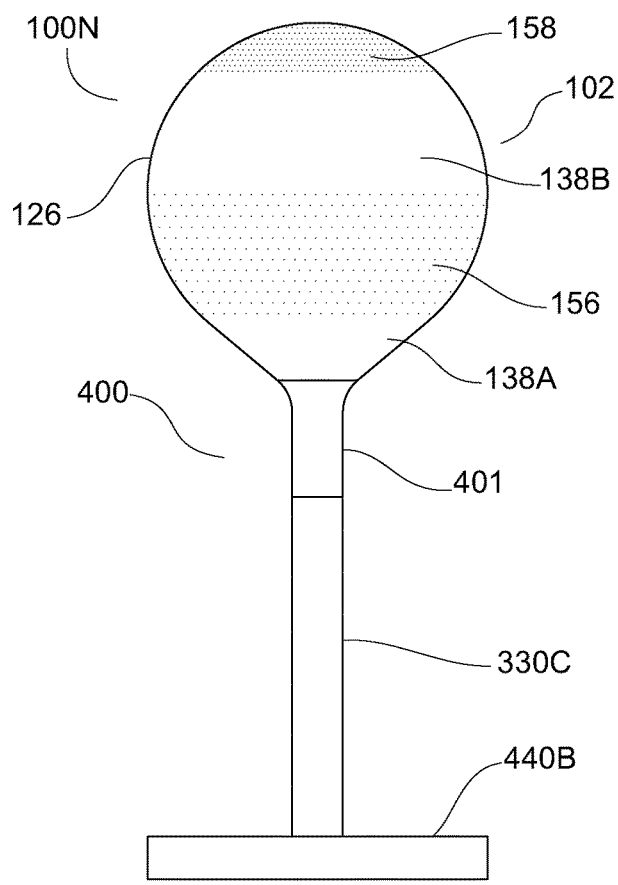
FIG. 40 is a fourteenth embodiment of the luminaire, showing the light guide of the twelfth embodiment mounted to a housing extending from a base to employ the luminaire as a table or floor lamp.

A fourteenth embodiment generally identified by reference numeral 100N, will now be described with reference to FIG. 40, showing plural perturbed portions of extractors 134 on exterior perimeter 126, a proximal extraction portion 156 and a distal extraction portion 158.

FIG. 40 depicts a luminaire 100N featuring a lamp base 440B fixed to a rigid structure 300C that supports a housing 401 into which a light guide 102 is fixed, the housing assembly 400 intended to support the light guide 102 as would a traditional lamp stand support a shade or diffuser. The light guide features a proximal extraction portion 156 oriented downwards intended to provide light to a person reading or working in a seated position adjacent to the luminaire on a table or desk (not shown), and a distal extraction portion 158, intended to direct light to a ceiling in a room the luminaire 100N is in. The light guide 102 in this embodiment shows a proximal glossy portion 138A, intended to prevent light from escaping at the narrow portion 104 and directly below the light guide 102 where it is not useful to direct light, and a distal glossy portion 138B between the proximal extraction portion 156 and the distal extraction portion 158, intended to prevent light from escaping from this region that would otherwise direct light and cause glare to an observer standing near or adjacent to the luminaire 100N.

Figure 41:
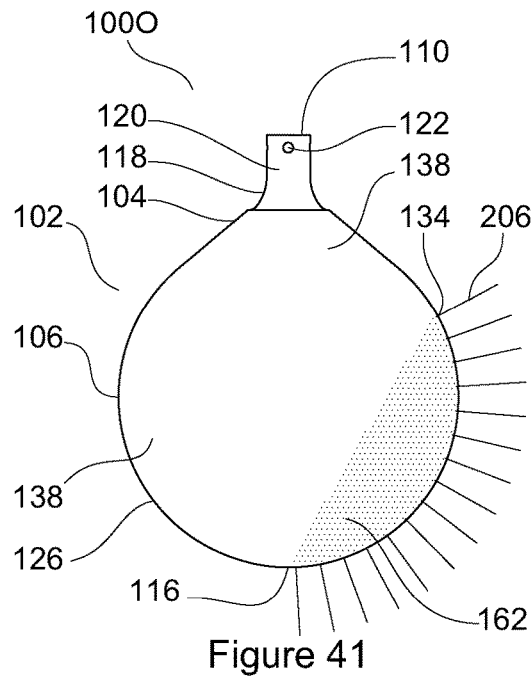
FIG. 41 is a fifteenth embodiment of a luminaire, with a light guide featuring an asymmetric extractor area on a distal portion of the light guide, with all other components removed for clarity.

A fifteenth embodiment generally identified by reference numeral 100O, will now be described with reference to FIG. 41.

A light guide 102 is disposed to cast light asymmetrically towards a building surface 600 (not shown) to illuminate the building surface 600 and objects that may be placed thereat, such as a painting mounted to a wall. The light guide features extractors 134 at an asymmetric distal extractor portion 162 that shows extracted rays 206 of light being projected from one side of the light guide 102 toward a building surface 600.

Figure 42:
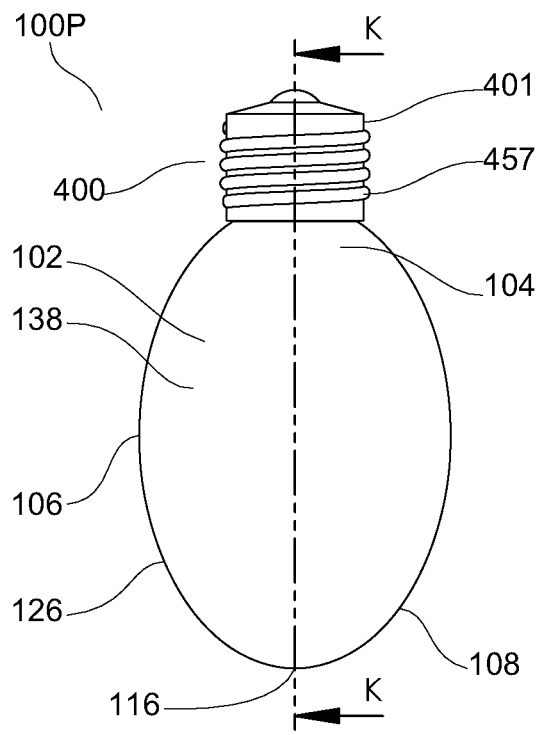
FIG. 42 is a sixteenth embodiment of a luminaire, featuring a compact light source within an Edison screw mount for installation into conventional North American light sockets, wherein a hollow light guide is fixed.
Figure 43:
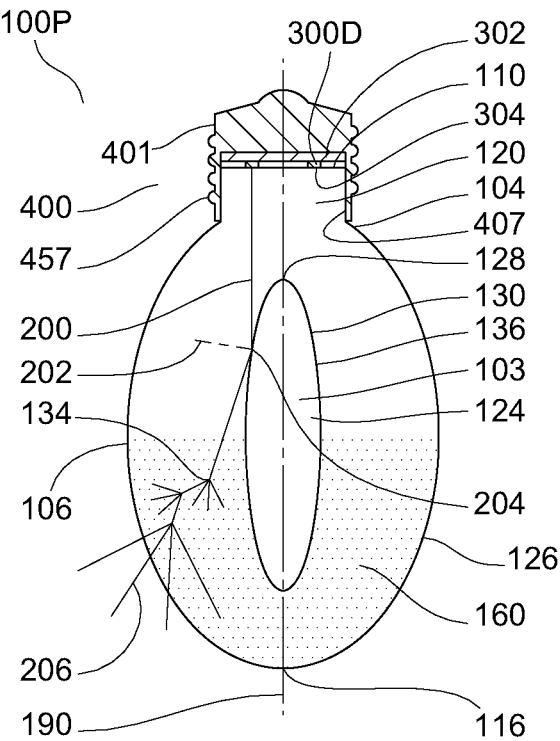
FIG. 43 is a section view along section K-K in FIG. 42, revealing the light source as an array of laser diodes mounted to a PCB, showing the conduction of a ray of light via TIR against a hollow interior surface into a distal perturbed matrix of the light guide, where the extractors cause dispersion and diffusion of a ray into multiple rays, and are extracted from the light guide as diffuse light.

A sixteenth embodiment generally identified by reference numeral 100P, will now be described with reference to FIG. 42 and FIG. 43, featuring a laser diode light source and an 'Edison screw' base power connector (also known as the 'cap' on a traditional incandescent bulb).

This embodiment features a housing assembly 400 with a housing 401 and an Edison screw 457 assembly mechanism for mounting the luminaire 100P into a traditional lamp socket (not shown). The housing encapsulates a PCB 302 onto which a laser diode 300D, or plurality of laser diodes 300D, is mounted. FIG. 43 depicts a collimated ray of light 200 travelling from a laser diode 300D through a light ingress surface 110 into a light guide 102, wherein it strikes an interior perimeter 124 at a concave interior portion 130 and reflects off the concave interior portion 130 toward a perturbed matrix 160 within the light guide 102, densely filled with extractors 134. As the ray of light 200 travels through the perturbed matrix, it will strike an extractor 134 and split into many less intense rays of light 200; each of these rays of light 200, in turn, strike extractors 134 and splits into further multiple rays of light 200 as the light travels to an exterior perimeter 126 of the light guide 102 and escapes the light guide as an extracted ray 206 of light. In this manner the present embodiment functions to create diffuse light from a more intense light source 300 such as a laser diode 300D. The present embodiment is shown as a compact light source, and therefore can be used within a lighting fixture, but may also be used independently as a luminaire 100P.

Smaller, light bulb sized embodiments could be used as a replacement to a light bulb, however larger embodiments, not shown, would further improve on glare reduction as they would have a larger extraction area or volume than the present embodiment, and could be used to replace an entire luminaire or lamp.

Figure 44:
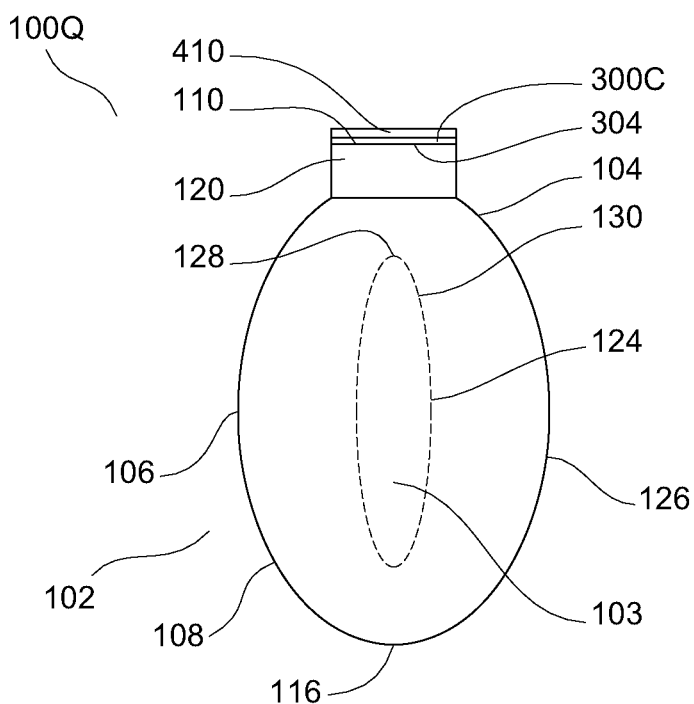
FIG. 44 is a seventeenth embodiment of a luminaire, with housing and associated components removed for clarity, showing an OLED light source mounted to the light ingress surface of a light guide, shown with hidden lines to reveal the hollow internal cavity within.

A seventeenth embodiment generally identified by reference numeral 100Q, will now be described with reference to FIG. 44, featuring an OLED 300C light source (housing assembly 400 removed for clarity). The OLED 300C has an emitting surface 304 that is placed directly to a light ingress surface 110 of a light guide 102.

Figure 45:
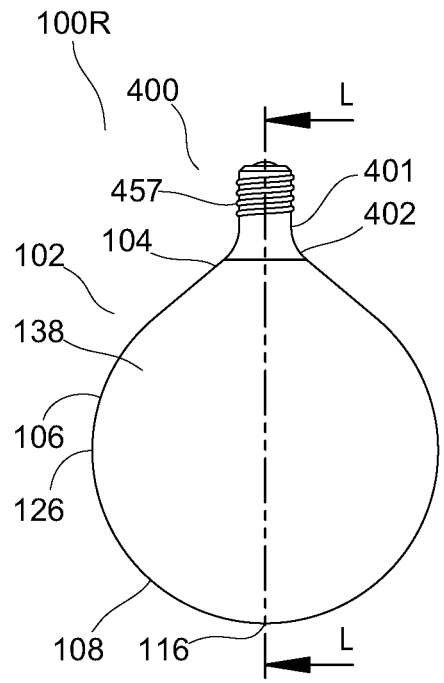
FIG. 45 is an eighteenth embodiment of a luminaire, showing a large globular light guide mounted within a housing featuring an Edison screw mount for installation into conventional North American light sockets.

An eighteenth embodiment generally identified by reference numeral 100R, will now be described with reference to FIG. 45 and FIG. 46, featuring a super-luminescent diode light source, light well, recessed light ingress surface, and remote phosphor.

The present embodiment features a super-luminescent diode 300E or plurality of super-luminescent diodes 300E, generally mounted to a PCB 302. The super-luminescent diode 300E is recessed within a light-well 111 at the proximal end of the light guide 102; at the distal end of the light-well 111 is a recessed light ingress surface 110; the light-well 111 is disposed to trap reflected light from the light ingress surface 110 within the light-well by blocking light escaping by means of the sidewalls of the light-well 111 and the PCB 302, the trapped light thereby directed back through the light ingress surface 110 into the light guide 102 by way of reflecting off the reflective anterior face 303 of the PCB 302 and the sidewalls of the light-well. A remote phosphor 301 on the light-ingress surface 110 is disposed to facilitate an improvement in color rendering capability or change in color temperature of the super-luminescent diode 300E; the term 'remote phosphor' designates that it is not assembled within the diode. The remote phosphor 301 may be a treatment, coating or secondary component or the like.

Figure 47:
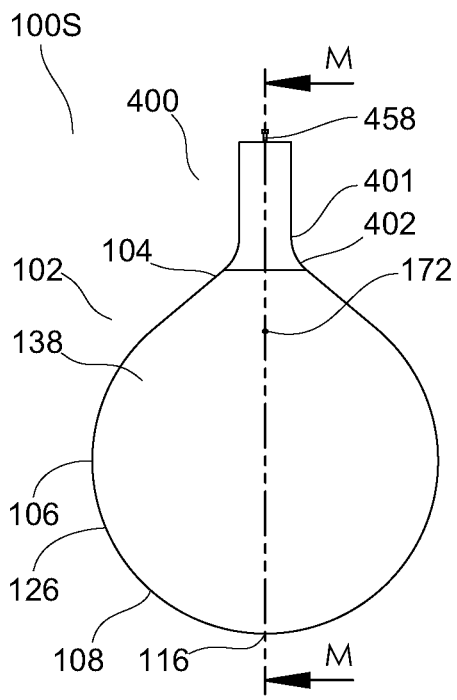
FIG. 47 is an nineteenth embodiment of a luminaire, showing a large globular light guide mounted within a housing featuring an GU24 bi-pin mount for installation into North American energy-savings rated light sockets intended for high-efficiency lighting, with a hole through the light guide connecting the interior hollow cavity to an environment exterior of the light guide, where a treatment to create extractors may be introduced within the cavity.

A nineteenth embodiment generally identified by reference numeral 100S, will now be described with reference to FIG. 47 and FIG. 48, featuring a bi-pin 458 mounting and power connection, a housing integrated, a means to provide extractor treatment to an internal cavity within a closed light guide.

As depicted in section view in FIG. 48, a light guide 102 features a means of treating a closed internal cavity 103 to create a perturbed interior surface 140 that functions as extractors 134 to cause light to escape the light guide 102; a treatment hole 171 in the light guide 102 allows a secondary treatment of the interior perimeter 124 by means of mechanical treatment means such as mechanical etching, sandblasting, bead-blasting, and the like, or chemical treatment means like acid etching, reflective coatings and the like. The treatment hole 171 allows the tool or material (solid, liquid, or vapor) to enter the internal cavity 103 to make the treatment to create the perturbed interior surface 140, and may be closed afterwards by means of a hole-plug 172 to make a hermetically sealed internal cavity 103. The amount of treatment is a function of the process and duration, and impacts the effects of the extractors 134 of the perturbed interior surface 140.

A housing assembly 400 houses a driver 500 to power a light source 300, such as a COB 300B. The driver 500 allows the luminaire 100S to be fitted into a conventional socket that provides line-voltage (i.e. 110-120V in North America; 22-240V in Europe, for example) power to the luminaire, thereby permitting the embodiment to be an integrated lighting product that replaces the requirement of a bulb-type light source surmounted by a shade or diffuser as with conventional lighting products. IN some embodiments the driver 500 may incorporate a wireless communication and/or control module. The large light extraction area of the perturbed interior surface 140 provides high efficacy light output with low glare.

The COB 300B may be fixed to a direct heatsink 410 integrated with the housing assembly 400, and the light-emitting portion of the COB 300B may be recessed within a light-well 111A to minimize wasted light reflected proximally off of the recessed light ingress surface 111, as described in the eighteenth embodiment. Heat isolation means 461 prevents heat damage to a light guide 102 and a light ingress surface 110 in the form of a recessed light ingress surface 111 from a heatsink 410.

Further embodiments, shown as a light guide with other elements removed for clarity, will now be described with reference to FIG. 49 through FIG. 52, featuring a light guide 102 various mechanical means of fastening the light guide 102 to a housing 401 (not shown), with all other components removed for clarity.

Figure 49:
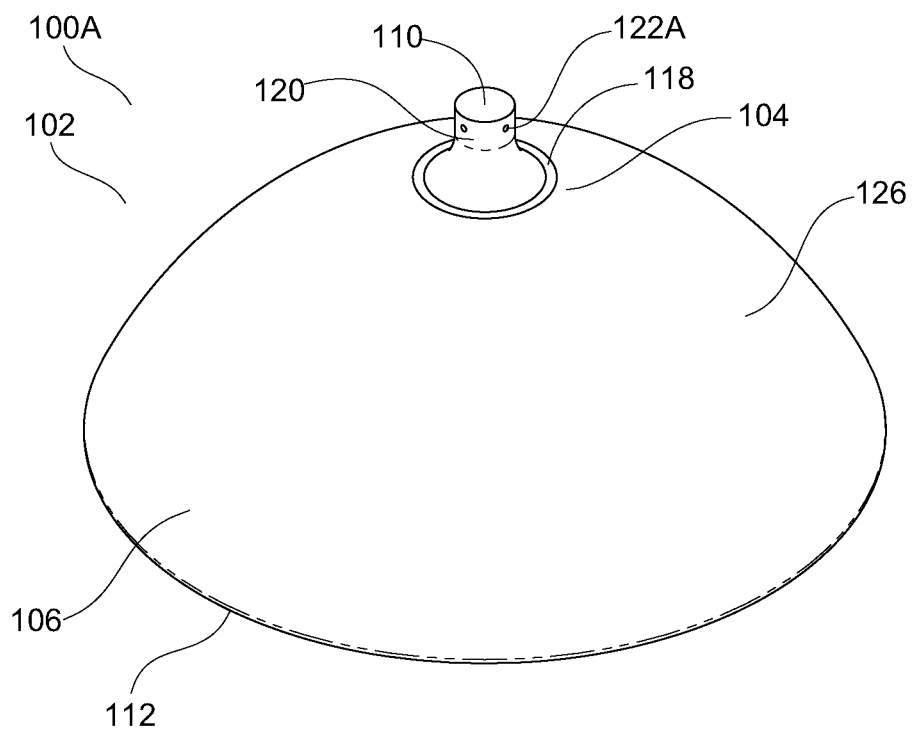
FIG. 49 is a perspective view of the light guide of FIG. 1, showing a detail of the fastening portion as holes in the light guide to which screws or pins may mount it to the housing.

FIG. 49 depicts a perspective view of a first embodiment of a light guide 102 as seen as part of a luminaire 100A in FIG. 1 to FIG. 4 featuring a fastening portion 122 being a hole or holes in the light guide 102 to support it to a housing 401 with screws, pins or the like; the hole or holes of the fastening portion may be threaded to accommodate screws.

Figure 50:
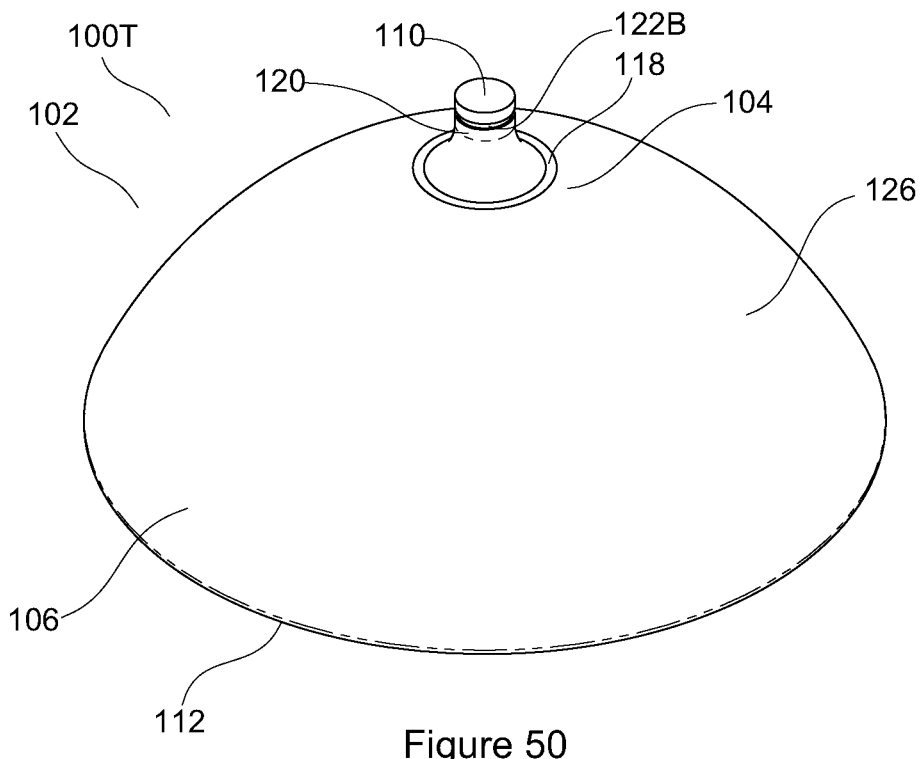
FIG. 50 is a perspective view of a light guide of a twentieth embodiment of a luminaire, showing an alternative fastening portion as a groove around a proximal conduit portion.

FIG. 50 depicts a twentieth embodiment of a luminaire, generally identified by reference numeral 100T, with a light guide 102 featuring a fastening portion 122 being a groove in the light guide 102 to support it to a housing 401 with screws, pins or the like.

Figure 51:
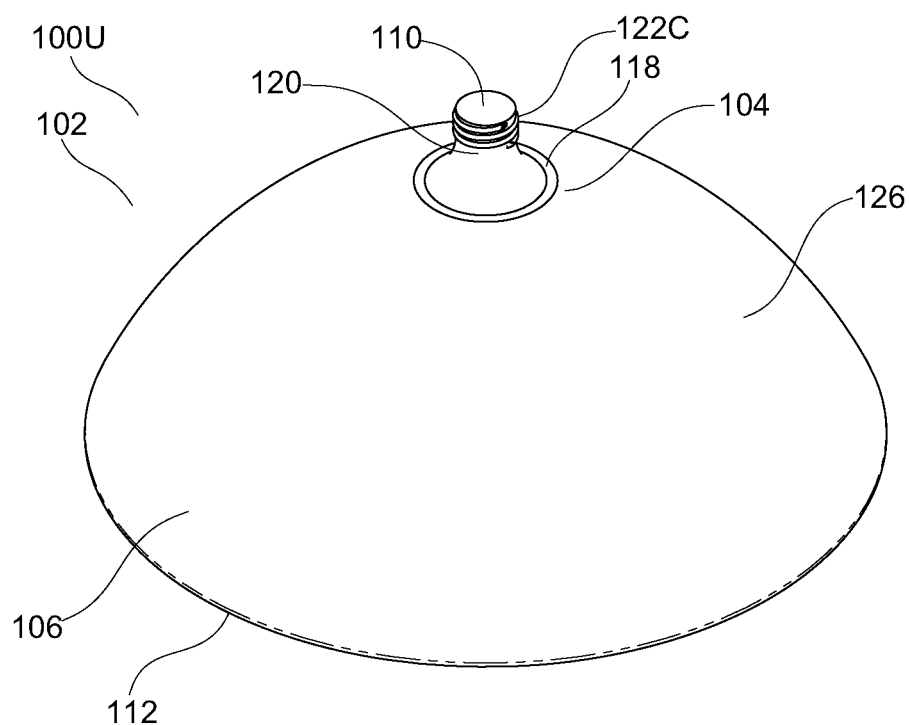
FIG. 51 is a perspective view of a light guide of a twenty-first embodiment of a luminaire, showing an alternative fastening portion as a thread around a proximal conduit portion.

FIG. 51 depicts a twenty-first embodiment of a luminaire, generally identified by reference numeral 100U, with a light guide 102 featuring a fastening portion 122 being a thread around a proximal conduit 120 portion of the light guide 102 to support it to a housing 401 with a matching thread receptacle.

Figure 52:
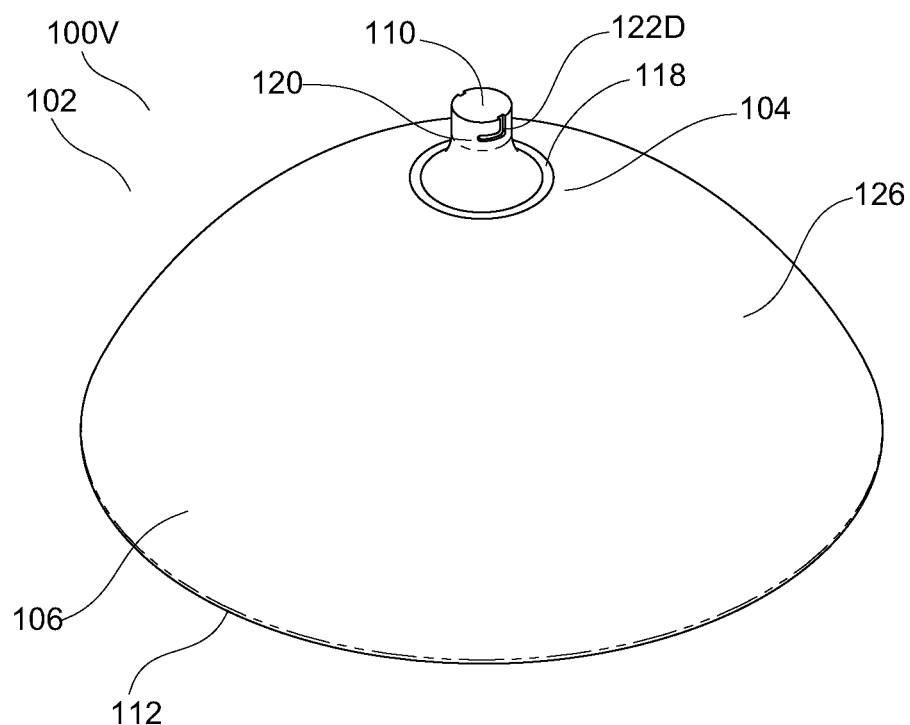
FIG. 52 is a perspective view of a light guide of a twenty-second embodiment of a luminaire, showing an alternative fastening portion as a twist-lock around a proximal conduit portion.

FIG. 52 depicts a twenty-second embodiment of a luminaire, generally identified by reference numeral 100V, with light guide 102 featuring a fastening portion 122 being a 'twist-lock', such as a quarter-turn slot, around a proximal conduit 120 portion of the light guide 102 to support it to a housing 401 with a matching pin receptacle; alternatively, the pin may be on the light guide, the twist-lock on the housing 401.

Figure 53:
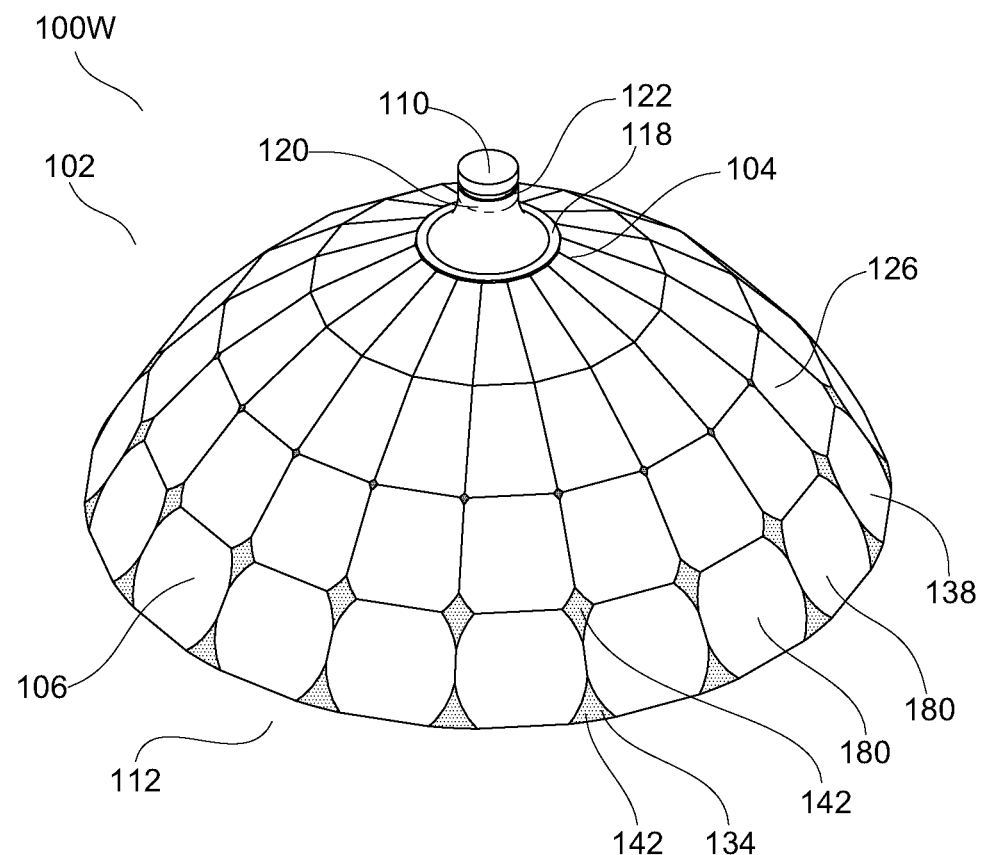
FIG. 53 is a perspective view of a light guide of an alternative twenty-third embodiment of a luminaire, showing faceted surfaces on the light guide, where some faceted surfaces are glossy, and some faceted surfaces feature extractors.

FIG. 53 depicts a twenty-third embodiment of a luminaire, generally identified by reference numeral 100W, with a light guide 102 featuring facets 180 on the light guide 102, providing a decorative element and functional element to the design of the light guide 102, whereon certain facets 180 feature extractors 134 on a perturbed exterior surface 142 to permit light to escape the light guide 102. The facets 180 featuring the extractors 134 may be patterned, as shown or otherwise, to provide a decorative element to the light guide 102. Other components comprising the luminaire 100W have been removed for clarity.

Figure 57:
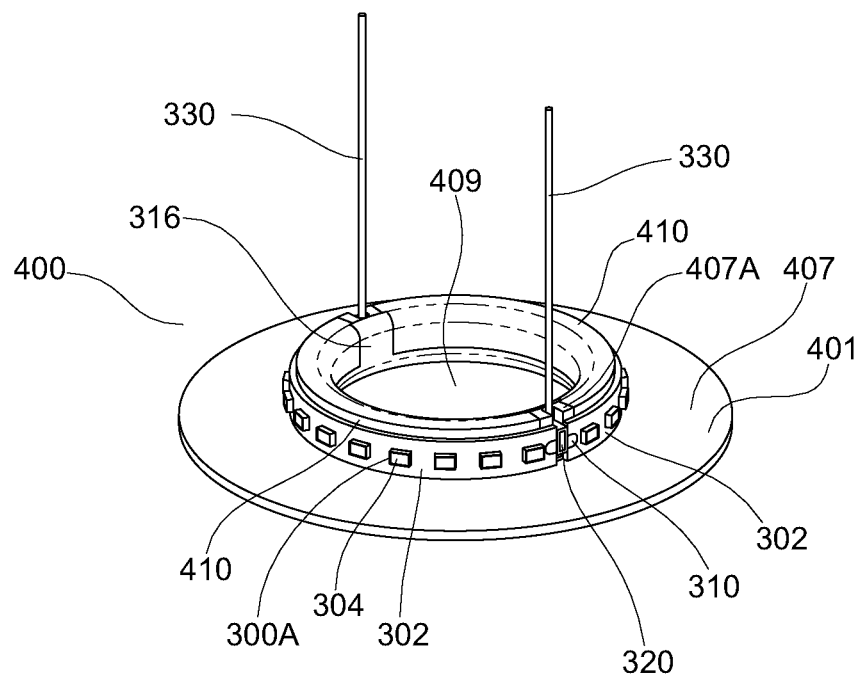
FIG. 57 is a top perspective view of the twenty-fourth embodiment of FIG. 54, with the cowl and light guide removed for clarity.
Figure 58:
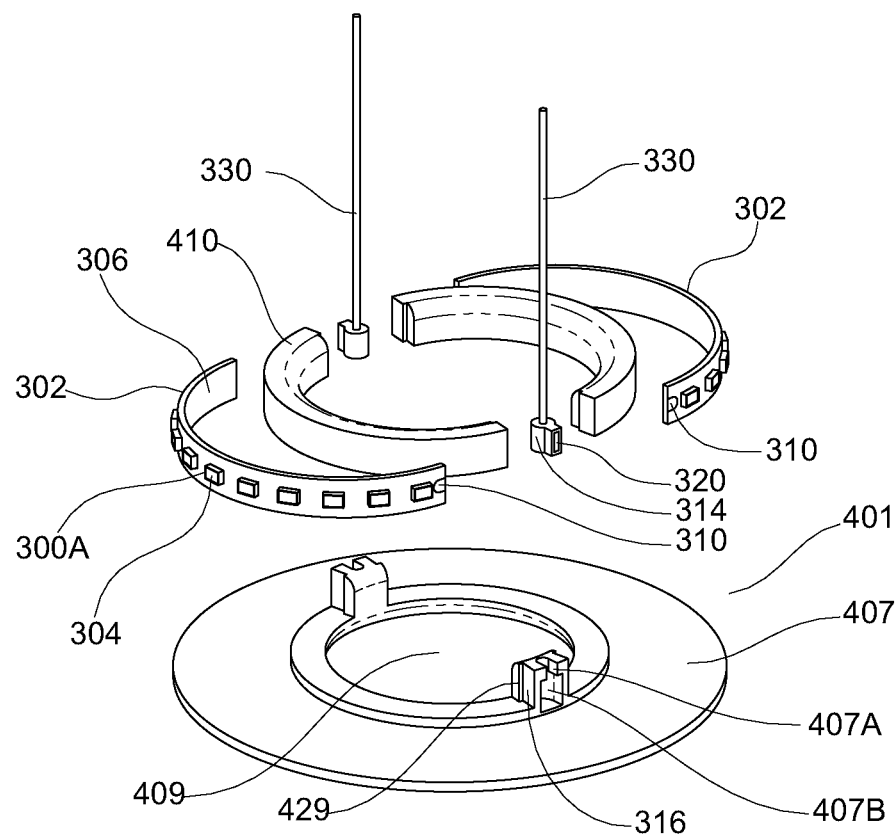
FIG. 58 is an exploded view of the assembly of FIG. 57.
Figure 59:
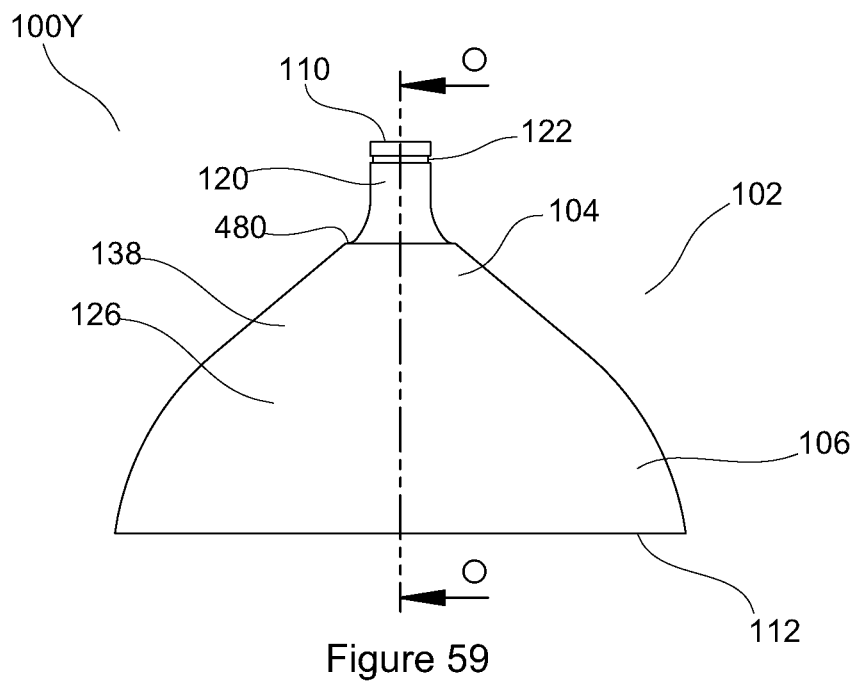
FIG. 59 depicts a light guide of a twenty-fifth embodiment of a luminaire, with an interior perimeter with glossy light extraction faces functioning as extractors and perturbed portions with extractors, with all other components removed for clarity.
Figure 60:
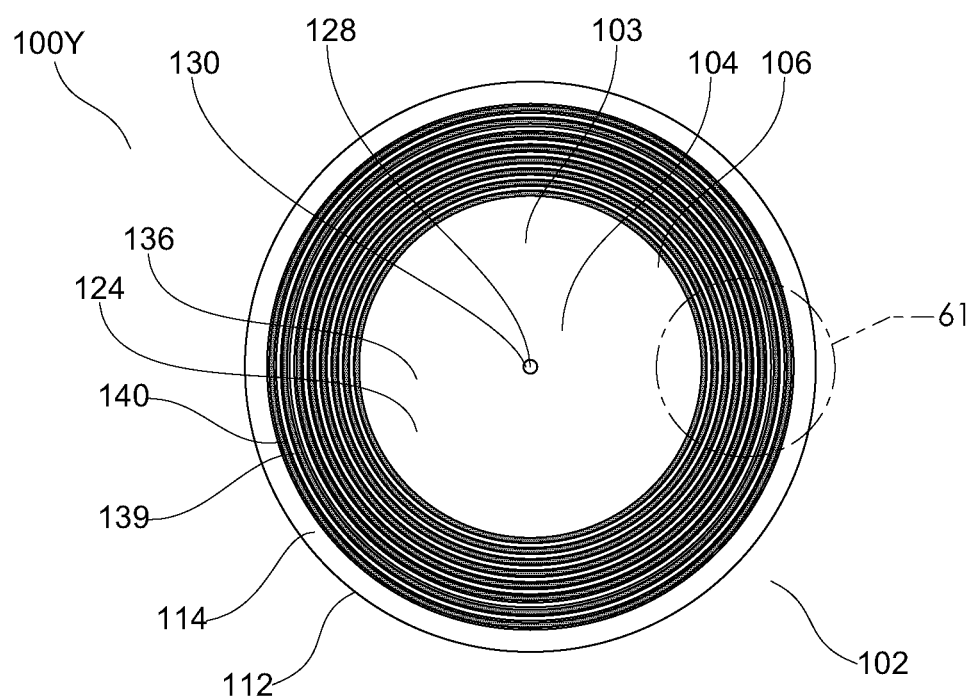
FIG. 60 is a bottom view of FIG. 59.
Figure 61:
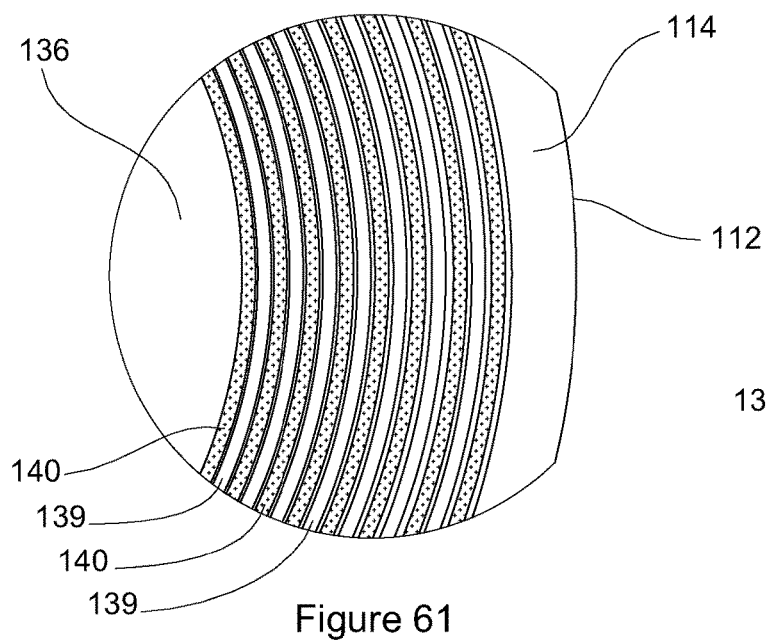
FIG. 61 is a detail view of a portion of FIG. 60.
Figure 63:
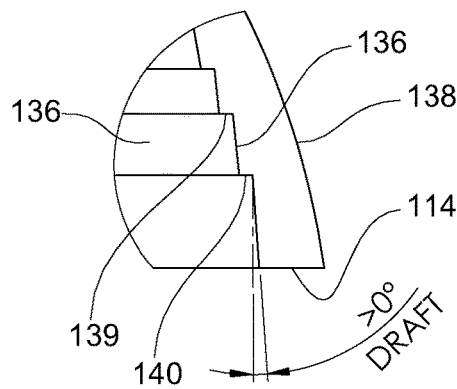
FIG. 63 is a detail view of a portion of FIG. 62.

A twenty-fourth embodiment generally identified by reference numeral 100X, will now be described with reference to FIG. 54 through to FIG. 58, featuring a light ingress surface 110 that forms a perimeter of a channel 131 at a proximal narrow portion 104 of a light guide 102, the cylindrical ring-shaped light ingress surface 110 of the present embodiment being nominally concentric to the principal axis 190 of the light guide 102, and permits light to effectively travel from the light ingress surface 110 distally without necessitating the requirement of a proximal conduit 120. A plurality of LEDs 300A are oriented in a nominally circular array, with light emitting surfaces 304 oriented outward and into the light ingress surface 110; the LEDs 300A may be mounted to a flexible PCB 302, which can be curved to provide means to array the LEDs 300A in a circular fashion to adopt a position that directs light into the light ingress surface 110, or a plurality of flexible PCBs 302, as shown in FIG. 57 and FIG. 58. A PCB 302 may be mounted with mounting means, such as thermally conductive adhesive 462 tape (not shown), or other means, to a direct heatsink 410, which may be shaped to retain the PCBs in a curved shape. The light source 300 may alternatively be a flexible OLED 300C (not shown).

The light ingress surface 110 in the present embodiment is shown as a cylinder centered at the axis 190 of the light guide 102, however it may be a faceted or polygonal plurality of light ingress surfaces 110, oval, or otherwise in shape in other embodiments to accommodate variations of a LED 300A array and/or PCB 302 designs.

The present embodiment is shown supported by a pair of electrically conductive cables 330A, each positioned at diametrically opposed, electrically non-conductive, supporting positions 407A that are shown as a notch in a portion connectable to a supporting component 407 comprising a portion of a housing 401, above a support recess 407B into which a terminal 314 end of a conductive cable 330A is received by a support recess 407B, and the cable 330A may pass through the notch of a support position 407A, supporting the housing 401 thereat. A terminal 314 is typically fashioned as a swage fixed to an end of a cable 330A, although may alternatively be a screw-terminal or the like. One conductive cable 330A is positive and its pair is negative or neutral; in systems requiring a ground, a third cable can be employed, and the three cables 330A (not shown) would typically be arrayed equally around a common axis 190. Though the present embodiment is shown supported by multiple conductive cables 330A, another embodiment may be supported by a single cable 330A possessing multiple conductive wires 312 connected to a lamp harp (not shown) as is conventional with suspended lamps. The conductive cables 330A may be supported by isolation bushings 442, typically fashioned from PBT or nylon or the like, that pass through bushing holes 441 on a canopy 440A that supports the cables 330A with the isolation bushings 442, which isolate the conductive cables 330A from the canopy 440A and components within. The cables 330A may be fixed and secured in place with a cable gripping device, a swage, or a screw terminal or the like (not shown).

The present embodiment has two PCBs 302 installed at diametrically opposed areas between the two conductive cables 330A, with the positive electrical contact 310 of each PCB positioned adjacent to the positive cable 330A, and likewise the negative or neutral electrical contact 310 positioned adjacent to the negative or neutral cable 330A. Once the PCBs 302 and conductive cables 330A are installed in the housing assembly 400, it is desirable to make an electrical connection between an electrical contact 310 at one end of a PCB 302 to a conductor 320 portion of a terminal 314 of the corresponding cable 330A. This is typically accomplished with solder, through a screw terminal or the like may be employed. The conductor 320 is employed to make contact with an interior electrically conductive core (not shown) of a cable 330A, when employed.

The light guide 102 is supported by the supporting component 407 during assembly. A direct heatsink 410 may be connected to the housing 401 as shown and retained by retainers 429; alternatively, the direct heatsink 410 may comprise a portion of the housing 401 so long as the cable 330A and its terminal 314 are isolated from any electrically conductive part of the housing 401, such as with an isolating bushing (not shown). In the present embodiment, the housing 401 and it dependent features are to be fabricated from non-electrically conductive and highly reflective material such as opaque white silicone, but may be fashioned from a durable thermoplastic like PBT or Nylon, or any other non-conductive material suitable for housing low-voltage electronics.

A housing 401 conceals the LEDs 300A, the light ingress surface 110, and a lower proximal portion of the narrow portion 104 from view of an observer external of the light guide 102; a separate upper cowl 402 is fitted by assembly means to the housing 401 to provide means to conceal the LEDs 300A and an upper proximal portion of the narrow portion 104, and is disposed to provide access to the PCB 302 and interior portions of the housing 401 during assembly and retrofitting. The housing assembly 400 may be internally hollow such that there is a clear view through the center of the channel 131 and through the housing assembly 400, and may comprise a vent 409 proximal to a direct heat sink 410, disposed to evacuate hot air and provide cooling to the LEDs 300A. As air proximal to the direct heatsink 410 heats, it rises out of the cooling vent 409, drawing in cooler air from within the hollow cavity 103 below that is connectible to the air in the environment exterior of the luminaire 100X. This drawing of air creates conduction of air through the luminaire 100X at the central vent 409, cooling the LEDs 300A via the direct heatsink 410. The conduction of air through the vent 409 can create a conduction of air throughout the environment, improving comfort conditions by increasing airflow exchange through the vent 409.

The present embodiment, as a variation on the design of extractors 134 and areas of extraction, shows a gradation in the density of extractors 134 from a low density extractor area 164A to a median density extractor area 164B to a high density extractor area 164C. The gradation in density may be stepped in distinct areas of specific density (as shown), or may alternatively be a gradual gradation (not shown); the present embodiment shows the gradation becoming more dense of extractors 134 the more distal the extractors 134 are from the light source 300, which improves the conduction of light towards a greater area of extraction, however the gradation may alternatively be less dense the more distal the extractors 134 are from the light source 300.

A twenty-fifth embodiment of a luminaire, generally identified by reference numeral 100Y, featuring a light guide generally identified by reference numeral 102, with all other components removed for clarity, will now be described with reference to FIG. 59 to FIG. 63, showing extractors 134 on an interior perimeter 124 fashioned so the light guide 102 may be manufactured by way of a two-part mold (not shown), the physical details of the extractors 134 being formed by a single mold component directly (not shown), without the requirement of movable molds parts like cams or lifters, or a secondary operation, as all extractor 134 details can be fashioned by a single mold component through the mold action without undercuts in the extractor 134 details. The fastening portion 122, shown as a groove in the proximal conduit 120 of the light guide 102, features an undercut relative to mold action that is in-line with the axis 190, and may require a moving cam or lifter or additional cavity and tool part in the complete mold to create the detail. Extractors 134 or other features on embodiments of a light guide 102 may be fashioned by moving mold components like cams or lifters, or by a secondary operation.

Figure 62:
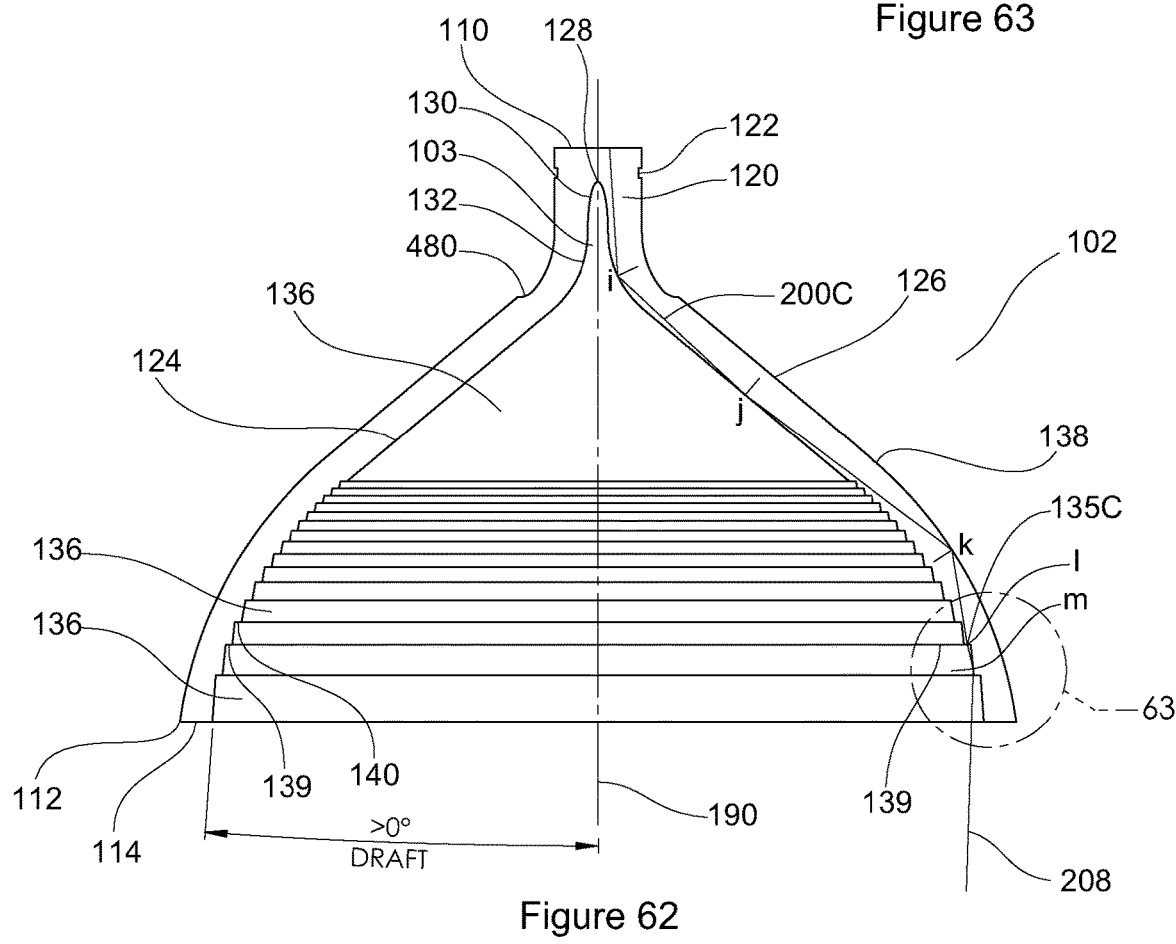
FIG. 62 is a section view along section O-O of FIG. 59.
Figure 64:
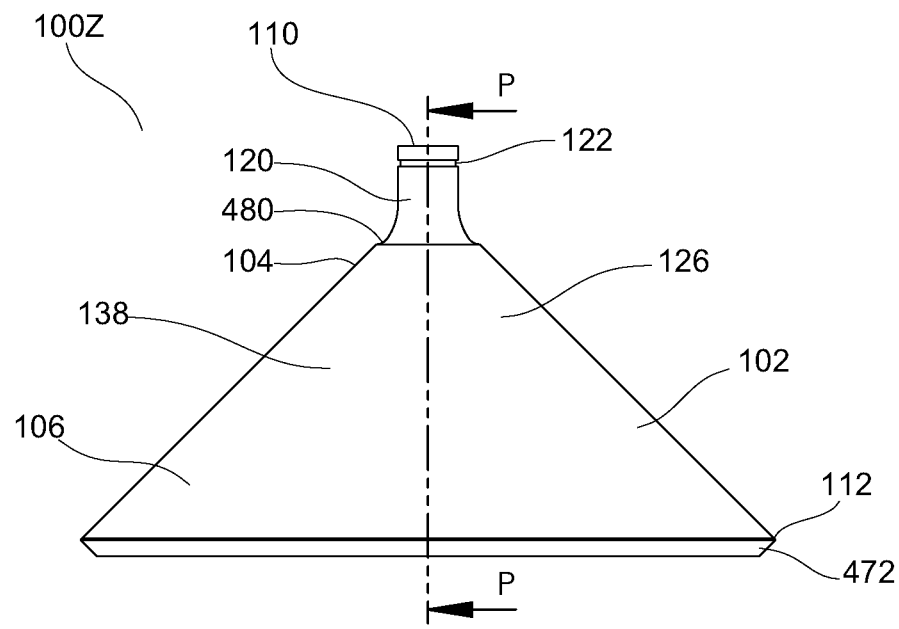
FIG. 64 depicts a light guide of a twenty-sixth embodiment of a luminaire, with lenses on an interior perimeter that function as extractors, and a reflector on a distal terminus, with all other components removed for clarity.

In the present embodiment, two alternative features are disposed to provide the extraction of light: there are perturbed interior surfaces 140 comprised of extractors 134; alternatively, glossy transmission surfaces 139, fashioned as annular facets in the present embodiment, allow rays of light 200 directed through the light guide 102 to strike a glossy transmission surface 139 at angles that allow normal transition of light. FIG. 62 depicts a ray of light 200C that travels from a light ingress surface 110 to strike interior surfaces 124 and exterior surfaces 126 within the light guide 102 at positions 'i', 'j' and 'k' before striking a glossy transmission surface 139 at position 'l' creating a light extraction 135C that results in an extracted ray of light 208 exiting the light guide 102, that strikes an interior glossy surface 136 at position 'm', exteriorly of the light guide 102, to reflect via TIR a ray the extracted ray of light 208 beyond the extents of the light guide 102.

Portions of the interior perimeter 124, including perturbed interior surfaces 140 and the extractors 134 that comprise them, and glossy transmission surfaces 139, are oriented that they could be fashioned by a molded component (not shown) that travels in-line with the direction of mold travel. In the present embodiment, these features are facilitated by being on stepped faces with interstitial interior surfaces 124 between them, facilitating TIR by being glossy interior surfaces 136. This is illustrative of how extractors may be molded directly into a light guide without necessitating the use of auxiliary mold parts or cams.

Molding processes include injection molding, blow molding, optical silicone molding, compression molding of glass or crystal, and the like. In order to be manufactured by molding in-line with the mold action, all interior or exterior surfaces must be greater than 0 degrees from the principal axis 190, coincident with and relative to the direction of mold travel; this angle is termed the release angle or draft angle. Depending on the material comprising the light guide 102, and the actual the actual draft angle required differs: small faces glossy surfaces, or those fashioned by optical silicone can be as low as 0.5°, however typical minimum draft angles for injection molding is 3°, and 5° for blow molding. Optical silicone is unique in that the finished light guide made of silicone is often rubbery, and therefore a 0° or even a negative draft angle may be employed on a mold half once the other mold half has been removed, as the rubbery material may deform with force to remove the optical silicone part. FIG. 62 depicts a section view of a light guide 102 showing glossy interior surfaces 136, perturbed interior surfaces 140, glossy transmission surfaces 139, concave interior portions 130 and convex interior portions 132 fashioned with draft angles greater than 0° from a line of mold travel, aligned with the principal axis 190 of the light guide 102. Likewise, exterior surfaces 126, surfaces comprising a gap 480, and a light ingress surface 110 are fashioned with draft angles greater than 0° to the line of mold travel. However, a notch comprising a fastening portion 122 in a proximal conduit 120 provides an example of a feature than cannot be made from molds released from action in-line with the mold travel, as the feature is undercut to mold action, so must be accommodated through a secondary mold component operation such as a cam or lifter, or from a secondary operation, such as machining.

Embodiments fashioned from flexible optical silicone can be dome-like, as depicted, or cone-like or be of some other self-supporting architecture that would prevent collapse or other deformation of the integrity of the flexible material of the light guide.

A twenty-sixth embodiment of a luminaire, generally identified by reference numeral 100Z, featuring a light guide generally identified by reference numeral 102, with all other components removed for clarity, will now be described with reference to FIG. 64 to FIG. 67. The present embodiment features lensed extractors 134, on a glossy interior surface 136 of a light guide 102, which are embossed and appear convex relative to the glossy interior surface 136. The extractors comprise a low density extractor area 164A and a high density extractor area 164C that comprise a perturbed interior surface 140, as depicted in FIG. 66. The more proximal low density extractor area 164A is on a narrower portion of the light guide 102, and therefore has less area to place extractors; the more distal high density extractor area 164C is on a wider portion of the light guide 102, permitting more extractors in the area than the low density extractor area 164A per degree, density in this embodiment determined by the number of extractors 134 per radial degree, not by area.

As depicted in FIG. 67, lensed extractors 134 may be demolded from a two part mold (not shown) with mold action in-line with axis 190 of the light guide 102 so long as the faces of the extractors 134 are greater or equal to 0° relative to the mold action; small faces, such as the small faces of extractors 134, that curve away from a point where the small face joins with a surface of the light guide 102 being proximal to 0° may be successfully demolded.

As seen in FIG. 67, a terminal reflector 472 on a distal terminus 112 provide means for reflecting light that travels to the distal terminus 112 back into the light guide 102 and in a proximal direction; the purpose is to prevent light from escaping at the distal terminus 112, and be directed back toward extractors 134, where the light may extract from. A terminal reflector 472 may be a reflective treatment on the distal terminus 112, such as paint or particle vapor deposition, an opaque reflective material co-injected or over molded on the light guide 102, or a secondary part fixed to the distal terminus with assembly means, such as with adhesive 462 (not shown).

FIG. 67 depicts two parallel rays of light 200D and 200E and their path of travel within a distal portion of the light guide 102, illustrative of the variation of optical phenomena that may occur within the light guide 102. Ray of light 200D strikes a glossy exterior surface 138 a position 'n' and reflects via TIR toward a lensed extractor 134 where it strikes the extractor 134 at position 'o' that causes extraction 135D of an extracted ray 206 that exits the light guide 102, changing direction due to refraction. A parallel ray of light 200E strikes a glossy interior surface 136 at position 'p' and reflects via TIR towards position 'q'. What differentiates the behavior of the two parallel rays of light 200D and 200E is the angles at which they strike portions of an interior perimeter 124; the glossy interior surface 136 at position 'p' provides a surface angle that permits TIR, whereas the change in angle facilitated by the lensed extractor 134 at position 'o' facilitates extraction 135D.

The lensed extractors 134 may be designed and placed to create desirable angles of extracted rays 206, such as to diminish glare.

Following ray of light 200E from position 'q', the ray of light 200E reflects via TIR towards position 'r' where the distal terminus 112 is faced with a terminal reflector 472 that reflects the ray of light 200E via normal reflection toward position 's' where it is reflected via TIR toward position 't', that in turn reflects via TIR toward position 'u' on the surface of an extractor 134 causing extraction 135E to create the extracted ray 206.

Figure 68:
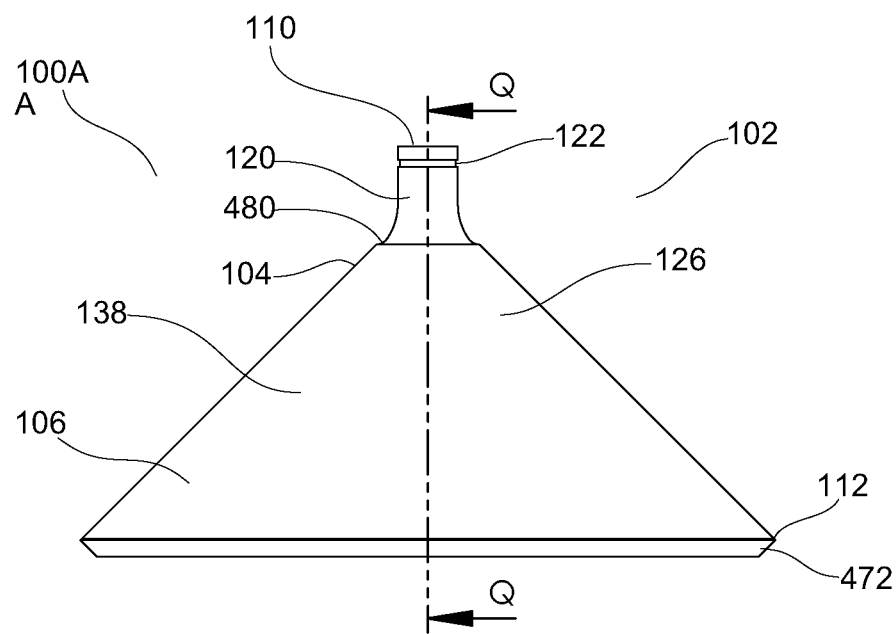
FIG. 68 depicts a light guide of a twenty-seventh embodiment of a luminaire, with lenses on an interior perimeter that function as extractors, and a reflector on a distal terminus, with all other components removed for clarity.
Figure 69:
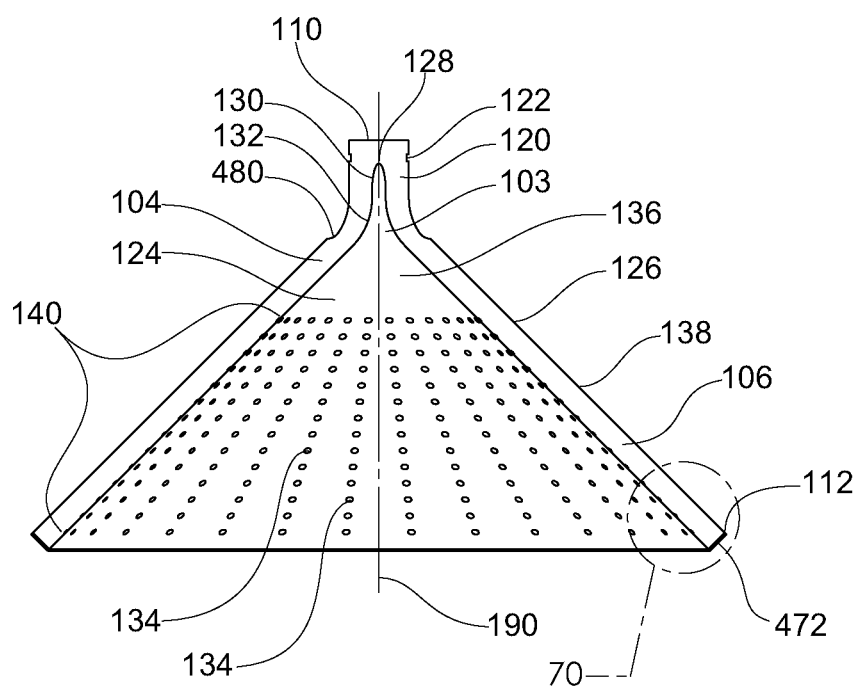
FIG. 69 is a section view along section Q-Q of FIG. 68, showing an area of extractors of that becomes less dense distally as the light guide widens.
Figure 70:
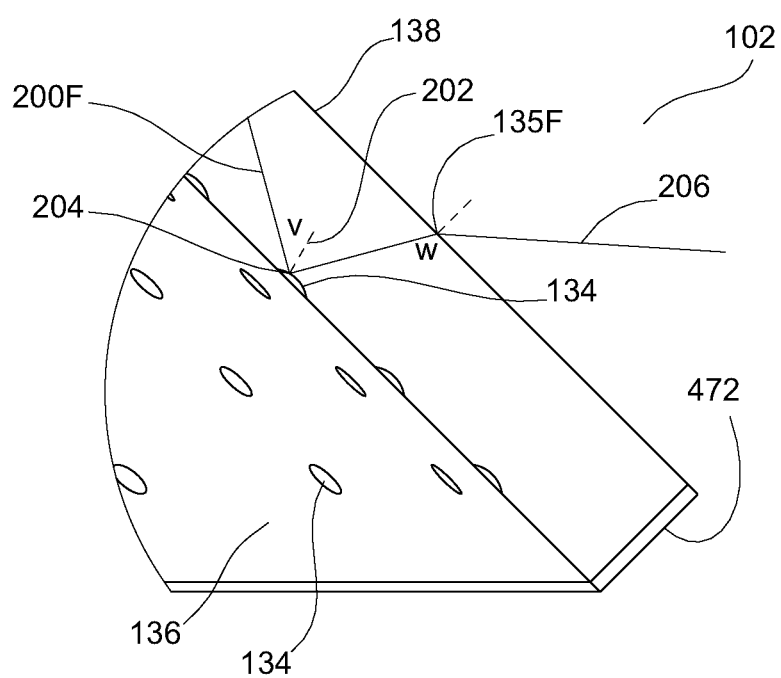
FIG. 70 is a detail view of a portion of FIG. 69, showing the conduction of a ray of light to a debossed extractor on an internal perimeter and its effect.

A twenty-seventh embodiment of a luminaire, generally identified by reference numeral 100AA, featuring a light guide generally identified by reference numeral 102, with all other components removed for clarity, will now be described with reference to FIG. 68 through FIG. 70. The present embodiment features lensed extractors 134, on a glossy interior surface 136 of a light guide 102, which are debossed and appear concave relative to the glossy interior surface 136. FIG. 70 depicts a ray of light 200F striking a debossed extractor 134 at position 'v' at an angle that facilities TIR 204 towards an exterior glossy surface 138 where the ray of light 200F strikes the exterior glossy surface 138 at position 'w' at an angle below the critical angle, relative to the normal 202 at the strike position 'w', and causes an extraction 135F to create an extracted ray 206. This is demonstrative of how an extractor 134 may cause an extraction of light exiting a light guide 102 on an opposing surface from that which the extractor 134 is on.

Figure 71:
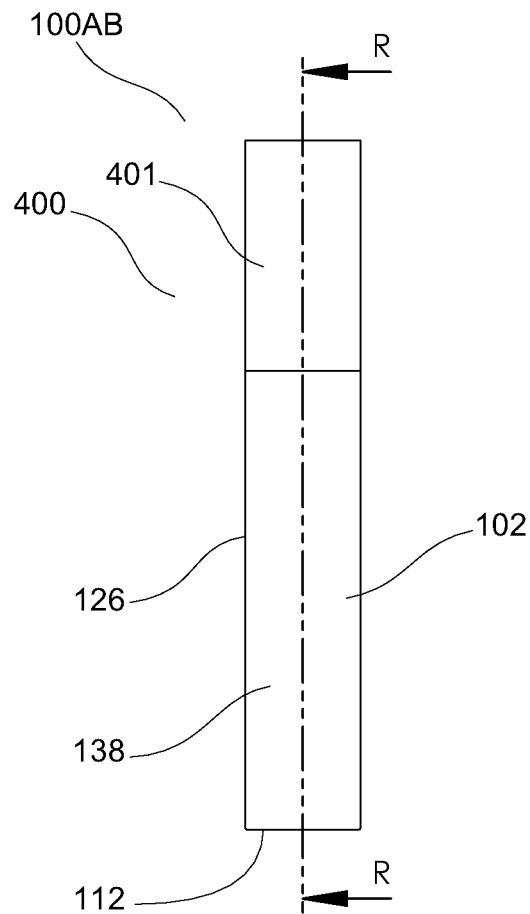
FIG. 71 is a twenty-eighth embodiment of a luminaire, with a nominally cylindrically shaped light guide.
Figure 72:
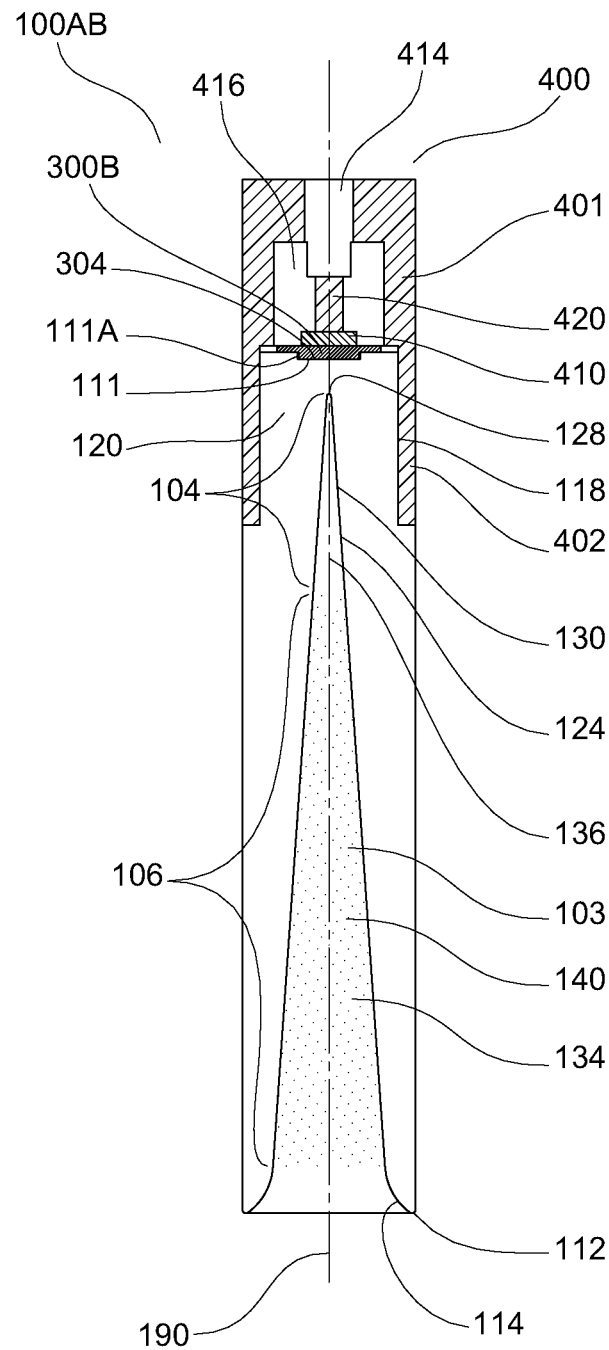
FIG. 72 is a section view along section R-R of FIG. 71, showing a conic shaped concave interior perimeter that widens distally.

A twenty-eighth embodiment of a luminaire, generally identified by reference numeral 100AB, will now be described with reference to FIG. 71 & FIG. 72. The luminaire is comprised of a cylindrical light guide 102 mounted to a housing 401 within which a COB 300B is retained, where a light emitting surface 304 is oriented toward and adjacent to a recessed light ingress surface 111 of the light guide at the bottom of a light well 111A, so that light may be directed toward distal portions of the light guide 102, centered around a distally widening cavity 103 in the form of a cone that comprises a concave interior portion 130 with a proximal cavity terminus 128, fashioned as a point, proximal to a narrow portion 104 of the interior perimeter 124 comprising a glossy interior surface 136 and a distal wide portion 106 comprised of a perturbed interior surface 140 that features extractors 134. The narrow point of the proximal cavity terminus 128 facilitates a maximum of light to strike and reflect via TIR against an interior perimeter 124 comprising the hollow cavity 103.

Figure 73:
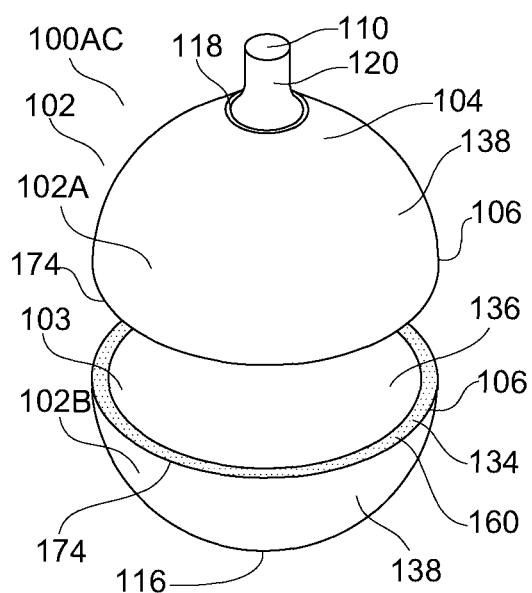
FIG. 73 depicts a light guide of a twenty-ninth embodiment of a luminaire, fashioned in two parts, a proximal component and a distal component, where the proximal component is fashioned from light conducting material and the distal component is fashioned with extractors within the matrix of light conducting material comprising it, that are to be joined together to comprise a light guide, with all other components removed for clarity.
Figure 74:
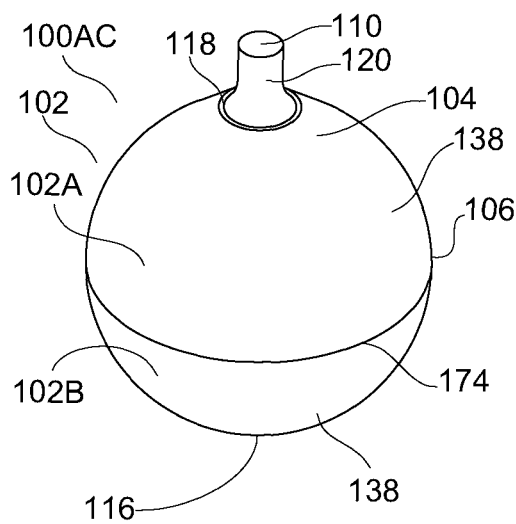
FIG. 74 depicts the light guide of FIG. 73 with the proximal and distal components joined together.

A twenty-ninth embodiment of a luminaire, generally identified by reference numeral 100AC, will now be described with reference to FIG. 73 & FIG. 74. A light guide 102 is comprised of a proximal component 102A and a distal component 102B, such that a globular shaped light guide 102 made be made via injection molding or optical silicone molding and the like, where a proximal component 102A and a distal component 102B may be molded without unfeasible undercuts and joined together to comprise a single light guide 102 with assembly means at a seam 174; all other components have been removed for clarity. Assembly means (not shown) may preferentially be transparent silicone or adhesive, or may be ultrasonic welding or mechanical means, such a lip on perimeters of both parts joined with a batten, or a snap-fit between the two components, however assembly means must provide transparent connection between the two components at the seam 174 to provide light conduction from the proximal component 102A to the distal component 102B. Both the proximal component 102A and a distal component 102B are shown with glossy surfaces throughout, glossy interior surfaces 136 and glossy exterior surfaces 138, however the distal component 102B features extractors 134 within the perturbed matrix 160 of the distal component 102B, whereas the proximal component 102A is glossy throughout. Extractors 134 may take the form of spherical extractors as shown, or another extractor type, added to the matrix material comprising the major portion of the distal component 102B, to comprise a syntactic material, manufacturable and demoldable by injection molding or optical silicone molding or other two-part mold manufacturing, or blown technique; the matrix of the distal component 102B provides light conduction and the extractors 134 provide light extraction. Manufacturing and assembly takes advantage of the proximal component 102A and the distal component 102B being made from two distinct material formulations to process each separately. Once assembly is made, light will transmit from the proximal component 102A of the light guide 102 into the distal component 102B, from which it may be extracted.

Figure 75:
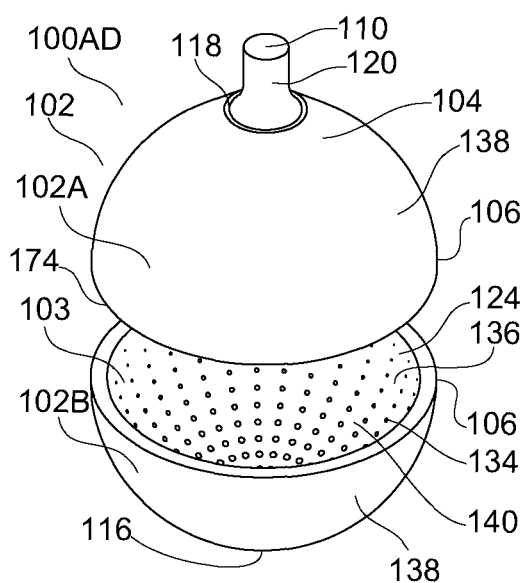
FIG. 75 depicts a light guide of a thirtieth embodiment of a luminaire, fashioned in two parts, a proximal component and a distal component, showing extractors on an interior perimeter of a distal component, with all other components removed for clarity.

A thirtieth embodiment of a luminaire, generally identified by reference numeral 100AD, will now be described with reference to FIG. 75, showing an alternative embodiment of a distal component 102B to the twenty-ninth embodiment. A distal component 102B features extractors 134 on a perturbed interior surface 140 of an interior perimeter 124. Extractors 134 may take the form of lenses in the light guide 102. Making the light guide 102 to be comprised of two distinct components, a proximal component 102A and a distal components 102B, that come together to form an enclosed cavity 103, facilitates added complexity and detail to interior portions of either component, such as extractors 134, which may be manufacturable and demoldable by injection molding, optical silicone molding or other two-part mold manufacturing, in the otherwise closed cavity 103 of the assembled light guide 102.

Figure 76:
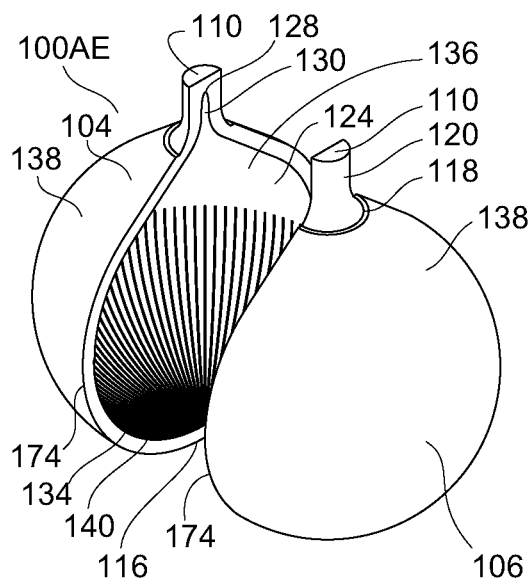
FIG. 76 depicts a light guide of a thirty-first embodiment of a luminaire, fashioned in two parts that feature extractors on interior perimeters, a LHS component and a RHS component, that are to be joined together to comprise a light guide, with all other components removed for clarity.
Figure 77:
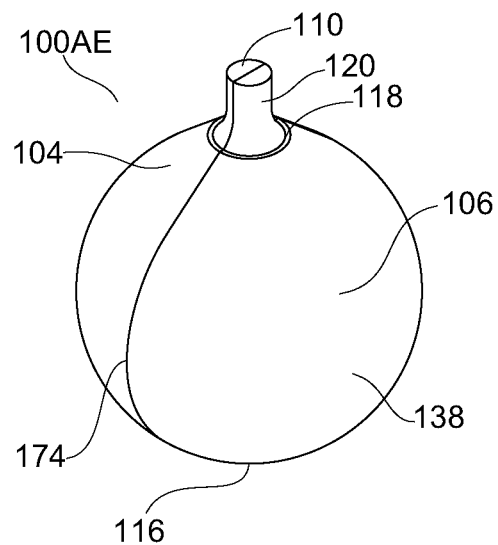
FIG. 77 depicts the light guide of FIG. 73 with the LHS and RHS components joined together.
Figure 78:
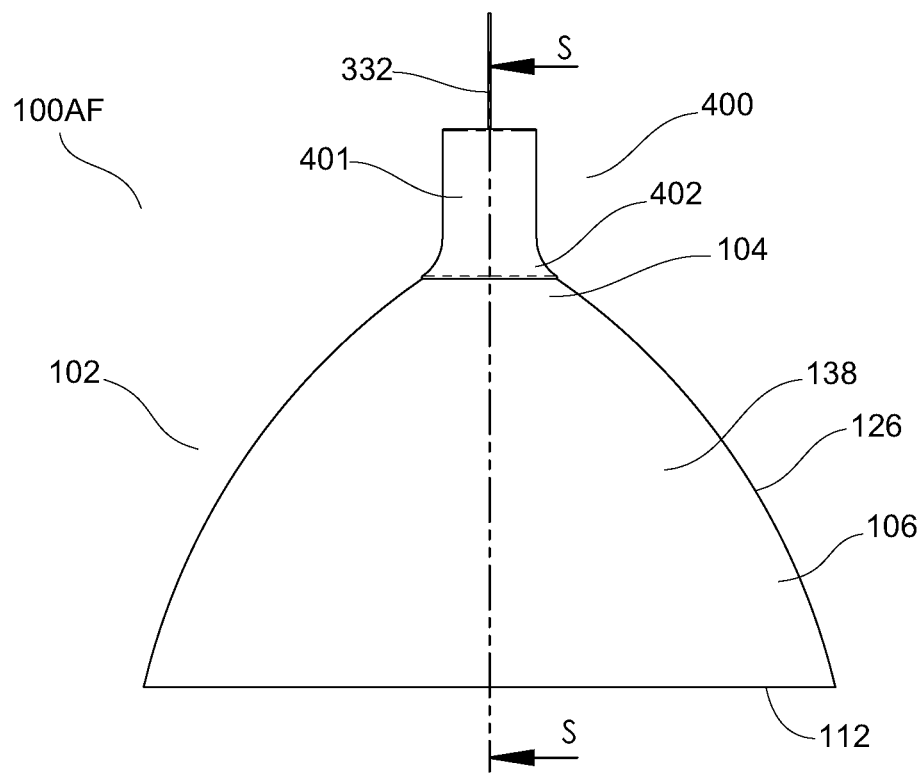
FIG. 78 depicts a thirty-second embodiment of a luminaire, where a channel through a hollow light guides connects a surrounding environment through the luminaire, through a hole in a PCB, and through a heatsink and housing, to permit the conductivity of the atmosphere comprising the environment through the luminaire to cool it by drawing heat away from LEDs mounted to the PCB.
Figure 79:
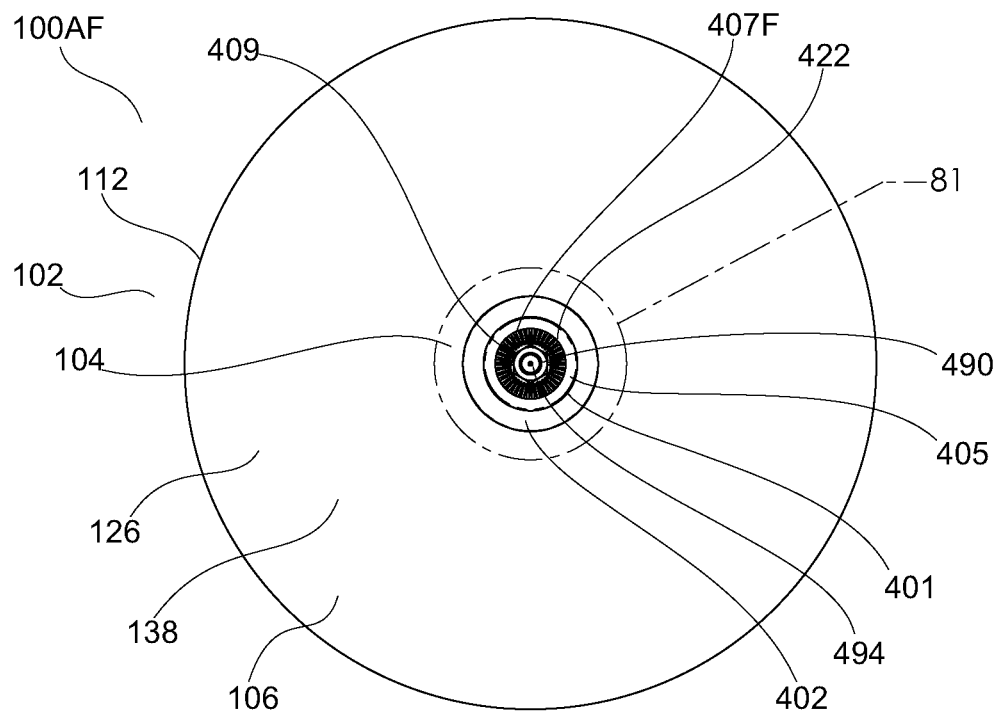
FIG. 79 is a top view of the embodiment of FIG. 78.
Figure 80:
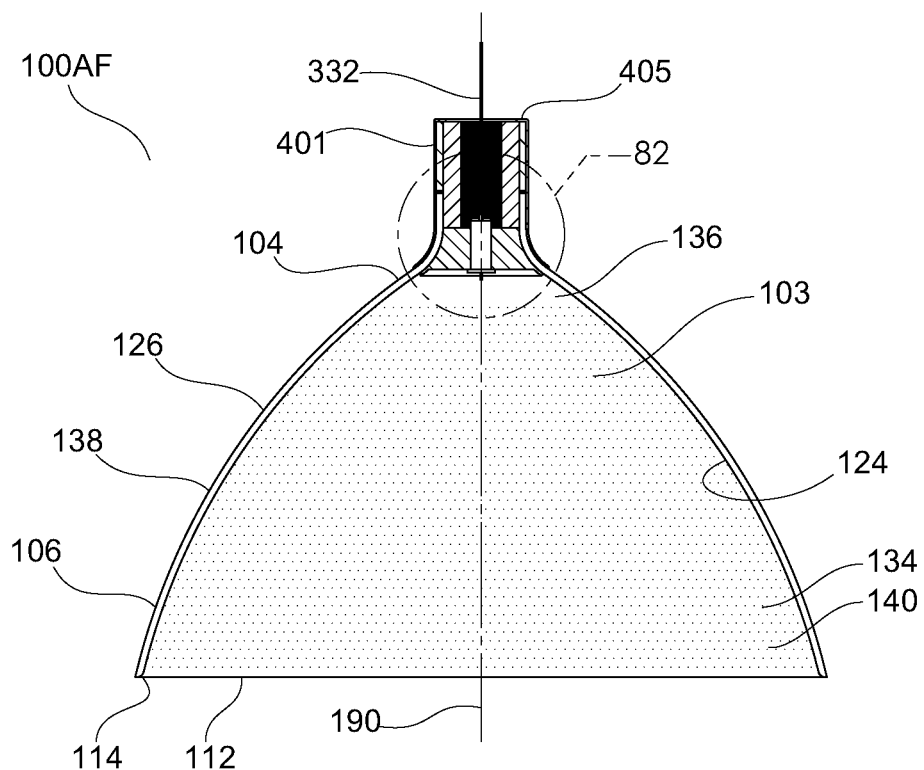
FIG. 80 is a section view along section line S-S of the thirty-second embodiment shown in FIG. 78, showing atmospheric connectivity through a channel through the luminaire.
Figure 81:
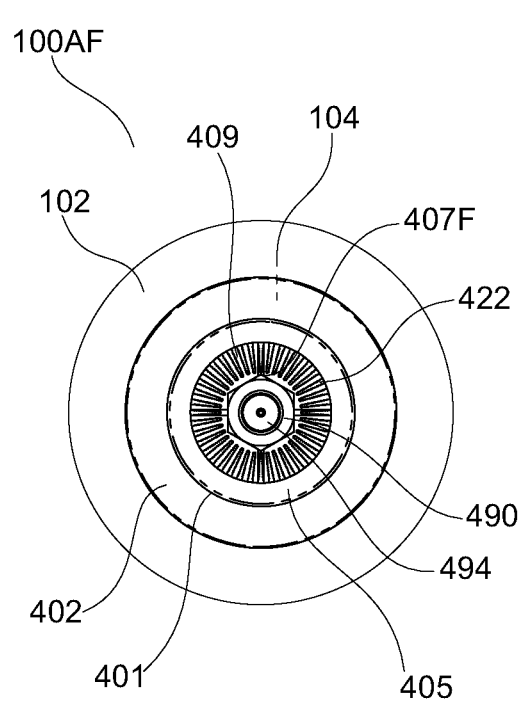
FIG. 81 is a detail view, from FIG. 79, of an interior perimeter of a channel through the luminaire showing heatsink fins of a heatsink oriented inwards and disposed to immersion in an environmental atmosphere, and an internal supporting structure comprised of an internal support bracket and suspension cable gripper.
Figure 82:
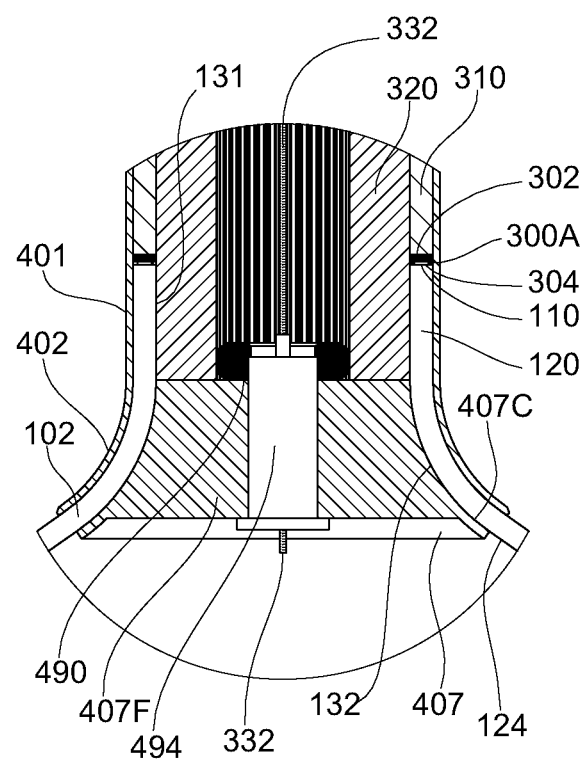
FIG. 82 is a detail view of Section S-S from FIG. 80, showing a direct heatsink connected to a PCB, in turn connected to a secondary heatsink at an interior perimeter of the direct heatsink, an internal supporting structure comprised of an internal support bracket suspension cable and suspension cable gripper.

A thirty-first embodiment of a luminaire, generally identified by reference numeral 100AE, will now be described with reference to FIG. 76 & FIG. 77, showing a light guide 102 with all other components removed for clarity. A light guide 102 is comprised of two nominally symmetric halves, a LHS component 102C and a RHS component 102D, such that a globular shaped light guide 102 made be made via injection molding or optical silicone molding in two halves, where either half may be molded without undercuts that prevent removal from the mold and joined together with assembly means to comprise a single hollow light guide 102 with an internal cavity 103. Assembly means (not shown) may preferentially be reflective silicone or adhesive, or be transparent silicone or adhesive, ultrasonic welding or mechanical means, such as a lip on seams 174 of both parts joined with a batten (not shown), or an edge on one half may join to a recess on the other (not shown) to comprise a seam 174; either half may be identical, or include differing mating details and the like. Extractors 134 on an interior perimeter 124 may be manufacturable and demoldable by injection molding, optical silicone molding or other two-part mold manufacturing; extractors 134 may take the form of grooves in the light guide 102, as shown, with faceted faces. A seam 174 between the two parts will have little influence in distribution through either half, since an equally balanced light source will transit through both halves equally, however a reflective seam 174 material will tend to be more advantageous over a transparent seam 174 material as the possible percentage of reflectivity of selected adhesive materials is generally higher than the percentage of transmission. Gaps, lips and joints, snap-fits and the like, not shown, may be disposed to optimize assembly and adhesion.

A thirty-second embodiment of a luminaire, generally identified by reference numeral 100AF, will now be described with reference to FIG. 78 through FIG. 87, showing a channel 131 through a hollow light guide 102 that connects an atmosphere of a surrounding environment, like air, through the luminaire 102, through an interior cavity 103, through the channel 131, through a hole 308 in a PCB 302, and through a direct heatsink 410, secondary heatsink 420 and housing 401, to permit the conductivity of the atmosphere through the luminaire 102 to cool it by drawing heat away from LEDs 300A mounted to the PCB 302 via the heatsinks.

In preferred embodiments, a circular array of LEDs 300A are mounted to a PCB 302 with a large hole 308 in the middle. A direct heatsink 410, in the form of a highly thermally conductive copper tube, draws heat away from the LEDs 300A via the PCB 302 adjacent to it and transfers the heat to a secondary heatsink 420 from an interior perimeter 424 of the direct heatsink 410 to an exterior perimeter 425 of the secondary heatsink 420. Heat transferred to the secondary heatsink 420 may be disposed through an interior perimeter 424 from which heatsink fins 422 are disposed to provide a greater surface area for heat conduction and removal, which is further facilitated by heatsink undulations 423 on portions of the secondary heatsink 420, as shown in FIG. 84. While embodiments may feature only a direct heatsink 410 with heatsink fins 422, the two part design with a direct heatsink 410 made of copper facilitates a superior conduction of heat away from the LEDs 300A over aluminum, whereas the secondary heatsink 420 and dependent features like heatsink fins 422 expels heat from the luminaire, a component which may be made through a conventional aluminum extrusion process and be pressure fitted with thermal grease into the direct heatsink 410 for thermal conductivity between the two heat-sinking components; conceivably, a single extruded copper heatsink 410 with heatsink fins 422 would provide an ideal single heat-sinking component. A housing 401 with a retention portion 405 around a draft vent 409 retains the heatsinks and completes the assembly, and may be fixed to the assembly with assembly means.

In preferred embodiments, the luminaire 102 is suspended such that air (as an example of atmosphere) passes into the cavity 103 from a lower position exterior of the luminaire 102, and is drawn upwards through the channel 131 by the heated air above it, and thereby draws heat away from a heatsink in the form of a secondary heatsink 420 and directs the hot air upwards and exteriorly of the luminaire 100AF through a vent 409 in the housing 401 of housing assembly 400; as air is heated by a heatsink, it rises and evacuates, and draws in and upwards cooler air from below. The heat conduction system of the embodiment draws heat away and cools the LEDs 300A and may provide beneficial air circulation in the environment it is within.

The luminaire 100AF may be suspended by a single suspension cable 332, retained by a shouldered cable gripper 494 at an internal supporting component 407, and is locked in place with a threaded nut (threading not shown). The cable gripper 494 is suspended from a suspension cable 332, and is shown with a shoulder at one end and a fastening component 490 at the other, in the form of a nut, to support the luminaire 100AF at a mounting hole 407E in a central boss 407D of the supporting component 407, connected by support ribs 407F to a support portion 407C at a perimeter that supports the luminaire 100AF at the light guide 102; the support ribs 407F delineate vent apertures 407G in the supporting component 407 to allow an atmospheric medium, such as air, to vent through. The cable gripper 494 may alternatively be externally threaded and fitted to thread within the mounting hole 407E (not shown), or the luminaire 100AF may be supported by other support means, such as a power conduit 330. Power cables, wiring and other electrical components in the depicted embodiment have been removed for clarity.

Figure 88:
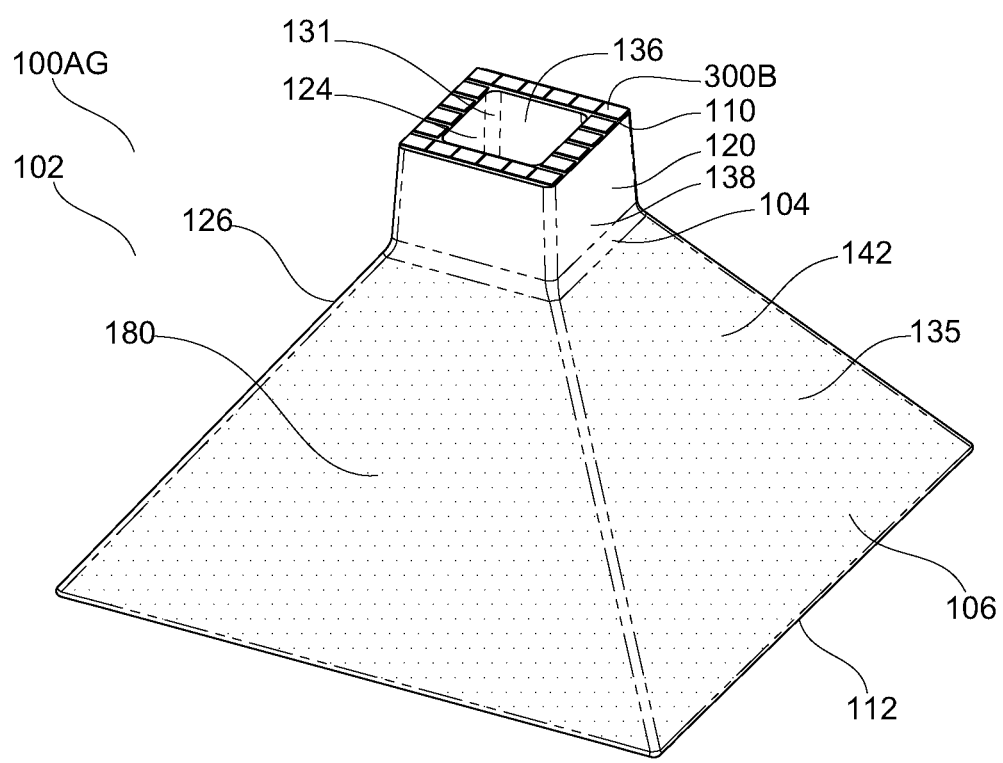
FIG. 88 is a top perspective view of the thirty-third embodiment of a luminaire, showing a nominally square light ingress surface of a hollow light guide surmounted with a square array of COBs, with a hollow center throughout, to allow conductivity of an environmental atmosphere through, the light guide transitioning from the square light ingress surface to a faceted, pyramid shaped hollow light guide.

A thirty-third embodiment of a luminaire, generally identified by reference numeral 100AG, will now be described with reference to FIG. 88, showing a perspective view of a nominally square light ingress surface 110 of a hollow light guide 102 surmounted with a square array of COBs 300B, with a hollow center throughout, to allow conductivity of an environmental atmosphere through the luminaire 100AG, the light guide 102 transitioning from the square light ingress surface 110 to a faceted, pyramid shaped hollow light guide 102 with facets 180 comprising interior and exterior portions. The embodiment provides an example of a variation of light guide 102 design.

Figure 90:
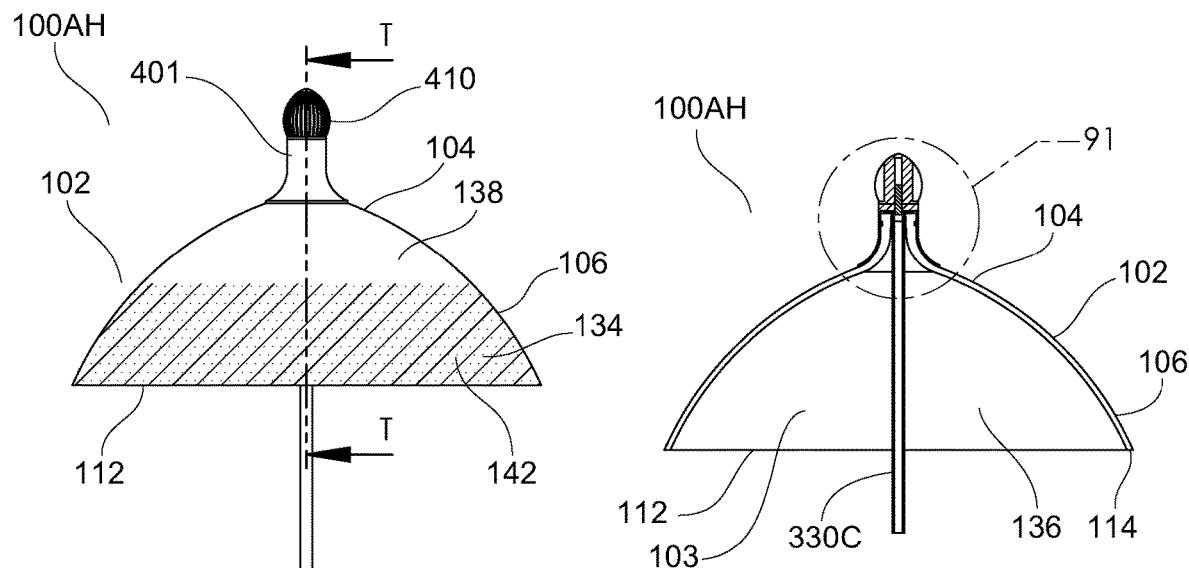
FIG. 90 is a partial section view T-T of FIG. 89, showing mounting of a light guide over a lamp support pipe, surmounted by a heatsink in the form of a finial.
Figure 89:
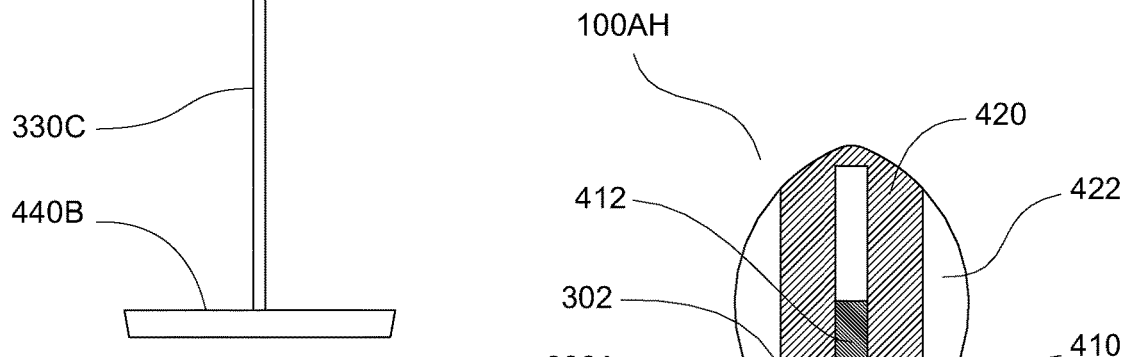
FIG. 89 depicts a thirty-fourth embodiment of a luminaire in form of a lamp stand.
Figure 91:
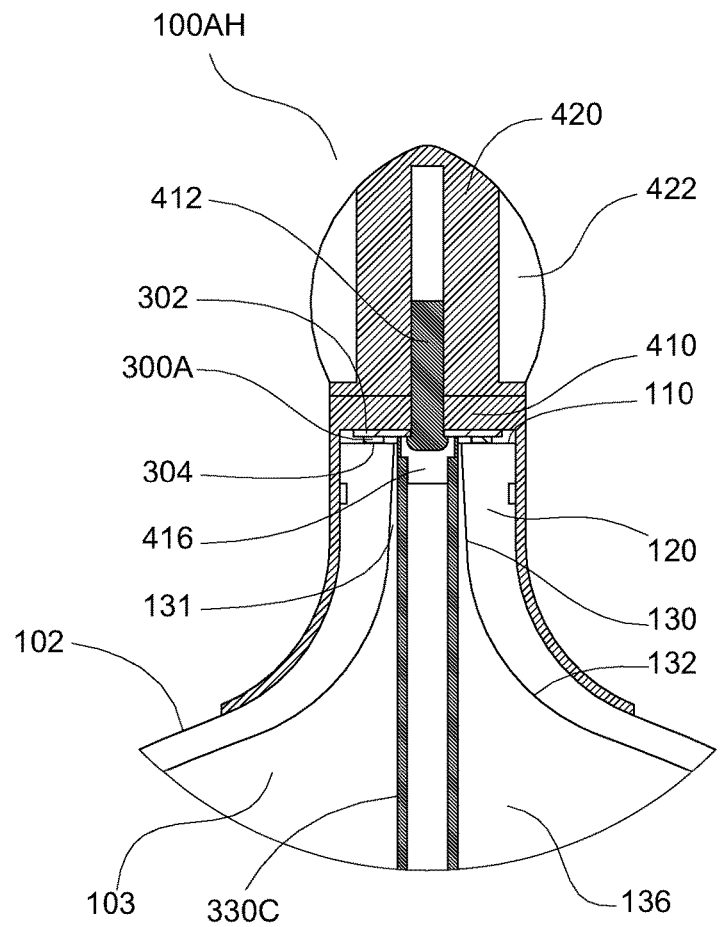
FIG. 91 is a detail view of FIG. 90. Showing wire and cable access through the pipe to the PCB.

A thirty-fourth embodiment of a luminaire, generally identified by reference numeral 100AH, will now be described with reference to FIG. 89 through FIG. 91. A light guide 102 with a hollow cavity 103 featuring a channel 131 in which a lamp stand comprised of a lamp base 440B supporting a hollow rigid pipe 330C, providing a conduit means of for a power cable 330A (not shown), where wring can be made through wire access 416 to connect to a PCB 302 where an array of LEDs 300A are mounted, around the channel 131 and with emitting surfaces 304 oriented into a light ingress surface 110 of the light guide 102. A housing provides a means of concealing the LEDs 300A and a proximal conduit 120 of the light guide, and a heatsink 410 draws heat away from the LEDs and to a secondary heatsink 420, in the form of a finial, that disperses the heat into the environment surrounding the luminaire 100AH via heatsink fins 422.

Figures 92, 93:
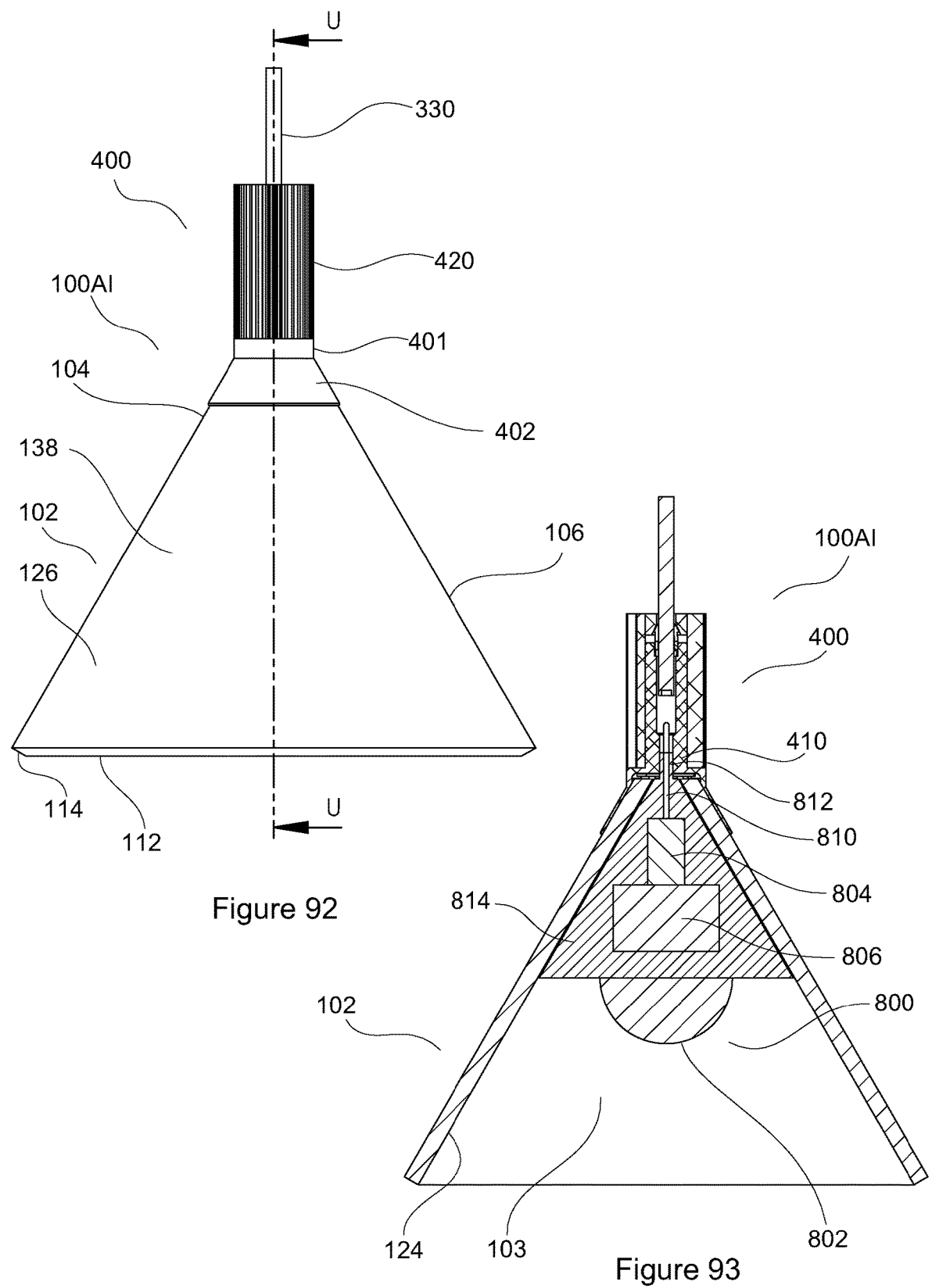
FIG. 92 depicts a thirty-fifth embodiment of a luminaire in form of a luminaire with a hollow light guide surrounding an internally located secondary electronic device (not seen in this view), similar in all other respects to the fourth embodiment; the fourth embodiment is used for reference, and is in no way limiting to type of embodiment that may be used with a secondary electronic device.
FIG. 93 is a section view U-U of FIG. 92, showing the secondary electronic device within the hollow of the light guide of the luminaire.

A thirty-fifth embodiment of a luminaire, generally identified by reference numeral 100AI, will now be described with reference to FIG. 92 and FIG. 93. A light guide 102 with a hollow cavity 103 provides space to house a secondary electronic device 800. A secondary electronic device 800 could be a security camera, a speaker, a sensor, whether it be a smoke, carbon monoxide, or occupancy or vacancy sensor, or a light sensitive sensor, or otherwise, or a secondary lighting component such as a spotlight, or being a receiver and or transmitter, and the like, the secondary electronic device 800 not being limited to these definitions. The hollow cavity 103 provides an opportunity to add additional components, features and complexity to the luminaire 100AI to broaden its in-use and industrial application by incorporating a secondary electronic device 800 or plurality of secondary electronic devices 800 to accommodate need or desire, without disrupting the functionality of illumination. The intention of the description of this embodiment is to illustrate how a secondary electronic device 800 can be incorporated within a cavity 103 within the interior perimeter 124 of light guide 102 of a luminaire 100AI to add useful features that would have benefit and add-value to the luminaire 100AI, and this description is not intended to iterate all the types of secondary electronic devices 800, their components, or methods of assembly; the simplicity of this description and illustration is to show how a secondary electronic device 800 could be incorporated and not to describe its functionality and components.

The secondary electronic device 800 features an environmental interface 802 in some embodiments that permits the device to record or transmit or detect within the environment the luminaire 100AI is within, therefore the environmental interface 802 can operate as a camera, a speaker, an alarm or a sensor, as already described, not being limited to these definitions. A housing 814 may be employed to unify the secondary electronic device 800 in a single entity, and be mounted with mounting means 812 to the luminaire 100AI, shown here as threaded portion (threads not shown) that screws into a hole in a portion of the luminaire housing 400, shown here as the direct heatsink 410, though mounting means are not limited to this definition. A conduit 810 is shown to permit the passage of power and communication devices between the luminaire 100AI and the secondary electronic device 800. The secondary electronic device 800 is shown with a driver 806 to provide regulated power and control that can be connected to a wireless communication module 804 to be able to receive wireless control, transmission, receiving or feedback with an external device through internet-of-things protocols and devices like WiFi, Bluetooth, LiFi, Apple Home Kit, Nest, and so on.

The luminaire 100AI benefits the secondary electronic device 800 by providing power to it and, in some embodiments, communication whether it be in situ or through conductor or wireless means to external devices. An embodiment permits the secondary electronic device 800 to be removed from the luminaire 100AI to be replaced by an alternative secondary electronic device 800 with a different or upgraded functionality.

Figure 94:
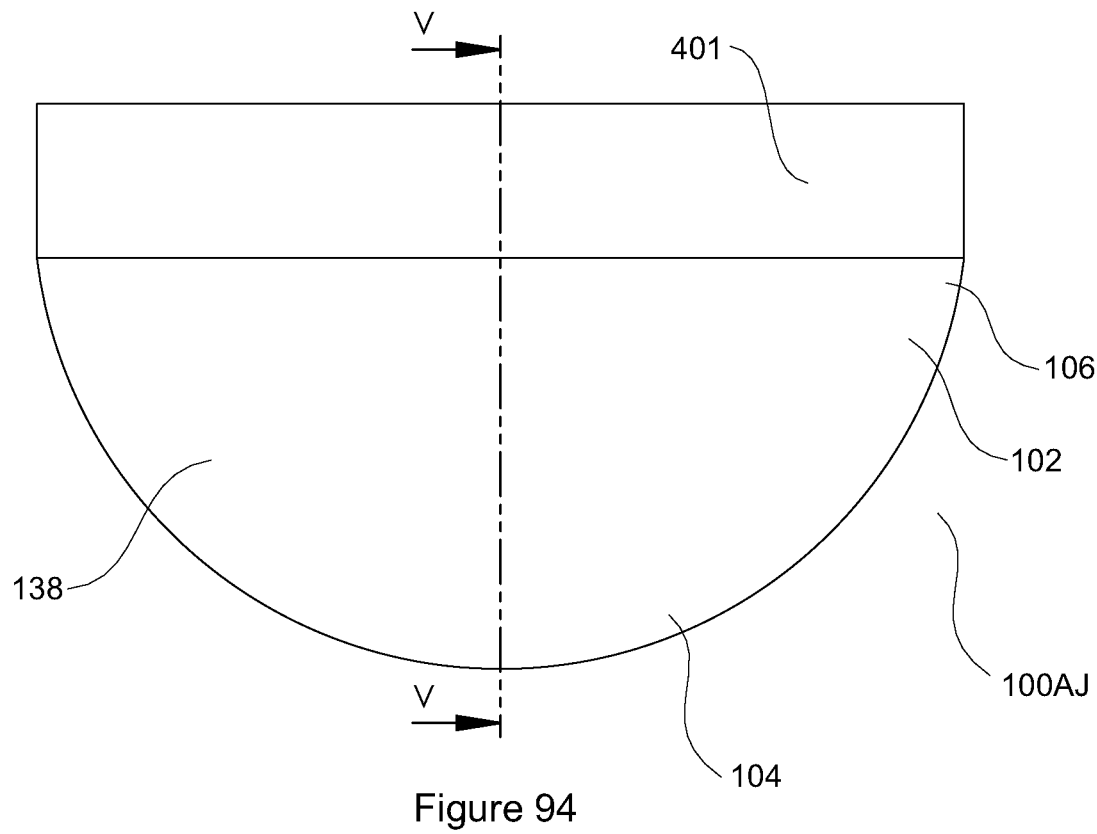
FIG. 94 is a side view of a thirty-sixth embodiment of a luminaire with a dome-shaped light guide, with a light source, in the form of a LED array mounted on a PCB, fixed to a direct heatsink in the form of cast or extruded aluminum housing bent to form a circular housing. The light source directs light through a light ingress surface at a proximal, wide light guide portion toward a distal, narrow portion, in this embodiment becoming a distal continuum.
Figure 95:
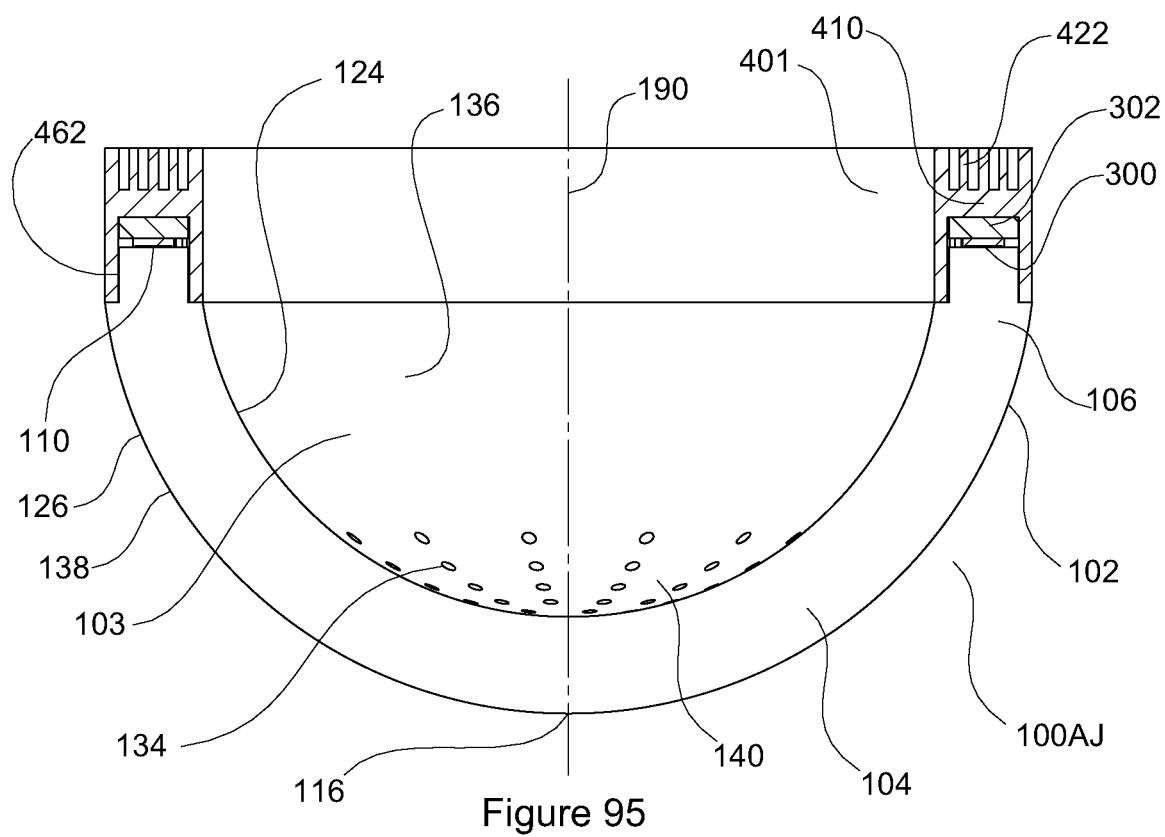
FIG. 95 is a section view along section line V-V of FIG. 94.

A thirty-sixth embodiment of a luminaire, generally identified by reference numeral 100AJ, will now be described with reference to FIG. 94 and FIG. 95. A light guide 102 with a hollow cavity 103 is connected to a housing 401 with a direct heatsink portion 410 by means of an adhesive 462 in the form of optically reflective silicone. A PCB 302 is mounted to the direct heatsink 410 upon which a light source 300 in the form of a plurality of LEDs 300A directs light into a light ingress surface 110 of a proximal, wide portion 106 of a light guide 102, to be directed toward to narrow distal portion 104, from which the light is extracted by means of extractors 134. Such embodiments are ideal for surface mount luminaires such as those to be mounted on ceilings or walls. Though this embodiment is a hemi-sphere, embodiments in the form of quarter-spheres and the like can make ideal designs for sconces.

Cautionary Warnings:

The geometry of the light guide is intended to conduct light effectively from the narrow, proximal end to a wider, distal end. The transport of light necessitates that rays of light are effectively conducted by way of total internal reflection. Portions designated to conduct light therefore must be disposed to receive the light at angles of incidence greater than the critical angle. A transitional portion of the light guide from the narrow portion to a wider end may be nominally curved or faceted and making the transition too tight or at too acute of an angle may prohibit total internal reflection as the light may be directed toward a bend or facet in the light guide where the ray strikes a surface of the light guide at an angle less than the critical angle, causing light to escape before it is effectively conducted to a portion where it is desired to be extracted from. Whereas LED or OLED sources have less oriented directionality of light, and therefore more occasion to strike a light guide at angles that do not accommodate TIR due to design limitations of a light guide, a laser light source, with its directional beam of light, will generally be better accommodated by a light guide with surfaces specifically designed to provide TIR.

Advantages:

Embodiments of light guides disclosed herein fashioned as conventional lampshades, globes or other typical forms of lighting fixtures have distinct efficacy advantages over those fixtures commonly used in practice that incorporate barriers to light or light absorbing materials such as shades and diffusers. Instead of shielding or diffusing a light source with light absorbing and diminishing materials, that may also increase glare causing illuminance of those materials, embodiments disclosed herein provide an effective conductor and efficient emitter of light, with minimal losses. These embodiments are effective replacements to conventional lighting fixture shapes such as shades, globes, domes, flutes, and the like. Additionally, by removing the necessity of both an independent light source, such as a lightbulb, and an independent light fixture, a further level of light losses and assembly redundancy, materials, assembly and manufacturing costs are avoided.

Clear acrylic (PMMA) and glass are common materials for light guides due to their optical clarity, which provides the high transmittance of light and minimizes the absorption of light, and ability to be fashioned with glossy surfaces that facilitates TIR. Clear crystal glass and silicone, however, offer advantages over conventional materials.

Crystal glass may have internal transmissions higher than 99%, and with refractive indices between 1.5 and 1.7, decreasing the necessary critical angle the greater the index, making the material superior for light guides. The critical angle for crystal glass with a refractive index of 1.7 is approximately 36° in air, much less than the critical angle of 41.8° of a material with a refractive index of 1.5 (like acrylic), so that it may more effectively conduct light from light sources with broad emission angles, such as LEDs (as opposed to a laser diode), which typically produce light between 0-60° from the normal of the emitting surface of the LED, and therefore would theoretically strike the internal surface of a light guide parallel with the normal of the LED at angles between 0-30° to the normal of the surface. Crystal glass also performs exceptionally well in outdoor applications due to its stability in environments with high heat or UV exposure.

Clear optical silicone may offer similar performance benefits as crystal, including very high light transmission and in some grades greater refractive indices than more common materials like acrylic, and additionally offer a greater range of refractive indices than most materials, and are easily prototyped. Optical silicone molding is an efficient, cost effective and effective manufacturing method for low and high production requirements; both the tooling and the parts can be significantly less expensive than injection molded PMMA. Being made of a rubbery material, silicone is resistant to breakage in use or shipping. Silicone rubber, however, is generally soft and flexible and therefore untenable as a material for large light guides as it would require support. However, embodiments described herein are self-supporting arch structures and therefore facilitate the use of optical silicone, as their shape prevents the collapse of the rubbery material in use.

Light guides disclosed herein have the benefit of transporting light from a light source and transmitting this light over a larger surface area to reduce the perceived intensity of light and associated glare that would be observable from a relatively small emitting surface of the light source, without any significant losses of actual flux. These light guides provide an improvement over planar light guides used in office lighting, such as troffer lighting in suspended ceilings, or suspended linear light guide luminaires that emit light from nominally flat planes, with relatively consistent light directionality and light distribution that may still impose glare to an observer.

Instead, embodiments disclosed herein describe hollow light guides that emit light from multiple axial directions, and transport light from a proximal, concealed and nominally planar compact LED light source with limited directionality to a larger distal multi-directional emitting surface or surfaces (such as domes and cones). These nominally round, globular, domed, cone-shaped, flute or trumpet-shaped, organically shaped or multi-faceted hollow light guides oriented around a principal axis emit light in multiple axial directions around the principal axis, and preferred embodiments for general use emit light nominally in all axial directions. The larger surface area not only diminishes glare in general, but the axial transition of the normals around the circumference or perimeter of the light guide, and of associated extractors, also limits what extracted light an observer will perceive to be emitted from a light guide with the observer's gaze fixed at a specific angle or radian of the light guide; light directed toward differing angles than toward the observer would be less perceptible or imperceptible to an observer with a fixed viewpoint.

There are certain metrics in office lighting that provide goals for our purpose of reducing glare. The Illuminating Engineering Society (IES) publishes RP-1, which provides recommended guidelines for desirable luminous conditions, including maximum recommended luminaire luminance levels to ensure lighting quality for observers in certain environments. These luminance levels are provided to prevent glare from lighting and differ according to task and occupation. For normal office computer screen based working applications, the recommended luminance of a luminaire is equal or less than ($\leq$) 1,500 cd/m$^2$ (candela per meter squared) and angles 65° or greater from nadir (essentially, a direction directly below a luminaire, or 0°), as intense light from these angles may cause disability glare or veiling reflections on the computer screen. RP-1 describes other working conditions and light level recommendations, and luminance and candlepower limits for different working conditions and environments. Some working environments do not require RP-1. Embodiments as described would be capable of meeting the recommendations of RP-1, provided the architecture of the extractors directs light in the appropriate angles at the appropriate intensities.

What is claimed is:

1. A luminaire (100) comprising:
   a light ingress surface (110) coincident to a principal axis (190) of a nominally hollow light guide (102) with a narrow portion and a wide portion,
   the light guide (102) providing means of transporting light via total internal reflection within the light guide (102), such that when a light source (300) is positioned at the narrow portion (104), light passes along the light guide (102) to the wide portion (106) wherefrom light is emitted from the light guide (102) into an environment surrounding the luminaire (100).

2. The luminaire according to claim 1, wherein light is emitted from extractors (134) at portions of the light guide (102).

3. The luminaire according to claim 1, wherein a housing (401, 402) conceals the narrow portion (104) to prevent light from escaping therefrom, preventing glare.

4. The luminaire according to claim 1, wherein a proximal conduit (120) comprises a portion of the narrow portion (104) to conduct light from the light ingress surface (110) to more distal portions of the light guide (102).

5. The luminaire according to claim 2, wherein the extractors (134) are comprised of a perturbed portion of the light guide (102) provide diffusion of light from the light source (300).

6. The luminaire according to claim 1, which widens diametrically from the narrow portion (104) to the wide portion (106).

7. The luminaire according to claim 1, wherein the light guide (102) is hollow throughout the light guide (102), from the proximal end at the light ingress surface (110) at the narrow portion(104) through the wide portion (106) of the light guide (102), a hollowness of the light guide (102) providing a continuous interior perimeter (124) of the light guide from one end of the light guide (102) to the other, such that the light ingress surface (110) is fashioned with a channel (131) through it, with an array of LEDs (300A) placed at the light ingress surface (110) and around the channel (131).

8. The luminaire according to claim 1, wherein the light guide (102) is nominally hollow except at a short portion of the proximal narrow portion (104) adjacent to the light ingress surface (110), where the solid portion of the light guide (102) is disposed to receive light from the light source (300), at a central position of the light ingress surface (110), and to transport the light around a proximal cavity terminus (128) of a portion of an interior perimeter (124) fashioned to facilitate internal reflection of the light from this interior perimeter (124) to distal portions of the light guide(102).

9. The luminaire according to claim 1, wherein the interior surfaces (124) and exterior surfaces (126) of the light guide (102) terminate at a distal terminus (112) and not a terminating face (114), so as to prevent light from exiting from the terminating face (114) that would cause glare.

10. The luminaire according to claim 2, wherein extractors on the surface of the light guide that facilitate extraction of the light from the light guide are fashioned only on distal portions of the surfaces of the light guide, providing portions closer to the light source to be unperturbed, preventing extraction and facilitating total internal reflection to direct light toward the distal portion of the light guide.

11. The luminaire according to claim 1, wherein the light ingress surface (110) is nominally perpendicular to a principal axis of the light guide.

12. The luminaire according to claim 1, wherein the light ingress surface (110) is nominally parallel to a principal axis of light guide.

13. The luminaire according to claim 1, wherein the wide portion (106) features a distal flexure portion (146) that returns proximally as it widens further.

14. The luminaire according to claim 1, wherein the light ingress surface (110) features a lens to collimate light from an LED (300A).

15. The luminaire according to claim 1, wherein a separate lens component is disposed to collimate light from an LED (300A) and direct it into the light ingress surface (110).

16. The luminaire according to claim 1, further comprising a channel (131) running through the center of the light guide (102), and a vent (409) through a housing assembly (400), that provides an atmospheric conduction through the luminaire and past a heatsink disposed to draw heat away from the light source (300), and transfer the heat to a conducting atmosphere passing through the luminaire (100) that draws heat away from the luminaire (100), thereby cooling the luminaire and LEDs.

17. The luminaire according to claim 1, wherein the luminaire (100) has a coupling for installation in a lamp socket.

18. The luminaire according to claim 1, wherein the luminaire (100) is fashioned from flexible optical silicone in a dome-like shape, cone-like shape or some other self-supporting architecture that would prevent collapse or other deformation of the integrity of the flexible material of the light guide.

19. The luminaire according to claim 1, wherein the light guide (102) is comprised of two or more components joined together.

20. The luminaire according to claim 1, wherein the light guide (102) features a cavity (103) wherein a secondary electronic device (800) is housed and retained.

* * * * *